(12) United States Patent
Miyake et al.

(10) Patent No.: US 10,732,321 B2
(45) Date of Patent: Aug. 4, 2020

(54) PHOTONIC STRUCTURES FROM SELF ASSEMBLY OF BRUSH BLOCK COPOLYMERS AND POLYMER BLENDS

(71) Applicant: California Institute of Technology, Pasadena, CA (US)

(72) Inventors: Garret M. Miyake, Pasadena, CA (US); Raymond Weitekamp, Glendale, CA (US); Robert H. Grubbs, South Pasadena, CA (US); Victoria Piunova, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 665 days.

(21) Appl. No.: 15/243,788

(22) Filed: Aug. 22, 2016

(65) Prior Publication Data

US 2016/0356923 A1 Dec. 8, 2016

Related U.S. Application Data

(63) Continuation of application No. 13/930,400, filed on Jun. 28, 2013, now Pat. No. 9,453,943.

(60) Provisional application No. 61/665,696, filed on Jun. 28, 2012.

(51) Int. Cl.

| *C08L 87/00* | (2006.01) |
| *G02B 1/00* | (2006.01) |
| *G02F 1/00* | (2006.01) |
| *C08F 222/40* | (2006.01) |
| *C08F 293/00* | (2006.01) |
| *C08F 299/00* | (2006.01) |
| *C08F 222/04* | (2006.01) |
| *C08G 81/00* | (2006.01) |

(52) U.S. Cl.
CPC ............ *G02B 1/005* (2013.01); *C08L 87/005* (2013.01); *G02F 1/0054* (2013.01); *C08F 222/04* (2013.01); *C08F 222/40* (2013.01); *C08F 293/00* (2013.01); *C08F 299/00* (2013.01); *C08G 81/00* (2013.01); *G02F 2202/32* (2013.01)

(58) Field of Classification Search
CPC .... C08F 222/04; C08F 222/40; C08F 293/00; C08F 299/00; C08G 81/00; C08L 87/005; G02F 1/0054; G02F 2202/32; G02B 1/005
See application file for complete search history.

(56) References Cited

U.S. PATENT DOCUMENTS

| 5,462,990 | A | 10/1995 | Hubbell et al. |
| 6,007,845 | A | 12/1999 | Domb et al. |
| 6,383,500 | B1 | 5/2002 | Wooley et al. |
| 6,407,187 | B1 | 6/2002 | Matyjaszewski et al. |
| 6,433,931 | B1 | 8/2002 | Fink et al. |
| 6,627,314 | B2 | 9/2003 | Matyjaszewski et al. |
| 6,671,097 | B2 | 12/2003 | Fink et al. |
| 6,692,914 | B1 | 2/2004 | Klaerner et al. |
| 7,101,937 | B1 | 9/2006 | Frechet et al. |
| 7,795,355 | B2 | 9/2010 | Matyjaszewski et al. |
| 7,960,479 | B2 | 6/2011 | Cheng et al. |
| 8,415,436 | B2 | 4/2013 | Han et al. |
| 8,419,792 | B2 | 4/2013 | Vanderbilt et al. |
| 8,454,689 | B2 | 6/2013 | Vanderbilt et al. |
| 9,045,579 | B2 | 6/2015 | Xia et al. |
| 9,382,387 | B2 | 7/2016 | Xia et al. |
| 9,453,943 | B2 | 9/2016 | Miyake et al. |
| 2002/0135880 | A1 | 9/2002 | Fink et al. |
| 2007/0099791 | A1 | 5/2007 | Wan et al. |
| 2013/0296491 | A1 | 11/2013 | Xia et al. |
| 2013/0324666 | A1 | 12/2013 | Xia et al. |
| 2016/0024244 | A1 | 1/2016 | Xia et al. |
| 2016/0289392 | A1 | 10/2016 | Grubbs et al. |
| 2017/0018801 | A1 | 1/2017 | Grubbs et al. |

FOREIGN PATENT DOCUMENTS

WO    WO 2013/138494    9/2013

OTHER PUBLICATIONS

Aguirre et al. (2010) "Tunable Colors in Opals and Inverse Opal Photonic Crystals," *Adv. Funct. Mater.* 20:2565-2578.
Akbari et al. (2001) "Cool Surfaces and Shade Trees to Reduce Energy Use and Improve Air Quality in Urban Areas", *Solar Energy*, vol. 70 No. 3, pp. 295-310.
Albert et al. (2010) "Self-Assembly of Block Copolymer Thin Films," *Materials Today*. 13:24-33.
Aharoni (1979), "Rigid Backbone Polymers. 2. Polyisocyanates and Their Liquid-Crystal Behavior," Macromolecules, 12,94-103.
Atwater et al. (2010) "Plasmonics for Improved Photovoltaic Devices", *Nature Material*, vol. 9, pp. 205-214.
(Continued)

*Primary Examiner* — Irina S Zemel
*Assistant Examiner* — Jeffrey S Lenihan
(74) *Attorney, Agent, or Firm* — Leydig, Voit & Mayer, Ltd.

(57) ABSTRACT

The invention provides a class of block copolymers having a plurality of chemically different blocks, at least a portion of which incorporating polymer side chain groups having a helical secondary structure. The invention also provides structures generated by self-assembly of polymer blends including at least one block copolymer component, such as a brush block polymer or wedge-type block polymer. The invention provides, for example, periodic nanostructures and microstructures generated by self-assembly of block copolymers and polymer blends comprising a mixture of at least one block copolymer component, such as a brush block copolymer, and at least a second component.

23 Claims, 15 Drawing Sheets

(56) References Cited

OTHER PUBLICATIONS

Azzaroni et al. (2012), "Polymer Brushes Here, There, and Everywhere: Recent Advances in Their Practical Applications and Emerging Opportunities in Multiple Research Fields", Journal of Polymer Science Part A: Polymer Chemistry 2012,50,3225-3258.
Bang et al. (2009) "Block Copolymer Nanolithography: Translation of Molecular Level Control to Nanoscale Patterns," *Adv. Mater.* 21:4769-4792.
Bang et al. (2009) "Dual Templating Synthesis of Mesoporous Titanium Nitride Microspheres," *Adv. Mater.* 21:3186-3190.
Bates et al. (1990) "Block Copolymer Thermodynamics: Theory and Experiment," *Ann. Rev. Phys. Chem.* 41:525-557.
Bates et al. (1999) "Block Co-polymers-Designer Soft Materials," *Physics Today*. 52:32-38.
Bates et al. (Apr. 27, 2012) "Multiblock Polymers: Panacea or Pandora's Box?" *Science*. 336:434-440.
Bajpai et al. (2008), "Responsive polymers in controlled drug delivery", Progress in Polymer Science 33 (2008) 1088-1118.
Bae et al. (2005) "Organization of Rigid Wedge-Flexible Coil Block Copolymers into Liquid Crystalline Assembly", Macromolecules, vol. 38, No. 10, pp. 4226-4230.
Bennett et al. (1982) "Modelling of the urban heat island and of its interaction with pollutant dispersal," *Atmospheric Environment*. 16:1797-1822.
Bertone et al. (1999) "Thickness Dependence of the Optical Properties of Ordered Silica-Air and Air-Polymer Photonic Crystals," *Phys. Rev. Lett.* 83:300-303.
Bielawski et al. (2007) "Living ring-opening metathesis polymerization," *Prog. Polym. Sci.* 32:1-29.
Bielawski et al. (2009) "Living Ring-Opening Metathesis Polymerization," In; Ch. 6 *Controlled and Living Polymerizations*. Eds.: Müller, A. H. E.; Matyjaszewski, K. Wiley-VCH. Weinheim, Germany. pp. 297-342.
Black (2005) "Self-Aligned Self Assembly of Multi-Nanowire Silicon Field Effect Transistors," *Appl. Phys. Lett.* 87:163116-163118.
Black et al. (2001) "Integration of Self-Assembled Diblock Copolymers for Semiconductor Capacitor Fabrication," *Appl. Phys. Lett.* 79:409-411.
Braun et al. (1999) "Microporous materials: Electrochemically grown photonic crystals," *Nature*. 402:603-604.
Campbell et al. (2000) "Fabrication of photonic crystals for the visible spectrum by holographic lithography," *Nature*. 404:53-56.
Carmesin et al. (1990) "Static and Dynamic Properties of Two-Dimensional Polymer Melts," *J. Phys. (Paris)*. 51:915-932.
Carney et al. (2008), "Intramolecular Hydroamination of Aminoalkynes with Silver—Phenanthroline Catalysts," Org. Lett. 2008, 10, 3903-3906.
Crutzen (2004) "New Directions: The Growing Urban Heat and Pollution "Island" Effect — Impact on Chemistry and Climate," *Atmospheric Environment* 38, 3539-3540.
Cheng et al. (2001) "Formation of a Cobalt Magnetic Dot Array via Block Copolymer Lithography," *Adv. Mater.* 13:1174-1178.
Cheng et al. (2006) "Templated Self-Assembly of Block Copolymers: Top-Down Helps Bottom-Up," *Adv. Mater.* 18:2505-2521.
Cushen et al. (2012) "Oligosaccharide/Silicon-Containing Block Copolymers with 5 nm Features for Lithographic Applications," *ACS Nano*. 6:3424-3433.
Daeffler (2013), "Ring-Opening Metathesis of Bulky Norbornene Monomers and Radical-Mediated Hydrophosphonation of Olefins" Ph.D. Thesis, California Institute of Technology, Pasadena, California.
Deutsch et al. (1991) "Interdiffusion and Self-Diffusion in Polymer Mixtures: A Monte Carlo Study," *J. Chem. Phys.* 94:2294-2304.
Edrington et al. (2001) "Polymer-Based Photonic Crystals," *Adv. Mater.* 13:421-425.
Ferry et al. (2010), "Design Considerations for Plasmonic Photovoltaics," *Adv. Mater*, vol. 22, pp. 4794-4808.

Fink et al. (1999) "Block Copolymers as Photonic Bandgap Materials," *Journal of Lightwave Technology*, vol. 17, No. 11, pp. 1963-1969.
Fredrickson et al. (1996) "Dynamics of Block Copolymers: Theory and Experiment," *Annu. Rev. Mater. Sci.* 26: 501-550.
Galisteo-Lopez et al. (2011) "Self-Assembled Photonic Structures," *Adv. Mater*, vol. 23, 30-69.
Gao et al. (2007) "Synthesis of Molecular Brushes by "Grafting Onto" Method: Combination of ATRP and Click Reactions," *J. Am. Chem. Soc.* 129:6633.
Ge et al. (Jan. 20, 2011) "Responsive Photonic Crystals," *Angew. Chem. Int. Ed.* 50:1492-1522.
Grason (2006) "The Packing of Soft Materials: Molecular Asymmetry, Geometric Frustration and Optimal Lattices in Block Copolymer Melts," *Phys. Rep.* 433:1-64.
Green et al. (1999) "The Macromolecular Route to Chiral Amplification," *Angew. Chem. Int. Ed.* 38:3138-3154.
Green et al. (1989), "Macromolecular stereochemistry: the out-of-proportion influence of optically active comonomers on the conformational characteristics of polyisocyanates. The sergeants and soldiers experiment," J. Am. Chem. Soc., 111, 6452-6454.
Grimm et al. (2008) "Global Change and the Ecology of Cities," *Science*. 319:756-760.
Gu et al. (Published online Jan. 31, 2013) "Self-Assembly of Symmetric Brush Diblock Copolymers," *ACS Nano*. 7:2551-2558.
Hadjichristidis et al. (2001) "Polymers with Complex Architecture by Living Anionic Polymerization," *Chem. Rev.* 101:3747-3792.
Hadjichristidis et al. (2003) "The Strength of the Macromonomer Strategy for Complex Macromolecular Architecture: Molecular Characterization, Properties and Applications of Polymacromonomers," *Macromol. Rapid Commun.* 24:979-1013.
Hamley (2003) "Nanostructure Fabrication Using Block Copolymers," *Nanotechnology*. 14:R39.
Hashimoto et al. (1993) "Ordered structure in blends of block copolymers. 1. Miscibility criterion for lamellar block copolymers," *Macromolecules*. 26:2895-2904.
Hawker et al. (2005) "Block Copolymer Lithography: Merging 'Bottom-Up' with 'Top-Down' Processes," *MRS Bull*. 30:952-966.
Heroguez et al. (1996) "Synthesis of α-Norbornenylpoly(ethylene oxide) Macromonomers and Their Ring-Opening Metathesis Polymerization," *Macromolecules*. 29:4459-4464.
Hu et al. (Aug. 4, 2011) "Linear Rheological Response of a Series of Densely Branched Brush Polymers," *Macromolecules*. 44:6935-6943.
Hustad et al. (2009) "Photonic Polyethylene from Self-Assembled Mesophases of Polydisperse Olefin Block Copolymers," *Macromolecules*. 42:3788-3794.
International Search Report and Written Opinion dated Jul. 18, 2013, corresponding to International Application No. PCT/US2013/030978.
Jeon et al. (2004) "Fabricating Complex Three-Dimensional Nanostructures with High-Resolution Conformable Phase Masks," *Proc. Natl. Acad. Sci. USA* 101:12428-12433.
Jeon, et al. (1999) "Patterned Polymer Growth on Silicon Surfaces Using Microcontact Printing and Surface-Initiated Polymerization," Applied Physics Letters 75(26):4201-4203.
Johnson et al. (2010) "Drug-loaded, bivalent-bottle-brush polymers by graft-through ROMP," *Macromolecules*. 43:10326-10335.
Johnson et al. (Dec. 13, 2011) "Core-Clickable PEG-Branch-Azide Bivalent-Bottle-Brush Polymers by ROMP: Grafting-Through and Clicking-To," *J. Am. Chem. Soc.* 133-559-566.
Kalnay et al. (2003) "Impact of Urban and Land-Use Change on Climate," *Nature*, vol. 423, 523-531.
Kane et al. (1996) "Phase Behavior and Morphological Characteristics of Compositionally Symmetric Diblock Copolymer Blends," *Macromolecules*. 29:8862-8870.
Kang et al. (2007) "Broad-Wavelength-Range Chemically Tunable Block-Copolymer Photonic Gels," *Nat. Mater*. 6:957-960.
Kang et al. (2009) "Full Color Stop Bands in Hybrid Organic/Inorganic Block Copolymer Photonic Gels by Swelling-Freezing," *J. Am. Chem. Soc.* 131:7538-7539.

(56) References Cited

OTHER PUBLICATIONS

Kang et al. (2011), "Ultrafast Cyclopolymerization for Polyene Synthesis: Living Polymerization to Dendronized Polymers," J. Am. Chem. Soc. 2011, 133, 11904-11907.

Karl et al. (2003) "Modern Global Climate Change," Science. 302:1719-1723.

Kikuchi et al. (2008) "Conformational Properties of Cylindrical Rod Brushes Consisting of a Polystyrene Main Chain and Poly(n-hexyl isocyanate) Side Chains," Macromolecules. 41:6564-6572.

Kim et al. (2001) "A Route to Nanoscopic $SiO_2$ Posts via Block Copolymer Templates," Adv. Mater. 13:795-797.

Krause et al. (2003), "Simple Synthesis of Poly(acetylene) Latex Particles in Aqueous Media," Angew. Chem. Int. Ed. 2003, 42, 5965-5969.

Kumar et al. (2009), "Factors Relevant for the Regioselective Cyclopolymerization of 1,6-Heptadiynes, N,N-Dipropargylamines, N,N-Dipropargylammonium Salts, and Dipropargyl Ethers by RuIV-Alkylidene-Based Metathesis Initiators", J. Am. Chem. Soc., 131, 387-395.

Lanson et al. (2007) "Poly(styrene)comb-b-Poly(ethylene oxide)comb Copolymers: Synthesis and AFM Investigation of Intra- and Supramolecular Organization as Thin Deposits," Macromolecules. 40:9503-9509.

Lanson et al. (2007) "Synthesis of (Poly(chloroethyl vinyl ether)-g-polystyrene)comb-b-(poly(chloropyran ethoxy vinyl ether)-g-polyisoprene)comb Copolymers and Study of Hyper-Branched Micelle Formation in Dilute Solutions," Macromolecules. 40:5559-5565.

Lee et al. (2008) "Hetero-Grafted Block Brushes with PCL and PBA Side Chains," Macromolecules. 41:6073-6080.

Lee et al. (2010) "Quasi-Amorphous Colloidal Structures for Electrically Tunable Full-Color Photonic Pixels with Angle-Independency," Adv. Mater. 22:4973-4977.

Leibler (1980) "Theory of Microphase Separation in Block Copolymers," Macromolecules. 13:1602-1617.

Leitgeb et al. (2010) "The ROMP toolbox upgraded," Polymer. 51:2927-2946.

Li et al. (2000) "Dense Arrays of Ordered GaAs Nanostructures by Selective Area Growth on Substrates Patterned by Block Copolymer Lithography," Appl. Phys. Lett. 76:1689-1691.

Li et al. (2001) "The Internal Pressure and New Solubility Parameter of Polymeric Liquids," J. Chem. Eng. Chin. Univ. 3:206-212.— English Abstract Only.

Lin et al. (1998) "A three-dimensional photonic crystal operating at infrared wavelengths," Nature. 394:251-253.

Linguist, et al. (2008) "Plasmonic Nanocavity Arrays for Enhanced Efficiency in Organic Photovoltaic Cells," Applied Physics Letters. 93:123308.

Lopes et al. (2001) "Hierarchical Self-Assembly of Metal Nanostructures on Diblock Copolymer Scaffolds," Nature. 414:735-738.

Love et al. (2002) "A Practical and Highly Active Ruthenium-Based Catalyst that Effects the Cross Metathesis of Acrylonitrile," Angew. Chem. Int. Ed. 41:4035-4037.

Luttge (2009) "Massively Parallel Fabrication of Repetitive Nanostructures: Nanolithography for Nanoarrays," J. Phys. D: Appl. Phys. 42:123001.

Marencic et al. (2010) "Controlling Order in Block Copolymer Thin Films for Nanopatterning Applications," Annu. Rev. Chem. Bimol. Eng. 1:277-297.

Maede et al. (2012), "Helical polymer brushes with a preferred-handed helix-sense triggered by a terminal optically active group in the pendant," Chem. Commun, 48, 3342-3344.

Masuda et al. (1999) "Photonic Crystal Using Anodic Porous Alumina," Jpn. J. Appl. Phys. 38:L1403-L1405.

Matsen et al. (1997) "Conformationally asymmetric block copolymers," J. Poly. Sci. Part B: Polym. Phys. 35:945-952.

Matson et al. (2008) "Synthesis of Fluorine-18 Functionalized Nanoparticles for use as in vivo Molecular Imaging Agents," J. Am. Chem. Soc. 130:6731-6733.

Mayer et al. (2001) "Chiral polyisocyanates, a special class of helical polymers," Prog. Polym. Sci. 26:1973-2013.

Maxein et al. (1999), "Structure-Property Relations in Cholesteric Networks from Chiral Polyisocyanates," Macromolecules, 32, 5747-5754.

Maxein et al. (1998), "Opalescent Cholesteric Networks from Chiral Polyisocyanates in Polystyrene," Adv. Mater., 10, 341-345.

Mayershofer et al. (2006), Bi- and Trinuclear Ruthenium Alkylidene Triggered Cyclopolymerization of 1,6-Heptadiynes: Access to $A_n$-X-$A_n$ Block and $(A_n)_3$X Tristar Copolymers, Macromolecules, 39, 3484-3493.

Milner et al. (1988), "Theory of the Grafted Polymer Brush," Mecromolecules, 21(8):2610-2619.

Miyake et al. (Published online Aug. 14, 2012) "Synthesis of Isocyanate-Based Brush Block Copolymers and Their Rapid Self Assembly to Infrared Reflecting Photonic Crystals," J. Am. Chem. Soc. 134:14249-14254.

Miyake et al. (Published online Sep. 13, 2012) "Precisely Tunable Photonic Crystals From Rapidly Self-Assembling Brush Block Copolymer Blends," Angew. Chem. Int. Ed. 51:11246-11248.

Miyake et al. (2010) "Stereospecific Polymerization of Chiral Oxazolidinone-Functionalized Alkenes," Macromolecules, 43, 7504-7514.

Moon et al. (2010) "Chemical Aspects of Three-Dimensional Photonic Crystals," Chem. Rev. 110:547-574.

Neiser et al. (2003) "Polymerization of Macromonomers to Cylindrical Brushes Initiated by Organolanthanides," Macromolecules. 36:5437-5439.

Neugebauer et al. (2004) "How Dense Are Cylindrical Brushes Grafted from a Multifunctional Macroinitiator?" Polymer. 45:8173-8179.

Oono et al. (1988) "$\frac{2}{3}$-Power Law for Copolymer Lamellar Thickness Implies a $\frac{1}{3}$-Power Law for Spinodal Decomposition," Phys. Rev. Lett. 61:1109-1111.

Orfanidis (Retrieved May 2012) Electromagnetic Waves and Antennas. Online book, http:// http://www.ece.rutgers.edu/~orfanidi/ewa.

Pangborn et al. (1996) "Safe and Convenient Procedure for Solvent Purification," Organometallics. 15:1518-1520.

Paquet et al. (2008) "Nanostructured polymers for photonics," Materials Today. 2008, 11, 48-56.

Park et al. (1997) "Block Copolymer Lithography: Periodic Arrays of ~$10^{11}$ Holes in 1 Square Centimeter," Science. 276:1401-1404.

Park et al. (2003) "Enabling Nanotechnology with Self Assembled Block Copolymer Patterns," Polymer. 44:6725-6760.

Park et al. (2009) "Macroscopic 10-Terabit-per-Square-Inch Arrays from Block Copolymers with Lateral Order," Science. 323:1030-1033.

Parnell et al. (Feb. 4, 2011) "Continuously Tuneable Optical Filters from Self-Assembled Block Copolymer Blends," Soft Matter. 7:3721-3725.

Patten et al. (1991) "'Living' titanium(IV) catalyzed coordination polymerizations of isocyanates," J. Am. Chem. Soc. 113:5065-5066.

Patten et al. (1996) "Living Organotitanium(IV)-Catalyzed Polymerizations of Isocyanates," J. Am. Chem. Soc. 118:1906-1916.

Patz et al. (2005) "Impact of regional climate change on human health," Nature. 438:310-317.

Pelletier et al. (2006) "Aluminum nanowire polarizing grids: Fabrication and analysis," Appl. Phys. Lett. 88:211114.

Peng et al. (2011) "Surface Urban Heat Island Across 419 Global Big Cities," Environ. Sci. Technol. 2012, 46, 696-703.

Poelma et al. (2012) "Cyclic Block Copolymers for Controlling Feature Sizes in Block Copolymer Lithography," ACS Nano. 6:10845-10854.

Rizwan et al. (2008) "A review on the generation, determination and mitigation of Urban Heat Island," Journal of Environmental Sciences. 20:120-128.

Runge et al. (2007) "Synthesis of High Molecular Weight Comb Block Copolymers and Their Assembly into Ordered Morphologies in the Solid State," J. Am. Chem. Soc. 129:10551-10560.

Runge et al. (2008) "Investigation of the Assembly of Comb Block Copolymers in the Solid State," Macromolecules. 41:7687-7694.

Rutenburg (2004) "Synthesis of Polymer Dielectric Layers for Organic Thin Film Transistors via Surface-Initiated Ring-Opening Metathesis Polymerization," J. Am. Chem. Soc. 2004, 126,4062-4063.

(56) References Cited

OTHER PUBLICATIONS

Rzayev et al. (2009) "Synthesis of Polystyrene-Polylactide Bottlebrush Block Copolymers and Their Melt Self-Assembly into Large Domain Nanostructures," *Macromolecules.* 42:2135.
Schappacher et al. (2005) "From Combs to Comb-g-Comb Centipedes," *Macromolecules.* 38:7209-7213.
Segalman (2005) "Patterning with Block Copolymer Thin Films," *Materials Science and Engineering.* R48:191-226.
Shah et al. (2011), "Chiroptical Properties of Graft Copolymers Containing Chiral Poly(n-hexyl isocyanate) as a Side Chain", Macromolecules, 44, 7917-7925.
Sheiko et al. (2001) "Visualization of Macromolecules—A First Step to Manipulation and Controlled Response," *Chem. Rev.* 101:4099-4123.
Slugovc (2004) "The Ring Opening Metathesis Polymerisation Toolbox," *Macromol. Rapid Commun.* 25:1283-1297.
South et al. (2007), "Modular and Dynamic Functionalization of Polymeric Scaffolds", Accounts of Chemical Research, vol. 40, No. 1, pp. 63-74.
Stoykovich et al. (2006) "Block Copolymers and Conventional Lithography," *Materials Today.* 9:20.
Sumerlin et al. (2007) "Initiation Efficiency in the Synthesis of Molecular Brushes by Grafting from via Atom Transfer Radical Polymerization," *Macromolecules.* 38:702-708.
Sveinbjörnsson et al. (Jul. 30, 2012) "Rapid Self-Assembly of Brush Block Copolymers to Photonic Crystals," *Proc. Natl. Acad. Sci. USA.* 109(36):14332-14336.
The Proceedings of the Austrian-Slovenian Polymer Meeting 2013, WWW.ASPM.SI pp. 1-303.
Thompson et al. (2005) "Solvent Accelerated Polymer Diffusion in Thin Films," *Macromolecules.* 38:4339-4344.
Thurn-Albrecht et al. (2000) "High-Density Nanowire Arrays Grown in Self-Assembled Diblock Copolymer Templates," *Science.* 290:2126-2129.
Troparevsky et al. (2010) "Transfer-matrix formalism for the calculation of optical response in multilayer systems: from coherent to incoherent interference," *Optics Express.* 18:24715-24721.
Tseng et al. (2010) "Block Copolymer Nanostructures for Technology," *Polymers.* 2:470-489.
Urbas et al. (2000) "Tunable Block Copolymer/Homopolymer Photonic Crystals," *Adv. Mater.* 12:812-814.
Urbas et al. (1999) "One-Dimensionally Periodic Dielectric Reflectors from Self-Assembled Block Copolymers—Homopolymer Blends," *Macromolecules.* 32:4748-4750.
Valkama et al. (2004) "Self-Assembled Polymeric Solid Films with Temperature-Induced Large and Reversible Photonic-Bandgap Switching," *Nature Mater.* 3:872-876.
Vayer et al. (2010) "Perpendicular Orientation of Cylindrical Domains Upon Solvent Annealing Thin Films of Polystyrene-B-Polylactide," *Thin Solid Films.* 518:3710-3715.
Vougioukalakis et al. (2010) "Ruthenium-Based Heterocyclic Carbene-Coordinated Olefin Metathesis Catalysts," *Chem. Rev.* 110:1746-1787.
Vygodskii et al. (2008), "Cyclopolymerization of N,N-Dipropargylamines and N,N-Dipropargyl Ammonium Salts," Macromolecules 2008, 41, 1919-1928.

Wanakule et al. (2010) "Thermodynamic Properties of Block Copolymer Electrolytes Containing Imidazolium and Lithium Salts," *Macromolecules.* 43:8282-8289.
Wang et al. (Mar. 14, 2011) "Bioinspired Colloidal Photonic Crystals with Controllable Wettability," *Acc. Chem. Res.* 44:405-415.
Westphalen, et al. (1999), "Metal Cluster Enhanced Organic Solar Cells," *Solar Energy Materials & Solar Cells* 61 (2000) 97-105.
Xia et al. (2009) "Efficient synthesis of narrowly dispersed brush copolymers and study of their assemblies: the importance of side chain arrangement," *J. Am. Chem. Soc.* 131:18525-18532.
Xia et al. (2009) "Efficient Synthesis of Narrowly Dispersed Brush Polymers via Living Ring-Opening Metathesis Polymerization of Macromonomers," *Macromolecules.* 42:3761-3766.
Xu et al. (Nov. 24, 2011) "Fabrication of Silicon Oxide Nanodots with an Areal Density Beyond 1 Teradots Inch.$^{-2}$," *Adv. Mater.* 22:5755.
Yang et al. (2010), "Supramolecular ABC Triblock Copolymers via One-Pot, Orthogonal Self-Assembly", J. Am. Chem. Soc. 2010, vol. 132, pp. 1637-1645.
Yamaguchi et al. (2001) "A Phase Diagram for the Binary Blends of Nearly Symmetric Diblock Copolymers. 1. Parameter Space of Molecular Weight Ratio and Blend Composition," *Macromolecules.* 34:6495-6505.
Yashima et al. (2009) "Helical Polymers: Synthesis, Structures, and Functions," *Chem. Rev.* 109:6102-6211.
Yoon et al. (2005) "Self-Assembly of Block Copolymers for Photonic-Bandgap Materials," MRS Bull. 2005, 30, 721-726.
Yoon et al. (2006) "Optically Transparent and High Molecular Weight Polyolefin Block Copolymers toward Self-Assembled Photonic Band Gap Materials," *Macromolecules.* 39:1913-1919.
Yoon et al. (2008) "Thermochromic Block Copolymer Photonic Gel," *Macromolecules.* 41:4582-4584.
Zalusky et al. (2002) "Ordered Nanoporous Polymers from Polystyrene-Polylactide Block Copolymers," *J. Am. Chem. Soc.* 124:12761-12773.
Zhang et al. (2005) "Cylindrical Polymer Brushes," *J. Polym. Sci. Part A: Polym. Chem.* 43:3461-3481.
Zhulina "Polymer brushes: Polymers in Soft and Biological Matter" Jul. 30-Aug. 1, 2012, Boulder CO, USA, Institute of Macromolecular Compounds, Russian Academy of Sciences, St. Petersburg, Russia.
Zhulina "Polymer brushes: Simple Views on Polymers at Surfaces and Interfaces: Simposium Honoring P.- G. de Gennes", APS meeting, Mar. 13, 2008, New Orleans USA, Institute of Macromolecular Compounds, Russian Academy of Sciences, St. Petersburg, Russia.
U.S. Appl. No. 13/801,710, filed Mar. 13, 2013, 2013/0296491, Nov. 7, 2013, U.S. Pat. No. 9,045,579, Jun. 2, 2015.
U.S. Appl. No. 14/698,520, filed Apr. 28, 2015, 2016/0024244, Jan. 28, 2016.
U.S. Appl. No. 13/800,646, filed Mar. 13, 2013, 2013/0324666, Dec. 5, 2013, U.S. Pat. No. 9,382,387, Jul. 5, 2016.
U.S. Appl. No. 13/930,400, filed Jun. 28, 2013, 2014/0011958, Jan. 9, 2014, U.S. Pat. No. 9,453,943, Sep. 27, 2016.
U.S. Appl. No. 15/065,291, filed Mar. 9, 2016, 2016/0289392, Oct. 6, 2016.
U.S. Appl. No. 15/065,317, filed Mar. 9, 2016, 2017/0018801, Jan. 19, 2017.

PHOTONIC STRUCTURES FROM SELF ASSEMBLY OF BRUSH BLOCK COPOLYMERS AND POLYMER BLENDS

CROSS-REFERENCE TO RELATED APPLICATIONS

This application claims the benefit of priority of U.S. Provisional Patent Application No. 61/665,696, filed Jun. 28, 2012, which is hereby incorporated by reference in its entirety to the extent not inconsistent with the disclosure herein.

STATEMENT REGARDING FEDERALLY SPONSORED RESEARCH OR DEVELOPMENT

This application is a continuation of U.S. application Ser. No. 13/930,400, filed Jun. 28, 2013, which claims the benefit of priority of U.S. Provisional Application No. 61/665,696, filed Jun. 28, 2012. All of these applications are hereby incorporated by reference in their entireties to the extent non inconsistent with the disclosure herein.

BACKGROUND OF INVENTION

Well-defined, periodic nanostructures have received considerable attention since they can serve as useful templates and scaffolds for nanodots, nanowires, magnetic storage media, semiconductors, optical devices, polarizers, and photonic materials. For this purpose, bottom-up approaches have extensively been studied because they can offer an efficient, cost-effective strategy to overcome the technological and economic limits associated with large-scale top-down approaches. The self-assembly of block copolymers (BCPs), one of the most promising candidates for this purpose, have been studied as the sizes, spacings, and morphologies of the nanostructures from the self-assembled BCPs can be simply tuned by varying molecular weight and composition ratio of BCPs and, more importantly, the versatilities in the properties of the blocks can be easily introduced by many well-known chemical techniques.

For some practical applications like polarizers and photonic band gap materials for visible wavelengths, the alternating domain spacing of the self-assembled BCPs usually has to be up to a few hundred nanometers. Thomas and coworkers utilized the partially cross-linked, conventional BCPs to prepare the photonic band gap materials for visible wavelengths, but this normally requires the molecular weight (MW) of BCPs to be extremely large for the applications mentioned above [Y. Kang, J. J. Walish, T. Gorishnyy, E. L. Thomas, Nat. Mater. 2007, 6, 957]. It is noted that, according to the model system for polymers with the MW over the critical entanglement MW, the viscosity of polymers gets higher abruptly as the MW gets larger due to polymer chain-entanglement, which yields a significant kinetic barrier for the effective self-assembly of conventional BCPs with high MW. For this reason, the defects might not be able to be effectively annihilated even upon longer annealing time due to the entanglement, and there could be degradation of polymer chains upon thermal treatment due to significantly increased annealing temperature and time to overcome the kinetic barrier.

Brush polymers (also called comb or graft polymers) are grafted polymers with both relatively high MW and significantly dense and regularly spaced side brush chains attached to the backbone. Due to the significant steric hindrance between densely grafted side brush chains, brush polymers have a highly extended backbone and exhibit a reduced degree of chain-entanglement compared to conventional polymers. Therefore, it is often favorable for brush polymers to self-assemble into well aligned and ordered nanostructures even though the MW of brush polymers is relatively high. There are three general methods to make brush polymers. In the "grafting from" approach, a macro-initiator backbone is first synthesized but there are limitations in the efficiency of its initiation and conversion of monomers. The "grafting onto" method, where the side chains and the backbone are separately synthesized and then coupled together, have difficulties in obtaining complete grafting due to increasing steric hindrance and the subsequent purification of unreacted brush side chains can be problematic. In the "grafting through" method, which is also called the "Macromonomer (MM) approach" the side chains are synthesized with a polymerizable end group which is subsequently polymerized. This approach has many advantages over those 'graft from' or 'graft onto' approaches, but still contains drawbacks like not being able to obtain high MW and/or narrow polydispersity index (PDI). Recently, Grubbs and coworkers successfully reported a novel ring-opening metathesis polymerization (ROMP) exploiting the high ring strain of norbornene monomer and the high activity of Ru-based olefin metathesis catalyst to synthesize brush polymers with ultra-high MW, narrow PDI, and well-defined, structural architectures [see, Y. Xia, B. D. Olsen, J. A. Kornfield, R. H. Grubbs, J. Am. Chem. Soc. 2009, 131, 18525]. It is noted that, when two different brush side chains, where the difference in polymer interaction parameters is large enough to induce microphase segregation, are used to prepare blocky or random type of brush polymers with ultra-high MW, one, two, or three dimensionally periodic nanostructures with extremely large feature sizes can be achieved, due to the significantly reduced degree of entanglements.

While BCPs have been previously used to make periodic dielectric media, the use of brush copolymers has not been extensively studied before now. There have been a couple of observations made in past publications. Bowden et al. reported in 2007 that they observed one of their block copolymers, that was combined of one grafted block and one linear block, reflecting blue light (and transmitting yellow light) and upon swelling with solvent, as is common with linear polymers, they were able to observe a red color. That system was still limited by the high degree of polymerization (≈450:2000) of the graft:linear block required to observe this optical property [see, M. B. Runge, N. B. Bowden, J. Am. Chem. Soc. 2007, 129, 10551]. Rzayev reported in 2009 that one of his brush block copolymers appeared to reflect blue light indicating interaction with visible light [see, J. Rzayev, Macromolecules 2009, 42, 2135]. In 2009 we noted that we saw one of our brush block copolymers reflect green light but no further analysis or discussion was made apart from that simple observation [see, Y. Xia, B. D. Olsen, J. A. Kornfield, R. H. Grubbs, J. Am. Chem. Soc. 2009, 131, 18525].

It will be apparent from the foregoing description that block copolymer materials exhibiting useful physical, chemical and optical properties are useful for a range of applications including photonics, optoelectronics, and molecular templates and scaffolding. Specifically block copolymer materials are needed that are capable of efficient self-assembly to generate useful periodic structures with domain lengths in the nanometer range and exhibiting optical functionality in the visible and NIR regions of the electromagnetic spectrum.

SUMMARY OF THE INVENTION

The invention provides a class of block copolymers having a plurality of chemically different blocks, at least a portion of which incorporating polymer side chain groups having a helical secondary structure. Incorporation of polymer chain chains having helical secondary structure in polymer blocks of some brush block copolymers of the invention significantly inhibits chain entanglement and, thus, the present block copolymers provide a class of polymers capable of efficient molecular self-assembly to supramolecular structures under non-stringent conditions, for example, via solvent evaporation or the application of an external pressure under ambient conditions. Incorporation of a polymer block comprising polymer side chain groups having helical secondary structure in some of the block copolymers the invention provides a means of imparting steric properties resulting in an extended or elongated polymer backbone configuration allowing for rapid self-assembly to stacked lamellae of alternating layers of block-copolymer components. Brush block copolymers of some embodiments are characterized by high molecular weights (e.g., >1000 kDa) and a polydispersity index less than or equal to 3.

Brush block copolymers incorporating a block comprising polyisocyanate polymer side chains, for example, are capable of generating a range of structures via self-assembly, such as periodic nanostructures and microstructures providing photonic band gap materials exhibiting useful optical properties in the ultra-violet, visible, and infrared regions of the electromagnetic spectrum. The invention also provides structures generated by self-assembly of polymer blends including at least one block copolymer component, such as a brush block polymer or wedge-type block polymer. Blending can be used to modify the domain size or morphology of the nanostructured material. The invention provides, for example, periodic nanostructures and microstructures generated by self-assembly of polymer blends comprising a mixture of at least two different polymers including a block copolymer component, such as a brush block copolymer. Structures of certain embodiments, for example, exhibit optical properties, such as reflectance and transmission, which are selectively tunable from the ultra-violet, through visible, and into the IR regions of the electromagnetic spectrum by varying the relative amounts and/or compositions of polymer components of a polymer blend.

The present invention also provides methods of making and using block copolymers and methods of making and using self-assembled structures comprising block copolymers. Compositions and materials of the invention exhibit properties supporting a range of applications including IR-reflecting paints, UV-protective coatings, molecular templates, catalysis support, optical coating, drug delivery among others. Methods of the invention including methods of making and using photonic band gaps materials.

In an aspect, the invention provides a block copolymer comprising: (i) a first polymer block comprising at least 10 first repeating units; wherein each of the first repeating units of the first polymer block comprises a first polymer backbone group directly or indirectly covalently linked to a first polymer side chain group having a helical secondary structure, wherein each of the first polymer side chain groups of the first polymer block independently comprises a number of repeating units greater than or equal to 10; and (ii) a second polymer block comprising at least 10 second repeating units; wherein each of the second repeating units of the second polymer block comprises a second polymer backbone group directly or indirectly covalently linked to a second polymer side chain group that is different than the first polymer side chain group or a first wedge group; wherein the first and second repeating units are directly or indirectly covalently linked along a backbone of the block copolymer. In an embodiment, the first polymer block comprises a plurality of first polymer side chain groups and the second polymer block comprise a plurality of second polymer side chain groups having a composition different than the first polymer side chain groups. In an embodiment, the first polymer block comprises a plurality of first polymer side chain groups and the second polymer block comprise a plurality of wedge groups having a composition different than the first polymer side chain groups. In an embodiment, the first polymer side chain groups of the first polymer block independently comprises a number of repeating units greater than or equal to 30; and optionally for some applications greater than or equal to 50; and optionally for some applications greater than or equal to 100.

In an embodiment, the polymer side chain groups of the first polymer block have the same chemical composition, number of repeating units and/or molecular weight. In an embodiment, the polymer side chain groups of the second polymer block have the same chemical composition, number of repeating units and/or molecular weight. In an embodiment, the wedge groups of the second polymer block have the same chemical composition and/or molecular weight.

Block copolymers of this aspect may comprise brush block copolymers including wedge block containing brush block copolymers. In an embodiment, for example, the block copolymer of this aspect comprises a brush block copolymer, for example, having at least two chemically different polymer blocks, such as at least two polymer blocks comprising polymer side chain groups having different chemical compositions or a combination of polymer side chain-containing polymer block(s) and wedge-containing polymer block. In an embodiment, for example, a block copolymer of the invention comprises 10 to 2000 of the first repeating units and 10 to 2000 of the second repeating units, optionally for some embodiments 100 to 2000 of the first repeating units and 100 to 2000 of the second repeating units and optionally for some embodiments 500 to 2000 of the first repeating units and 500 to 2000 of the second repeating units. In an embodiment, for example, a block copolymer of this aspect comprises 50 to 5000 repeating units, optionally for some applications 200 to 2000 repeating units. In an embodiment, the ratio of the number of first repeating units of the first polymer block to the second repeating units of the second polymer block is selected over the range of 0.005 to 200, and optionally for some application selected over the range of 0.1 to 10. In an embodiment, for example, a block copolymer of the invention has a molecular weight selected from the range of 100,000 Da up to 30,000,000 Da, optionally for some embodiments 500,000 Da up to 30,000,000 Da; and optionally for some embodiments 1,000,000 Da up to 20,000,000 Da.

The invention includes block copolymers comprising blocks having the same or different sizes, for example, block copolymers wherein first and second polymer blocks are the same length, or alternatively wherein the first polymer block is larger than the second polymer block, or alternatively wherein the second polymer block is larger than the first polymer block. In an embodiment, the first polymer block and/or the second polymer block of the block copolymers provide steric interactions and/or bulk that enforces the rigidity of the backbone, for example, resulting in an extended polymer backbone configuration. Block copolymers of the invention may further comprises additional blocks directly or indirectly linked to the first polymer block and/or the second polymer block, such as one or more additional wedge-group containing blocks, one or more additional polymer side chain-containing blocks and/or one or more additional wedge-group containing blocks and one or more additional polymer side chain-containing blocks. In an embodiment, for example, a block copolymer of the invention comprises one, two or three additional polymer blocks directly or indirectly covalently linked along the backbone of the block copolymer. The invention provides diblock copolymers, triblock copolymers, tetra block copolymers and higher block copolymers.

In an embodiment, for example, a block copolymer of the invention is further characterized by a size scale, such as a length scale. In an embodiment, for example, a size (R) of the copolymer increases substantially linearly with molecular weight (MW) of the block copolymer pursuant to the expression (E1) wherein 0.85<x<1:

$$R \propto MW^x \tag{E1}$$

In an embodiment, for example, a block copolymer of the invention is characterized by expression (E1) wherein x is greater than or equal to 0.90. In an embodiment, for example, the size (R) of the block copolymer corresponds to a length of the block copolymer. In an embodiment, for example, the size (R) of the block copolymer corresponds to a domain length or route mean square radius (RMSR) of a supramolecular assembly of a plurality of the block copolymers.

In an embodiment, for example, a block copolymer of the invention has the formula (FX1a), (FX1b), (FX1c) or (FX1d):

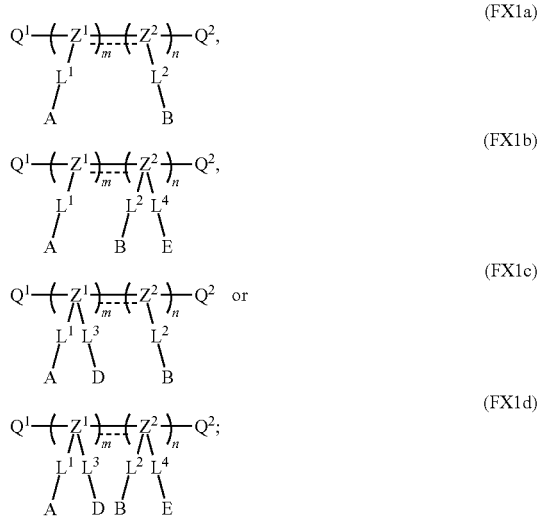

wherein: $Z^1$ is the first polymer backbone group and $Z^2$ is the second polymer backbone group; $Q^1$ is a first backbone terminating group and $Q^2$ is a second backbone terminating group; $L^1$ is a first linking group, $L^2$ is a second linking group, $L^3$ is a third linking group and $L^4$ is a fourth linking group; A is the first polymer side chain group having the helical secondary structure; B is the second polymer side chain group or the first wedge group; each of E and D is independently a polymer side chain group or a wedge group; and each of n and m is independently an integer selected from the range of 20 to 2000. In an embodiment, for example, the invention provides a block copolymer having formula (FX1a-FX1d) wherein the ratio of m to n is selected from the range of 0.1 to 10, and optionally for some embodiments 0.5 to 2. In an embodiment, for example, the invention provides a block copolymer having formula (FX1a-FX1d) m is greater than or equal to 100 and wherein n is greater than or equal to 100. In an embodiment, for example, the invention provides a block copolymer having formula (FX1a-FX1d) wherein m is an integer selected from the range of 20 to 2000 and n is an integer selected from the range of 20 to 2000, and optionally for some embodiments wherein m is an integer selected from the range of 100 to 2000, optionally 500 to 2000, and n is an integer selected from the range of 100 to 2000, optionally 500 to 2000. In an embodiment, for example, the invention provides a block copolymer having formula (FX1a-FX1d), wherein m is greater than or equal to 100 and wherein n is greater than or equal to 100. In an embodiment, for example, the invention provides a block copolymer having formula (FX1a-FX1d), wherein the ratio of m to n is selected from the range of 0.1 to 10.

Block copolymers of the invention, such as brush block copolymers, may incorporate a broad range of polymer backbone groups, including polymer backbone groups capable of assuming an extended or elongated backbone configuration. In an embodiment, for example, the first polymer side chain group having the helical secondary structure, the second polymer side chain group, the first wedge group or any combination of these provides steric interactions within the block copolymer resulting in the backbone of the block copolymer being an extended backbone. In an embodiment, the invention provides a block copolymer having formula (FX1a-FX1d), wherein $Z^1$ and $Z^2$ are same polymer backbone group, for example, providing blocks that differ via the composition of the polymer side chain groups and/or wedge groups linked to the polymer backbone group. In an embodiment, the invention provides a block copolymer having formula (FX1a-FX1d), wherein $Z^1$ and $Z^2$ are not the same polymer backbone group, for example, providing first and second polymer blocks that differ via the composition of the polymer side chain groups and/or wedge groups in addition to the first and second polymer blocks having different polymer backbone groups.

In an embodiment, the invention provides a block copolymer wherein the first polymer backbone groups and/or second polymer backbone groups are obtained from a ring opening metathesis polymerization (ROMP) reaction. In an embodiment, the invention provides a block copolymer wherein the first polymer block and the second polymer block are directly covalently linked along the backbone. In an embodiment, the invention provides a block copolymer wherein the first polymer block and the second polymer block are indirectly covalently linked along the backbone. In an embodiment, the invention provides a block copolymer having formula (FX1a-FX1d), wherein $Z^1$ and $Z^2$ are derived from polymerization of a monomer selected from the group consisting of a substituted or unsubstituted norbornene, olefin or cyclic olefin, such as norbornene, norbornene anhydride, cyclooctene, cyclopentadiene, styrene, ester, ether, thioether, amine, imide, halocarbon chain (perfluoro, etc.) and acrylate In an embodiment, the invention provides a block copolymer having the formula (FX2a), (FX2b), (FX2c), (FX2d), (FX2e), (FX2f) or (FX2g),

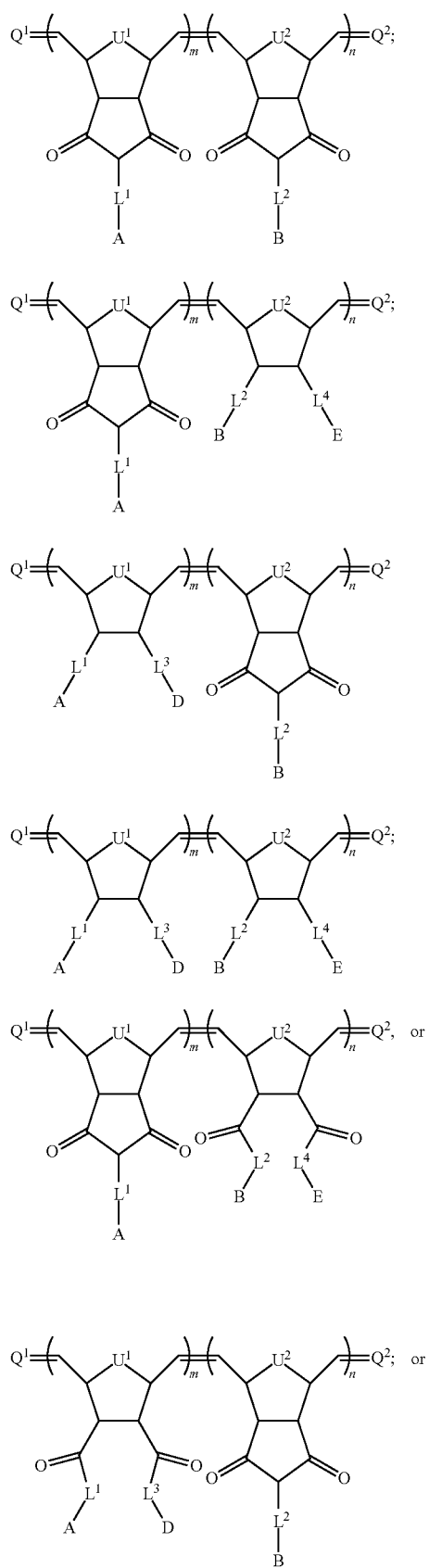
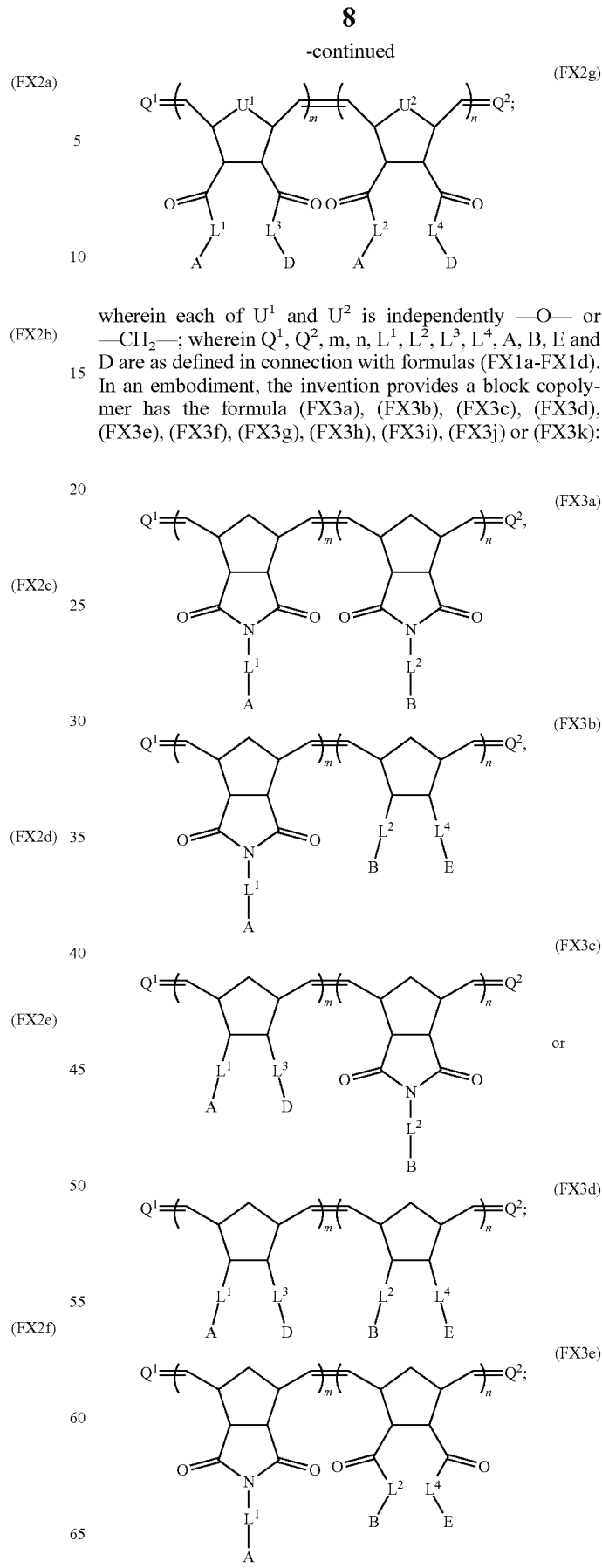
wherein each of $U^1$ and $U^2$ is independently —O— or —CH$_2$—; wherein $Q^1$, $Q^2$, m, n, $L^1$, $L^2$, $L^3$, $L^4$, A, B, E and D are as defined in connection with formulas (FX1a-FX1d). In an embodiment, the invention provides a block copolymer has the formula (FX3a), (FX3b), (FX3c), (FX3d), (FX3e), (FX3f), (FX3g), (FX3h), (FX3i), (FX3j) or (FX3k):

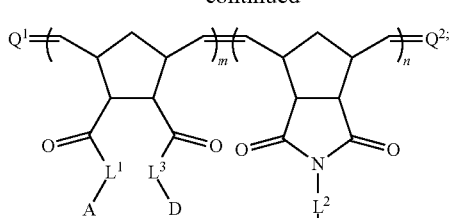
(FX3f)

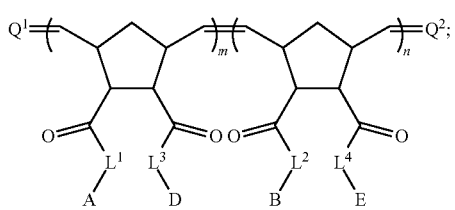
(FX3g)

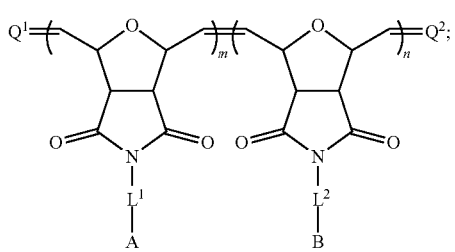
(FX3e)

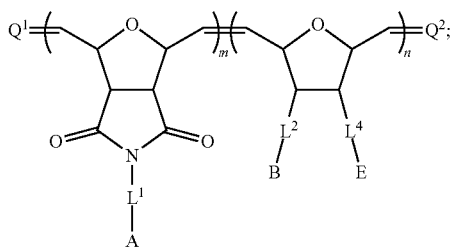
(FX3f)

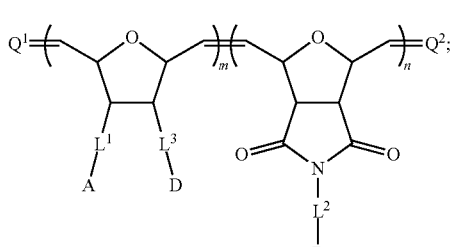
(FX3g)

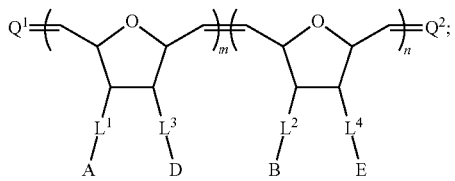
(FX3h)

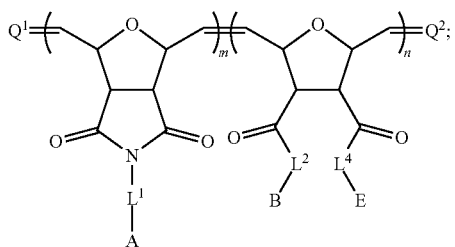
(FX3i)

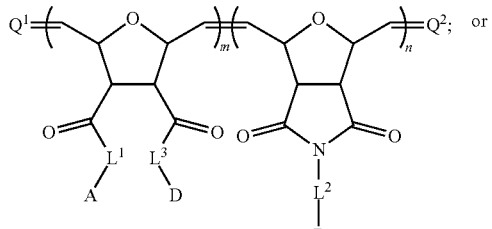
(FX3j)

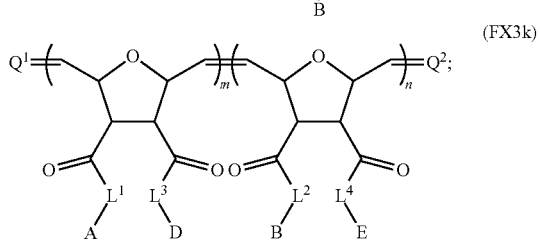
(FX3k)

wherein $Q^1$, $Q^2$, m, n, $L^1$, $L^2$, $L^3$, $L^4$, A, B, E and D are as defined in connection with formulas (FX1a-FX1d). In an embodiment, for example, the invention provides a block copolymer having any of formula (FX2a-FX3k) wherein the ratio of m to n is selected from the range of 0.1 to 10. In an embodiment, for example, the invention provides a block copolymer having any of formula (FX2a-FX3k) wherein m is an integer selected from the range of 20 to 2000 and n is an integer selected from the range of 20 to 2000.

The composition and physical properties of the first polymer block and second polymer blocks of block copolymers are important for providing materials exhibiting beneficial chemical, physical and optical properties. Use of a first polymer block and a second polymer block having complementary compositions and properties is beneficial. Particularly useful for some application are use of a first polymer block and a second polymer block that are sufficiently chemically dissimilar and also capable of imparting steric properties to enforce the polymer backbone to provide for efficient self-assembly to form useful supramolecular structures, including lamellar structures.

The invention includes polymer materials comprising a range of polymer side chain groups having a helical secondary structure. In an embodiment, for example, each of the first polymer side chain groups of the first polymer block has a rigid-rod helical secondary structure and/or are large enough to result in the backbone of the block copolymer being an extended backbone. In an embodiment, for example, each of the first polymer side chain groups of the first polymer block has a molecular weight greater than or equal to 500 Da, optionally for some embodiments greater than or equal to 1000 Da and optionally for some embodiments greater than or equal to 2000 Da. In an embodiment, for example, each of the first polymer side chain groups of the first polymer block has a molecular weight selected from the range of 500 Da to 10,000 Da, and optionally for some embodiments selected from the range of 1000 Da to 10,000 Da, and optionally for some embodiments selected from the range of 2000 Da to 10,000 Da. In an embodiment, for example, each of the first polymer side chain groups of the first polymer block is characterized by a number of repeating units selected from the range of 30 to 2000. In an embodiment, for example, the first polymer side chain groups of the first polymer block are characterized by polydispersity index less than or equal to 3. In an embodiment, for example, the first polymer side chain groups of the first polymer block comprise repeating units obtained via anionic polymerization, cationic polymerization, free radical polymerization, group transfer polymerization, or ring-opening polymerization. In an embodiment, for example, the first polymer side chain groups of the first polymer block are selected from the group consisting of an unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, and polychloral group.

In an embodiment, each of the first polymer side chain groups of the first polymer block has any of the formula (FX4a), (FX4b), (FX4c), (FX4d), (FX4e), (FX4f) or (FX4g):

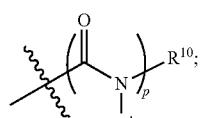
(FX4a)

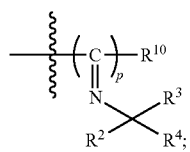
(FX4b)

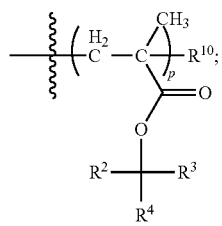
(FX4c)

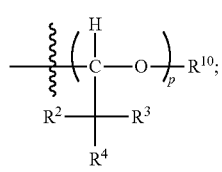
(FX4d)

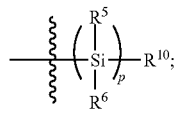
(FX4e)

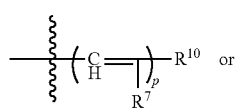
(FX4f)

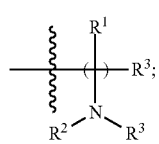
(FX4g)

wherein each of $R^1$-$R^7$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and each of $R^{10}$ and $R^{11}$ is independently a polymer side chain terminating group and wherein p is an integer selected from the range of 30 to 2000. In an embodiment, for example, the first polymer side chain groups of the polymer block have any one of formula (FX4a-FX4g) wherein each $R^{10}$ is independently hydrogen, $C_1$-$C_6$ alkyl, $C_3$-$C_6$ cycloalkyl, or $C_5$-$C_6$ aryl; and optional wherein each $R^{10}$ is independently hydrogen or $C_1$-$C_3$ alkyl. In an embodiment, for example, the first polymer side chain groups of the polymer block have any one of formula (FX4a-FX4g) wherein each of $R^1$-$R^7$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl; and optional wherein each of $R^1$-$R^7$ is independently a hydrogen, $C_1$-$C_{10}$ alkyl, $C_3$-$C_{10}$ cycloalkyl, $C_5$-$C_{10}$ aryl, $C_5$-$C_{10}$ heteroaryl, or $C_1$-$C_{10}$ acyl.

In an embodiment, the invention provides a block copolymer having the formula (FX5a) or (FX5b);

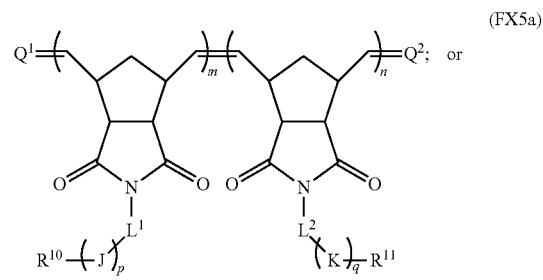
(FX5a)

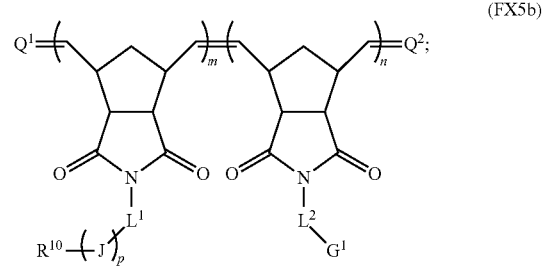
(FX5b)

wherein J is a repeating group of the first polymer side chain group, K is a repeating group of the second polymer side chain group, $G^1$ is the first wedge group; each of $R^{10}$ and $R^{11}$ is independently a polymer side chain terminating group; and each of p and q is independently an integer selected from the range of 30 to 2000; and wherein $Q^1$, $Q^2$, m, and n are as defined in connection with formula (FX1a-FX1d). In an embodiment, for example, the invention provides a block copolymer having the formula (FX9a) or (FX9b):

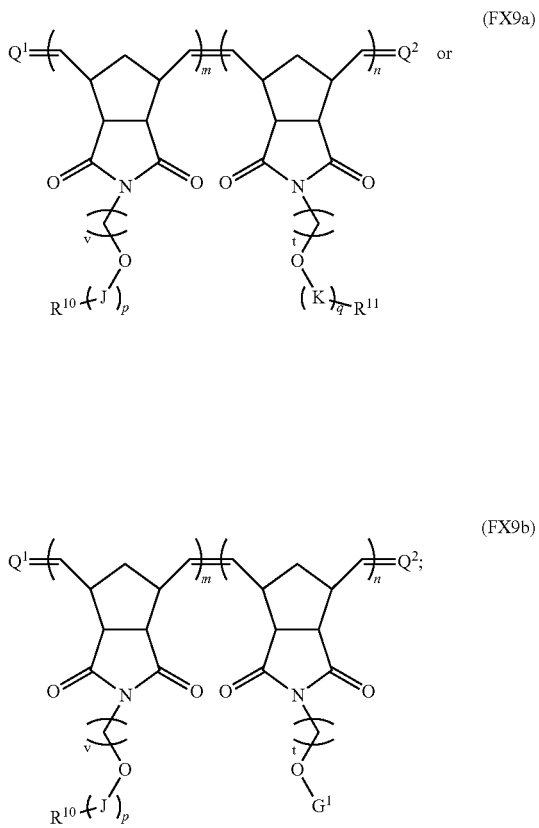

(FX9a)

(FX9b)

wherein each of t and v are independently an integer selected from the range of 1 to 10, and optionally 1 to 5 for some embodiments; and wherein and wherein J, K, p, q, $R^{11}$, $R^{10}$, $G^1$, $Q^1$, $Q^2$, m, and n are as defined in connection with formula (FX1a-FX5b).

In an embodiment, for example, the invention provides a block copolymer having any of formulas (FX5a), (FX5b), (FX9a) and (FX9b), wherein J is a group corresponding to an unsubstituted or substituted ioscyanate group, methacrylate group, acrylate group, acrylamide group, methacrylamide group, quinoxaline group, guanidine group, silane group, acetylene group, amino acid group, or chloral group. In an embodiment, for example, the invention provides a block copolymer having any of formulas (FX5a), (FX5b), (FX9a) and (FX9b), wherein K is a group corresponding to an unsubstituted or substituted isocyanate group, methacrylate group, acrylate group, acrylamide group, methacrylamide group, quinoxaline group, guanidine group, silane group, acetylene group, amino acid group, chloral group, lactide group, styrene group, acrylate group, tert-butyl, siloxane group, dimethylsiloxane group, n-butyl acrylate group, ethylene glycol group, ethylene oxide group, ethylene group, propylene group, tetrafluoroethylene group, or vinyl chloride group. In an embodiment, for example, the invention provides a block copolymer having any of formula formulas ((FX5b), (FX5b), (FX9a) and (FX9b), wherein each $R^{10}$ and $R^{11}$ is independently hydrogen, $C_1$-$C_6$ alkyl, $C_3$-$C_6$ cycloalkyl, or $C_5$-$C_6$ aryl; and optional wherein each $R^{10}$ is independently hydrogen or $C_1$-$C_3$ alkyl.

In an embodiment, the invention provides a block copolymer having the formula (FX6a) or (FX6b);

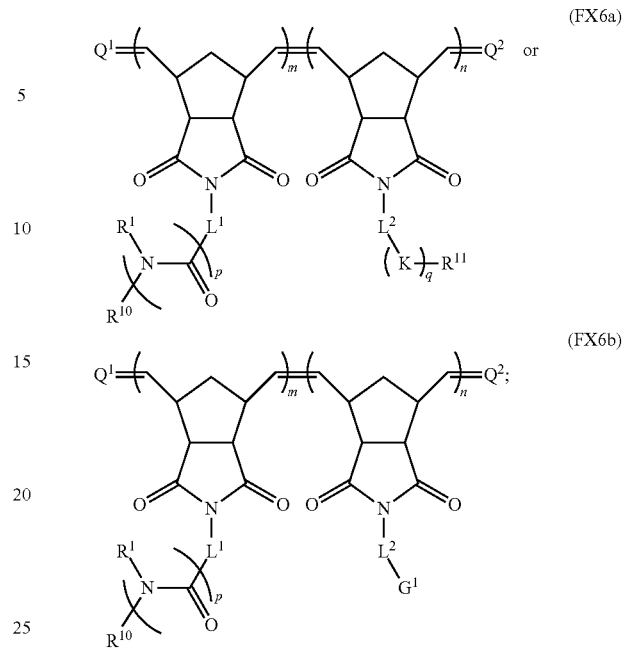

wherein $R^1$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, $-CO_2R^{30}$, $-CONR^{31}R^{32}$, $-COR^{33}$, $-SOR^{34}$, $-OSR^{35}$, $-SO_2R^{36}$, $-OR^{37}$, $-SR^{38}$, $-NR^{39}R^{40}$, $-NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and wherein $G^1$, $Q^1$, $Q^2$, m, n, $W^1$, $R^{10}$, $R^{11}$, p and q are as defined in connection with formula (FX1a-FX5b). In an embodiment, for example, the invention provides a block copolymer having formula (FX6a) or (FX6b), wherein each $R^{10}$ and $R^{11}$ is independently hydrogen, $C_1$-$C_6$ alkyl, $C_3$-$C_6$ cycloalkyl, or $C_5$-$C_6$ aryl; and optional wherein each $R^{10}$ is independently hydrogen or $C_1$-$C_3$ alkyl. In an embodiment, for example, the first polymer side chain groups of the polymer block have any one of formula (FX6a-FX6b) wherein each of $R^1$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl; and optional wherein each of $R^1$-$R^7$ is independently a hydrogen, $C_1$-$C_{10}$ alkyl, $C_3$-$C_{10}$ cycloalkyl, $C_5$-$C_{10}$ aryl, $C_5$-$C_{10}$ heteroaryl, or $C_1$-$C_{10}$ acyl.

In an embodiment, the invention provides a block copolymer having the formula (FX7):

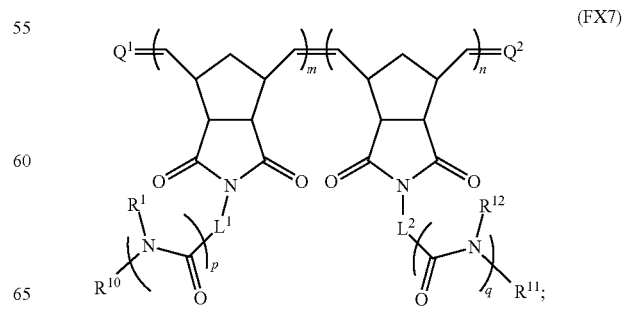

wherein $R^{12}$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and wherein $R^1$ and $R^{12}$ are different groups; and wherein $Q^1$, $Q^2$, m, n, $R^{10}$, $R^{11}$, p and q are as defined in connection with formula (FX1a-FX6b). In an embodiment, for example, the invention provides a block copolymer having formula (FX7), wherein $R^1$ is a $C_1$-$C_{30}$ alkyl and $R^{12}$ is a $C_5$-$C_{30}$ aryl. In an embodiment, for example, the invention provides a block copolymer having formula (FX7), wherein each $R^{10}$ and $R^{11}$ is independently hydrogen, $C_1$-$C_6$ alkyl, $C_3$-$C_6$ cycloalkyl, or $C_5$-$C_6$ aryl; and optional wherein each $R^{10}$ is independently hydrogen or $C_1$-$C_3$ alkyl.

In an embodiment, the invention provides a block copolymer having the formula (FX8a) or (FX8b):

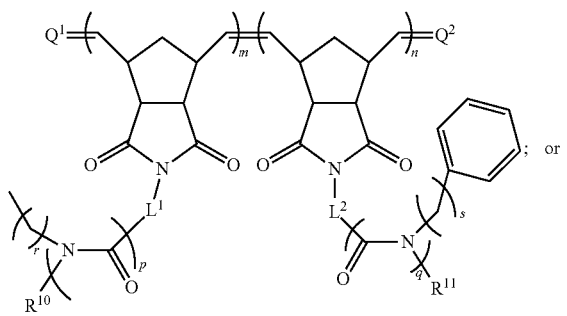

(FX8a)

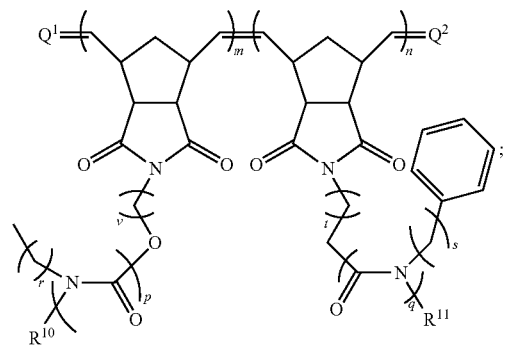

(FX8b)

wherein each of r, s, t and v are independently an integer selected from the range of 1 to 10; and wherein $Q^1$, $Q^2$, m, n, $R^{10}$, $R^{11}$, p and q are as defined in connection with formula (FX1-FX7).

In an embodiment, the second polymer block of the block copolymer comprises a second polymer side chain group, optionally having a helical secondary structure. In an embodiment, for example, the second polymer side chain groups of the second polymer block are large enough to result in the backbone of the block copolymer being an extended backbone. In an embodiment, for example, each of the second polymer side chain groups of the second polymer block has a rigid-rod helical secondary structure. In an embodiment, for example, each of the second polymer side chain groups of the second polymer block has a molecular weight greater than or equal to 500 Da, optionally for some embodiments greater than or equal to 1000 Da; and optionally for some embodiments greater than or equal to 2000 Da. In an embodiment, for example, each of the second polymer side chain groups of the second polymer block has a molecular weight selected from the range of 500 Da to 10,000 Da, optionally for some embodiments selected from the range of 1000 Da to 10,000 Da; and optionally for some embodiments selected from the range of 2000 Da to 10,000 Da. In an embodiment, for example, each of the second polymer side chain groups of the second polymer block is characterized by a number of repeating units selected from the range of 10 to 500, and optionally for some embodiments 20-500; and optionally for some embodiments 100-500. In an embodiment, for example, the second polymer side chain groups of the second polymer block are characterized by polydispersity index less than or equal to 3.

In an embodiment, for example, the second polymer side chain groups of the second polymer block comprise repeating units obtained via anionic polymerization, cationic polymerization, free radical polymerization, group transfer polymerization, or ring-opening polymerization. In an embodiment, for example, the second polymer side chain groups of the second polymer block is an unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, polychloral group, polylactide group, polystyrene group, polyacrylate group, poly tert-butyl acrylate group, polymethyl methacrylate group, polysiloxane group, polydimethylsiloxane group, poly n-butyl acrylate group, polyethylene glycol group, polyethylene oxide group, polyethylene group, polypropylene group, polytetrafluoroethylene group, or polyvinyl chloride group.

In an embodiment, the second polymer group comprises wedge groups indirectly or directly linked to the polymer backbone. In an embodiment, for example, the first wedge group of the second polymer block is characterized by at least two branch points each terminating in an independent terminating branch moiety comprising at least 4 atoms. In an embodiment, for example, first wedge group of the second polymer block is characterized by at least three branch points each terminating in an independent terminating branch moiety comprising at least 10 atoms. In an embodiment, for example, each of the terminating branch moieties of the first wedge group independently has a number of atoms selected from the range of 10 to 200. In an embodiment, for example, the first wedge group of the second polymer block has a molecular weight selected over the range of 15 Da to 1500 Da, optionally for some applications selected over the range of 500 Da to 1000 Da. In an embodiment, for example, first wedge group of the second polymer block has a molecular weight greater than or equal to 50 Da; optionally greater than or equal to 500 Da.

In an embodiment, for example, the first wedge group of the second polymer block comprises a $C_2$-$C_{30}$ alkyl, $C_3$-$C_{30}$ cycloalkyl, $C_5$-$C_{30}$ aryl, $C_5$-$C_{30}$ heteroaryl, $C_2$-$C_{30}$ ester, $C_2$-$C_{30}$ ether, $C_2$-$C_{30}$ thioether, $C_2$-$C_{30}$ amine, $C_2$-$C_{30}$ imide, $C_2$-$C_{30}$ halocarbon chain, $C_2$-$C_{30}$ perfluorocarbon or $C_2$-$C_{30}$ polyethylene glycol. In an embodiment, for example, the first wedge group of the second polymer block comprises a $C_5$-$C_{20}$ alkyl, $C_5$-$C_{20}$ cycloalkyl, $C_5$-$C_{20}$ aryl, $C_5$-$C_{20}$ heteroaryl, $C_5$-$C_{20}$ ester, $C_5$-$C_{20}$ ether, $C_5$-$C_{20}$ thioether, $C_5$-$C_{20}$ amine, $C_5$-$C_{20}$ imide, $C_5$-$C_{20}$ halocarbon chain, $C_5$-$C_{20}$ perfluorocarbon or $C_5$-$C_{20}$ polyethylene glycol. In an embodiment, for example, the first wedge group of the second polymer block comprises an aromatic or alicyclic ring or fused ring structure. In an embodiment, for example, the first wedge group of the second polymer block comprises a group derived from a substituted or unsubstituted adamantane, silsesquioxane, norbornane, terpenoid, polyethylene glycol, or borneol.

In an embodiment, for example, the first wedge group of the second polymer block has the formula (W1), (W2) or (W3):

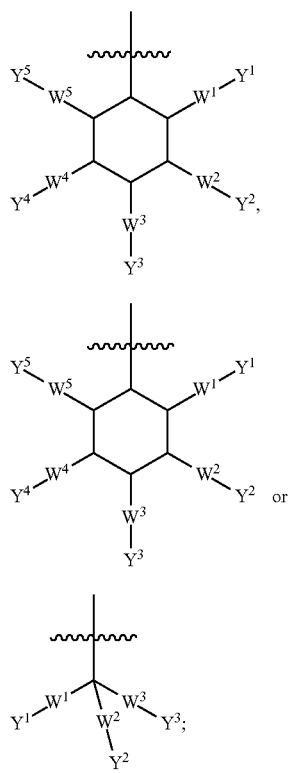

wherein each of $W^1$-$W^5$ is independently a linking group; and each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently H, $C_5$-$C_{10}$ aryl or $C_1$-$C_{10}$ alkyl. In an embodiment, for example, the first wedge group of the second polymer block has the formula (W1), (W2) or (W3), wherein each of $W^1$-$W^5$ is independently a single bond, —$(CH_2)_q$—, —$(CH_2)_qO(CH_2)_r$—, —$(CH_2)_qS(CH_2)_r$—, —$(CH_2)_qO_2(CH_2)_r$—, —$(CH_2)_qSO(CH_2)_r$—, —$(CH_2)_qSO_2(CH_2)_r$—, —$(CH_2)_qSO_3(CH_2)_r$—, —$(CH_2)_qOSO_2(CH_2)_r$—, —$(CH_2)_qNR^{19}(CH_2)_r$—, —$(CH_2)_qCO(CH_2)_r$—, —$(CH_2)_qCOO(CH_2)_r$—, —$(CH_2)_qOCO(CH_2)_r$—, —$(CH_2)_qOCOO(CH_2)_r$—, —$(CH_2)_qCONR^{20}(CH_2)_r$—, —$(CH_2)_qNR^{21}CO(CH_2)_r$—, —$(CH_2)_qOCONR^{22}(CH_2)_r$—, —$(CH_2)_qNR^{23}COO(CH_2)_r$—, or —$(CH_2)_qNR^{24}CONR^{25}(CH_2)_r$—; wherein each of $R^{19}$-$R^{25}$ is independently hydrogen or $C_1$-$C_5$ alkyl; and wherein each of q and r is independently an integer selected from the range of 0 to 10. In an embodiment, for example, the first wedge group of the second polymer block has the formula (W1), (W2) or (W3), wherein each of $W^1$-$W^5$ is independently a single bond, —$(CH_2)_q$— or —$(CH_2)_qO(CH_2)_r$—. In an embodiment, for example, the first wedge group of the second polymer block has the formula (W1), (W2) or (W3), wherein each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, or $C_1$-$C_{30}$ acyl; and optional for some applications a hydrogen, $C_1$-$C_{30}$ alkyl, $C_3$-$C_{20}$ cycloalkyl, $C_5$-$C_{20}$ aryl, or $C_5$-$C_{20}$ heteroaryl.

In an embodiment, for example, the first wedge group of the second polymer block has the formula (W4), (W5), (W6), (W7), (W8), (W9) or (W10):

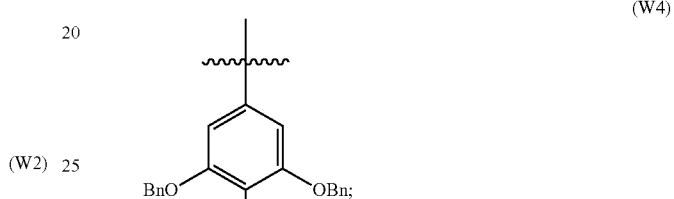

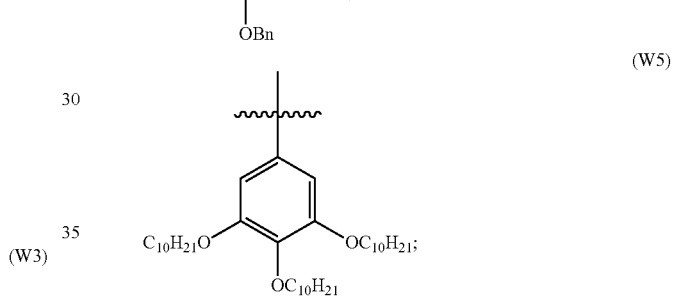

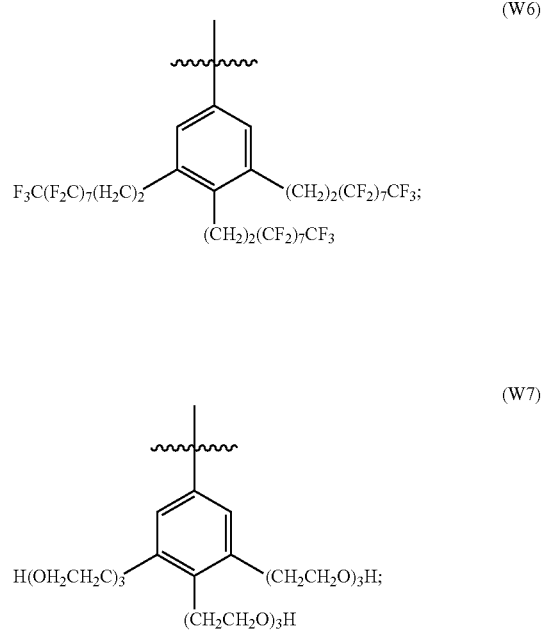

(W8)

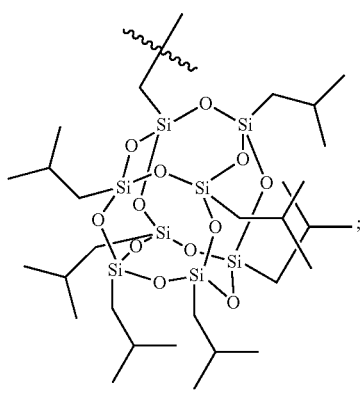

(W9)

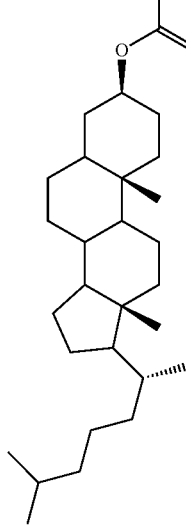 ; or (W10)

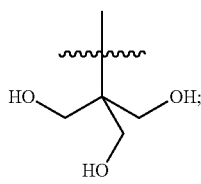

wherein Bn is a benzyl group.

A wide range of linking groups are useful in the block copolymers of the invention, for example, for linking wedge groups and/or polymer side chain groups to the polymer backbone groups. In some embodiments, for example, direct covalent linking is provided by a single bond between two linked groups, such as wedge groups and/or polymer side chain groups and a polymer backbone groups. In some embodiments, for example, indirect covalent linking is provided by a linking moiety provided between two linked groups, such as wedge groups and/or polymer side chain groups and a polymer backbone groups. In an embodiment, for example, the invention provides a block copolymer of any of formula (FX1a)-(FX10h), wherein each of $L^1$, $L^2$, $L^3$ and $L^4$ is independently a single bond, $-(CH_2)_q-$, $-(CH_2)_qO(CH_2)_r-$, $-(CH_2)_qS(CH_2)_r-$, $-(CH_2)_qO_2(CH_2)_r-$, $-(CH_2)_qSO(CH_2)_r-$, $-(CH_2)_qSO_2(CH_2)_r-$, $-(CH_2)_qSO_3(CH_2)_r-$, $-(CH_2)_qOSO_2(CH_2)_r-$, $-(CH_2)_qNR^{19}(CH_2)_r-$, $-(CH_2)_qCO(CH_2)_r-$, $-(CH_2)_qCOO(CH_2)_r-$, $-(CH_2)_qOCO(CH_2)_r-$, $-(CH_2)_qOCOO(CH_2)_r-$, $-(CH_2)_qCONR^{20}(CH_2)_r-$, $-(CH_2)_qNR^{21}CO(CH_2)_r-$, $-(CH_2)_qOCONR^{22}(CH_2)_r-$, $-(CH_2)_qNR^{23}COO(CH_2)_r-$, or $-(CH_2)_qNR^{24}CONR^{25}(CH_2)_r-$; wherein each of $R^{19}$-$R^{25}$ is independently hydrogen or $C_1$-$C_5$ alkyl; and wherein each of q and r is independently an integer selected from the range of 0 to 10. In an embodiment, for example, the invention provides a block copolymer of any of formula (FX1a)-(FX10h), wherein each of $L^1$, $L^2$, $L^3$ and $L^4$ is independently $C_1$-$C_{10}$ alkylene, $C_3$-$C_{10}$ cycloalkylene, $C_2$-$C_{10}$ alkenylene, $C_3$-$C_{10}$ cycloalkenylene, $C_2$-$C_{10}$ alkynylene, ethenylene, ethynylene, or phenylene. In an embodiment, for example, the invention provides a block copolymer of any of formula (FX1a)-(FX10h), wherein each of $L^1$, $L^2$, $L^3$ and $L^4$ is independently $C_1$-$C_5$ alkylene. In an embodiment, for example, compositions of the invention comprise one or more linking groups having the formula:

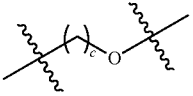

wherein c is an integer selected from the range of 1 to 10.

A wide range of backbone terminating groups are useful in the block copolymers of the invention. In an embodiment, for example, the invention provides a block copolymer of any of formula (FX1a)-(FX10h), wherein each of $Q^1$ and $Q^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $-CO_2R^{30}$, $-CONR^{31}R^{32}$, $-COR^{33}$, $-SOR^{34}$, $-OSR^{35}$, $-SO_2R^{36}$, $-OR^{37}$, $-SR^{38}$, $-NR^{39}R^{40}$, $-NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl. In an embodiment, each of $R^{30}$-$R^{42}$ is independently hydrogen or $C_1$-$C_4$ alkyl.

A wide range of polymer side chain terminating groups are useful in the block copolymers of the invention. In an embodiment, for example, the invention provides a block copolymer of any of formula (FX1a)-(FX10h), wherein each of $R^{10}$ and $R^{11}$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, $-CO_2R^{30}$, $-CONR^{31}R^{32}$, $-COR^{33}$, $-SOR^{34}$, $-OSR^{35}$, $-SO_2R^{36}$, $-OR^{37}$, $-SR^{38}$, $-NR^{39}R^{40}$, $-NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl. In an embodiment, each of $R^{30}$-$R^{42}$ is independently hydrogen or $C_1$-$C_4$ alkyl. In an embodiment, for example, the invention provides a block copolymer of any of formula (FX1a)-(FX10h), wherein each of $R^{10}$ and $R^{11}$ is independently hydrogen, $C_1$-$C_6$ alkyl, $C_3$-$C_6$ cycloalkyl, $C_5$-$C_6$ aryl, $C_5$-$C_6$ heteroaryl, or $C_1$-$C_6$ acyl.

The invention includes block copolymers having more than two polymer blocks, such as block copolymers having three polymer blocks, four polymer blocks or more than four polymer blocks. In some embodiments, the additional polymer blocks comprise wedge groups and/or polymer side chain groups directly or indirectly linked to polymer backbone groups. In some embodiments, the additional polymer blocks comprise the same wedge groups and/or polymer side chain groups as the first and second polymer blocks. Alternatively, the additional polymer blocks comprise the different wedge groups and/or polymer side chain groups as the first and second polymer blocks. Block copolymers having additional polymer blocks are useful for generating a wide range of structures via self-assembly processes.

In an embodiment, for example, a block copolymer of the invention further comprises a third polymer block comprising at least 10 third repeating units; the third polymer block indirectly or directly covalently linked to the first polymer block and the second polymer block along the backbone of the block copolymer; wherein each of the repeating units of the third polymer block comprises a third polymer backbone group covalently linked to a third polymer side chain group or a second wedge group. In an embodiment, for example, a copolymer of the invention comprises 20 to 2000 of the third repeating units, optionally for some embodiments 100 to 2000 of the third repeating units and optionally for some embodiments 500 to 2000 of the third repeating units. In an embodiment, for example, the third polymer block is provided between the first polymer block and the second polymer block; or is provided on a side of the first polymer block opposite to the second polymer block; or is provided on a side of the second polymer block opposite to the first polymer block. In an embodiment, for example, the third polymer backbone group of the third polymer block is the same as the first polymer backbone group of the first polymer block; or wherein the third polymer backbone group of the third polymer block is the same as the second polymer backbone group of the second polymer block, or wherein the third polymer backbone group of the third polymer block is the same as the first polymer backbone group of the first polymer block and the second polymer backbone group of the second polymer block. In an embodiment, for example, the second wedge group of the third polymer block is different from the first wedge group of the second polymer block; or wherein the second wedge group of the third polymer block is different from the first wedge group of the second polymer block; or wherein the third polymer side chain group of the third polymer block is different from the first polymer side chain group of the first polymer block; or wherein the third polymer side chain group of the third polymer block is different from the second polymer side chain group of the second polymer block.

In an embodiment, for example, the invention provides a block copolymer further comprises a fourth polymer block comprising at least 10 fourth repeating units; the fourth polymer block directly or indirectly covalently linked to the first polymer block, the second polymer block and the third polymer block along the backbone of the block copolymer; wherein each of the repeating units of the fourth polymer block comprises a fourth polymer backbone group covalently linked to a fourth polymer side chain group or a third wedge group. In an embodiment, for example, a copolymer of the invention comprises 20 to 2000 of the fourth repeating units, optionally for some embodiments 100 to 2000 of the fourth repeating units and optionally for some embodiments 500 to 2000 of the fourth repeating units. In an embodiment, for example, the fourth polymer block is provided between the first polymer block and the second polymer block; or is provided between the first polymer block and the third polymer block; or is provided between the second polymer block and the third polymer block; or is provided on a side of the first polymer block opposite to the second polymer block; or is provided on a side of the first polymer block opposite to the third polymer block; or is provided on a side of the second polymer block opposite to the first polymer block; or is provided on a side of the second polymer block opposite to the third polymer block. In an embodiment, for example, the fourth polymer backbone group of the fourth polymer block is the same as the first polymer backbone group of the first polymer block; or wherein the fourth polymer backbone group of the fourth polymer block is the same as the second polymer backbone group of the second polymer block; or wherein the fourth polymer backbone group of the fourth polymer block is the same as the third polymer backbone group of the third polymer block; or wherein the fourth polymer backbone group of the fourth polymer block is the same as both the first polymer backbone group of the first polymer block and the second polymer backbone group of the second polymer block; or wherein the fourth polymer backbone group of the fourth polymer block is the same as both the first polymer backbone group of the first polymer block and the third polymer backbone group of the third polymer block; or wherein the fourth polymer backbone group of the fourth polymer block is the same as both the second polymer backbone group of the second polymer block and the third polymer backbone group of the third polymer block; or wherein the fourth polymer backbone group of the fourth polymer block is the same as the first polymer backbone group of the first polymer block, the second polymer backbone group of the second polymer block and the third polymer backbone group of the third polymer block. In an embodiment, for example, the third wedge group of the fourth polymer block is different from the first wedge group of the second polymer block; or wherein the third wedge group of the fourth polymer block is different from the second wedge group of the third polymer block; or wherein the fourth polymer side chain group of the fourth polymer block is different from the first polymer side chain group of the first polymer block; or wherein the fourth polymer side chain group of the fourth polymer block is different from the second polymer side chain group of the second polymer block; or wherein the fourth polymer side chain group of the fourth polymer block is different from the third polymer side chain group of the third polymer block.

In another aspect, the invention provides structures generated from block copolymers and polymer blends comprising block copolymers, for example, structures generated from any of the bock copolymer compositions and/or composition classes described herein, including the disclosed block copolymers and blends thereof. In an embodiment, a structure of the invention is generated via molecular self-assembly, or a similar process, thereby forming a supramolecular assembly comprising a plurality of copolymers of the invention, such as block copolymers and mixtures of block copolymers, polymers, and/or other components, such as one or more solvents, metals, metal oxides, ceramics, semiconductors, oligomers, small molecules (e.g., molecular weight less than 500 Da, optionally less than 100 Da), microparticles, nanoparticles, etc. Structures of this aspect the present invention include microstructures, nanostructures, periodic structures, lamellar structures, photonic crystals, thin film structures and photonic band gap materials.

In an embodiment, the invention provides a structure comprising a supramolecular assembly of a plurality of block copolymers; wherein each of the block copolymers independently comprises: (i) a first polymer block comprising at least 10 first repeating units; wherein each of the first repeating units of the first polymer block comprises a first polymer backbone group directly or indirectly covalently linked to a first polymer side chain group having a helical secondary structure, wherein each of the first polymer side chain groups of the first polymer block independently comprises a number of repeating units greater than or equal to 10; and (ii) a second polymer block comprising at least 10 second repeating units; wherein each of the second repeating units of the second polymer block comprises a second polymer backbone group directly or indirectly covalently linked to a second polymer side chain group that is different than the first polymer side chain group or a first wedge group; wherein the first and second repeating units are directly or indirectly covalently linked along a backbone of the block copolymer. In an embodiment, for example, the structure comprises a plurality of block copolymers independently having any of the formulas (FX1a)-(FX10h), and optionally one or more additives or other components, such as solvent, solvent, ceramic, metal, metal oxide, liquid, silicon, semiconductor and any mixture or combination of these.

In an embodiment, the invention provides a structure comprising a supramolecular assembly of a polymer blend of at least one block copolymer and at least a second component; wherein the polymer blend comprises: (i) a first block copolymer comprising: a first polymer block comprising at least 10 first repeating units; wherein each of the first repeating units of the first polymer block comprises a first polymer backbone group directly or indirectly covalently linked to a first polymer side chain group or a first wedge group; and a second polymer block comprising at least 10 second repeating units; wherein each of the second repeating units of the second polymer block comprises a second polymer backbone group directly or indirectly covalently linked to a second polymer side chain group or second wedge group that is different than the first polymer side chain group and the first wedge group; wherein the first and second repeating units are directly or indirectly covalently linked along a backbone of the block copolymer; and (ii) the second component having a composition that is different from the first block copolymer. As used herein, the expression "having a composition that is different from the first block copolymer" refers to a component that has a different chemical composition, such as having a different number, type and/or arrangement of atoms, different chemical bonds, different molecular weight or any combination of these. In some embodiments, for example, the second component comprises the same moieties or similar moieties as the first block copolymer, however, has a different number of moieties, arrangement of moieties and/or a different molecular weight.

In an embodiment, for example, the second component comprises a homopolymer, a copolymer, an oligomer, a solvent, a metal, a small molecule or particle (e.g., microparticle or nanoparticle). In an embodiment, for example, the second component comprises linear copolymer or a random copolymer. In an embodiment, for example, the second component comprises a second block copolymer, such as a brush block copolymer. First and second polymer blocks of said first block copolymer may comprise any of the polymer side chain groups and/or wedge group described herein. In an embodiment, for example, the second component is a homopolymer, a copolymer, an oligomer, a small molecule, metal or particle. In an embodiment, for example, the polymer blend comprises additional components, such as a third component, fourth component, fifth component or more, which may, or may not, be any combination of the above mentioned components.

In an embodiment, for example, the structure of this aspect of the invention is formed via molecular self-assembly of the block copolymers or a polymer blend to generate the supramolecular assembly. In an embodiment, for example, the structure is formed via thermal annealing, solvent annealing, spin coating, shear alignment, painting, tape casting, co-extrusion, drop casting, spray coating or by the application of an external pressure to block copolymers or a polymer blend of the invention.

In an embodiment, for example, the structure comprises a periodic structure. In an embodiment, for example, the structure comprises a nanostructure or a microstructure. In an embodiment, for example, the structure is characterized by at least one domain having a size greater than or equal to 80 nm, and optionally for some embodiments at least one domain having a size greater than 160 nm. In an embodiment, for example, the domain length corresponds to a periodic feature of the structure, optionally having a length greater than or equal to 80 nm, optionally for some embodiments greater than or equal to 160 nm. In an embodiment, for example, the structure absorbs, scatters or reflects electromagnetic radiation having wavelengths greater than or equal to 400 nm, optionally greater than or equal to 800 nm, such as visible and/or NIR electromagnetic radiation. In an embodiment, the structure is characterized by an optical thickness greater than or equal to 100 nm, and optionally greater than or equal to 200 nm. As used herein, optical thickness is equal to the product of the geometric thickness and the refractive index (e.g. optical thickness=(geometric thickness)×(refractive index).

In an embodiment, for example, the structure comprises a one dimensional, two dimensional or three dimensional photonic crystal. In an embodiment, for example, the structure comprises a photonic band gap material. In an embodiment, for example, the structure comprises a thin film structure. In an embodiment, for example, the block copolymers that make up the structure are characterized by a polydispersity index selected over the range of 1 to 3, optionally for some embodiments selected over the range of 1 to 1.6. In an embodiment, for example, the structure is a stacked lamellar structure. In an embodiment, for example, the structure is characterized by a periodically varying refractive index. In an embodiment, for example, the structure further comprises an additive selected from the group consisting of a ceramic, metal, metal oxide, liquid, silicon, semiconductor and any mixture or combination of these, for example, wherein the additive is associated with only one of the polymer blocks of the block copolymer.

In an embodiment, the structure is characterized by a length scale, for example, a length scale that scales proportionally with the molecular weight of the block copolymer or polymers of the polymer blend. In an embodiment, for example, the structure is characterized by a size (S) that increases substantially linearly with molecular weight (MW) of the first block copolymer pursuant to the expression (E4) wherein $0.85 < x < 1$:

$$S \propto MW^x \tag{E4}$$

In an embodiment, for example, the structure is characterized by a size (S) characterized by expression E4 wherein x is greater than or equal to 0.90. In an embodiment, the size (S) of the structure corresponds to a domain length, for example, domain length is greater than or equal to 80 nm. In an embodiment, for example, the domain length corresponds to a periodic feature of the structure.

A range of polymer blend are useful for making structures of this aspect of the invention. In an embodiment, for example, the weight percent of the first block copolymer in the polymer blend is greater than or equal to 1%, optionally for some aspects, greater than 20% and optionally for some applications greater than 50%. In an embodiment, for example, the weight percent of the first block copolymer in the polymer blend is selected from the range of 1% to 99%, optionally for some applications selected from the range of 20% to 80%, optionally for some applications selected from the range of 40% to 60%. In an embodiment, for example, the second component is selected from the group consisting of a solvent, ceramic, metal, metal oxide, liquid, silicon, or semiconductor. In an embodiment, for example, is physically associated with the first polymer block, the second polymer block or both of the first block copolymer. In an embodiment, for example, the second component is a solvent resulting in swelling of one or more domains of the structure. In an embodiment, for example, the second component is a homopolymer or a random copolymer.

In an embodiment, for example, the second component is a second block copolymer comprising at least one polymer block different from the first polymer block and the second polymer block of the first block copolymer. Useful block copolymers for the second component include any of the block copolymers described herein, including block copolymers having any of formulas (FX1a)-(FX10h), and all embodiments thereof. In an embodiment of this aspect, the ratio of the molecular weight of the first block copolymer to the molecular weight of the second block copolymer is less than or equal to 5, and optionally the ratio of the molecular weight of the first block copolymer to the molecular weight of the second block copolymer is selected over the range of 0.2 to 5. In an embodiment of this aspect, the second component is a polymer such as a block copolymer having a molecular weight selected from 50 Da to 10,000 Da. In an embodiment of this aspect, the second component is a polymer characterized by 10 to 2000 repeating units. In an embodiment of this aspect, the second component is a brush block copolymer or a wedge-type block copolymer. In an embodiment of this aspect, for example, the polymer blend comprises a second polymer having a second block copolymer comprising at least one polymer block different from the first polymer block and the second polymer block of the first block copolymer. In an embodiment, the polymer blend comprises a second polymer that is a homopolymer. In another embodiment, the polymer blend comprises a second polymer that is a random copolymer, a block copolymer or a brush block copolymer, including any of the block copolymers and polymer blends disclosed herein.

In an embodiment of this aspect, the polymer blend comprises a wedge-type first block copolymer having the formula (FX10a), (FX10b), (FX10c), (FX10d), (FX10e), (FX10f), (FX10g) or (FX10h):

(FX10a)

(FX10b)

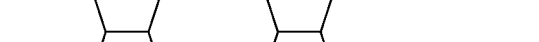
(FX10c)

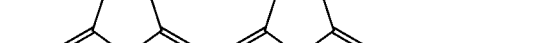
(FX10d)

(FX10e)

(FX10f)

(FX10g) or

(FX10h)

wherein: J is a repeating group of the first polymer side chain group; $G^1$ is the first wedge group; $G^2$ is the second wedge group; $G^3$ is a third wedge group and $G^4$ is the third wedge group; $R^{10}$ is independently a polymer side chain terminating group; and p is independently an integer selected from the range of 35 to 2000; and wherein J, $R^{10}$, $Q^1$, $Q^2$, m, and n are as defined in connection with formula (FX1a-FX8b). Block copolymers for this aspect may comprise any of the wedge groups and/or polymer side chain groups described herein.

In an embodiment of this aspect, the polymer blend comprises a wedge-type first block copolymer having the formula (FX5a), (FX5b1) or (FX6b1):

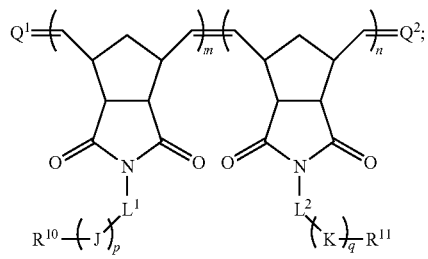
(FX5a)

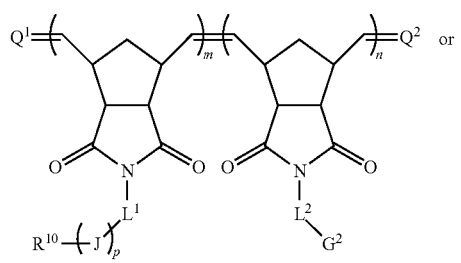
(FX5b1) or

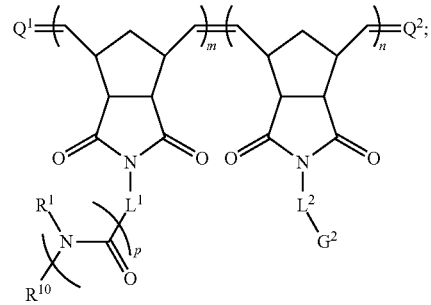
(FX6B1)

wherein J is a repeating group of said first polymer side chain group, K is a repeating group of said second polymer side chain group, $G^2$ is said second wedge group; each of $R^{10}$ and $R^{11}$ is independently a polymer side chain terminating group; and each of p and q is independently an integer selected from the range of 30 to 2000, wherein J, K, p, q, $R^{11}$, $R^{10}$, $Q^1$, $Q^2$, m, and n are as defined in connection with formula (FX1a-FX5b).

The invention provides structure comprising polymer blends, having optical properties that are tunable from the ultra-violet, through the visible and to the IR regions of the electromagnetic spectrum by selection of the relative amounts or weights percentages of polymer components of the polymer blend, such as the relative amounts or eights percentages of the block polymer components of the polymer blend.

In an embodiment, the invention provides copolymers, such as block copolymers, generated by polymerization of one or more substituted or unsubstituted norbornene monomers. In an embodiment, the invention provides copolymers, such as block copolymers, generated by polymerization of one or more monomers selected from the group consisting of:

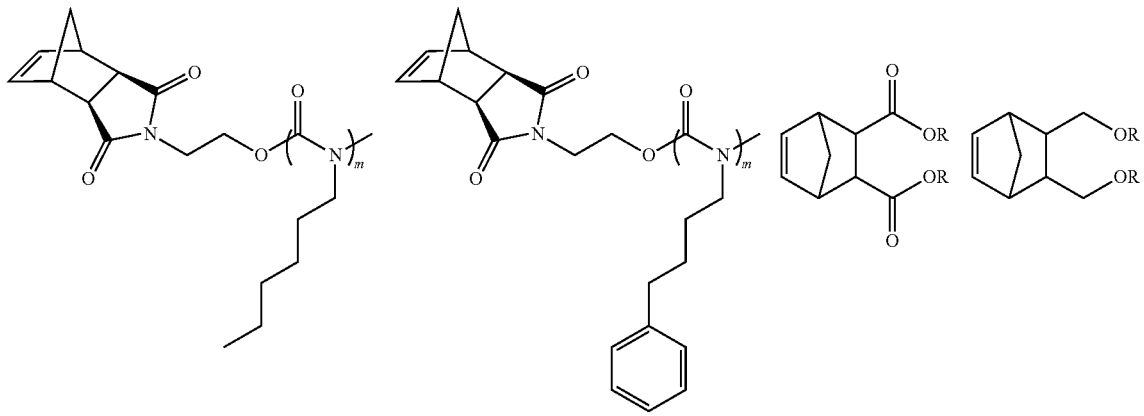

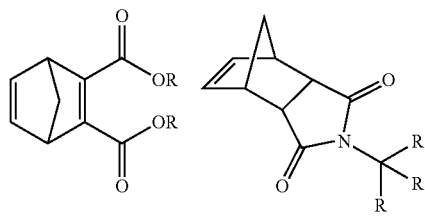

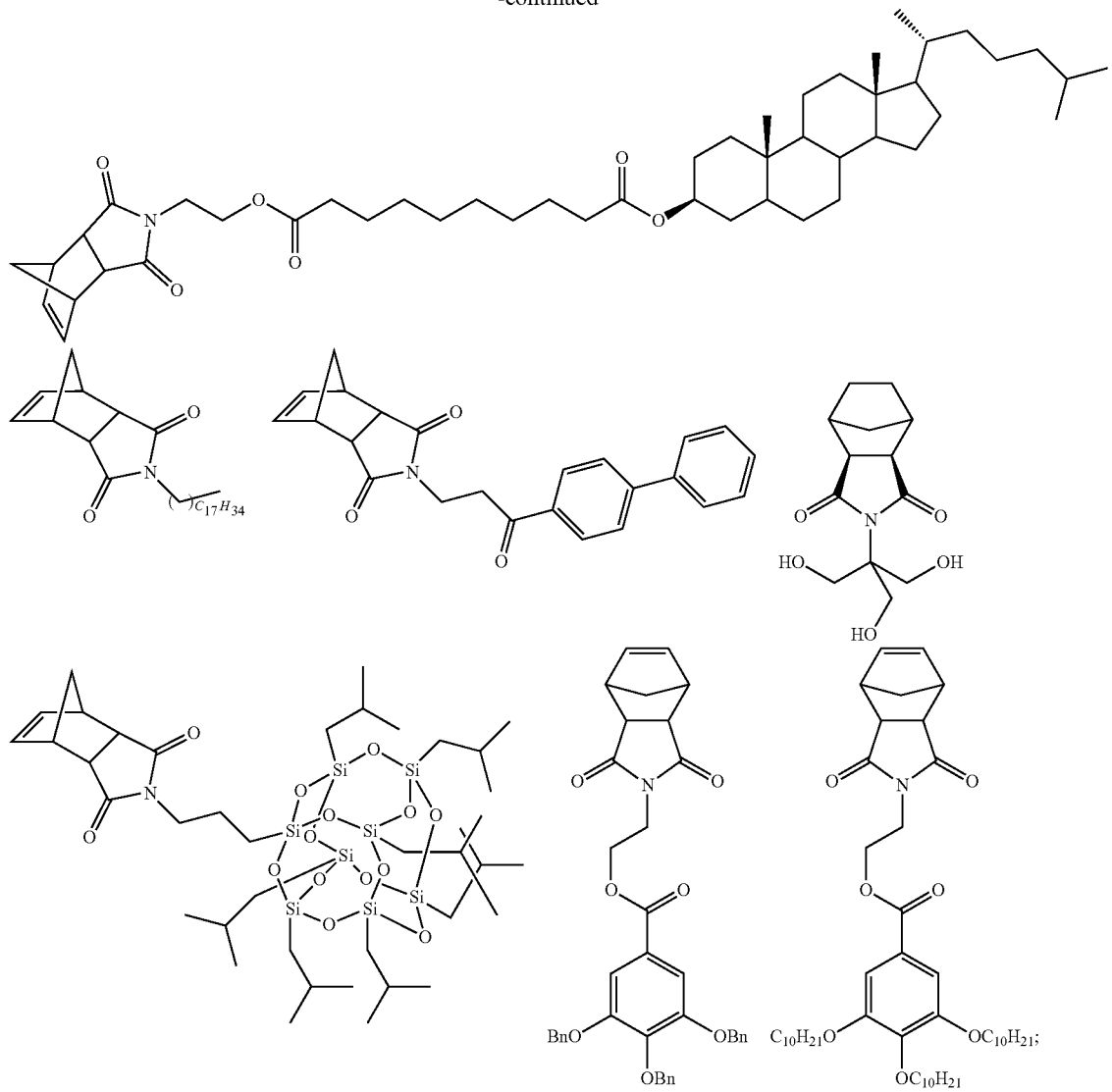

wherein each Bn is independently a substituted or unsubstituted benzyl group and wherein each R is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl.

In another aspect the invention provides a method of modulating incident electromagnetic radiation; the method comprising: providing a structure comprising a supramolecular assembly of a plurality of block copolymers; wherein each of the block copolymers independently comprises: (i) a first polymer block comprising at least 10 first repeating units; wherein each of the first repeating units of the first polymer block comprises a first polymer backbone group directly or indirectly covalently linked to a first polymer side chain group having a helical secondary structure, wherein each of the first polymer side chain groups of the first polymer block independently comprises a number of repeating units greater than or equal to 10; and (ii) a second polymer block comprising at least 10 second repeating units; wherein each of the second repeating units of the second polymer block comprises a second polymer backbone group covalently linked to a second polymer side chain group that is different than the first polymer side chain group or a first wedge group; wherein the first and second repeating units are directly or indirectly covalently linked along a backbone of the block copolymer; and directing the incident electromagnetic radiation on to the structure.

In another aspect the invention provides a method of modulating an incident electromagnetic radiation; the method comprising: providing a structure comprising a supramolecular assembly of a polymer blend of at least one block copolymer and at least one second component; wherein the polymer blend comprises: (i) a first block copolymer comprising: a first polymer block comprising at least 10 first repeating units; wherein each of the first repeating units of the first polymer block comprises a first polymer backbone group covalently linked to a first polymer side chain group or a first wedge group; and a second polymer block comprising at least 10 second repeating units; wherein each of the second repeating units of the second polymer block comprises a second polymer backbone group covalently linked to a second polymer side chain group or second wedge group that is different than the first polymer side chain group and the first wedge group; wherein the first and second repeating units are directly or indirectly covalently linked along a backbone of the block copolymer; and (ii) the second component that is different from the first block copolymer; the second component comprising a homopolymer, a copolymer, an oligomer, a small molecule or particle; and directing the incident electromagnetic radiation on to the structure.

Methods of this aspect of the invention include methods wherein the optical transmission or reflectance of the structure is tunable by selection of the composition or molecular weight of block copolymer components of supramolecular assembly. Methods of this aspect of the invention include methods wherein the optical transmission or reflectance of the structure is tunable by selection of the composition or molecular weight of components of the polymer blend. In an embodiment, for example, the relative weight percentages of the first block copolymer component and second component are selected to provide tunable transmission or reflectance properties of the UV, visible and/or near IR regions of the electromagnetic spectrum.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
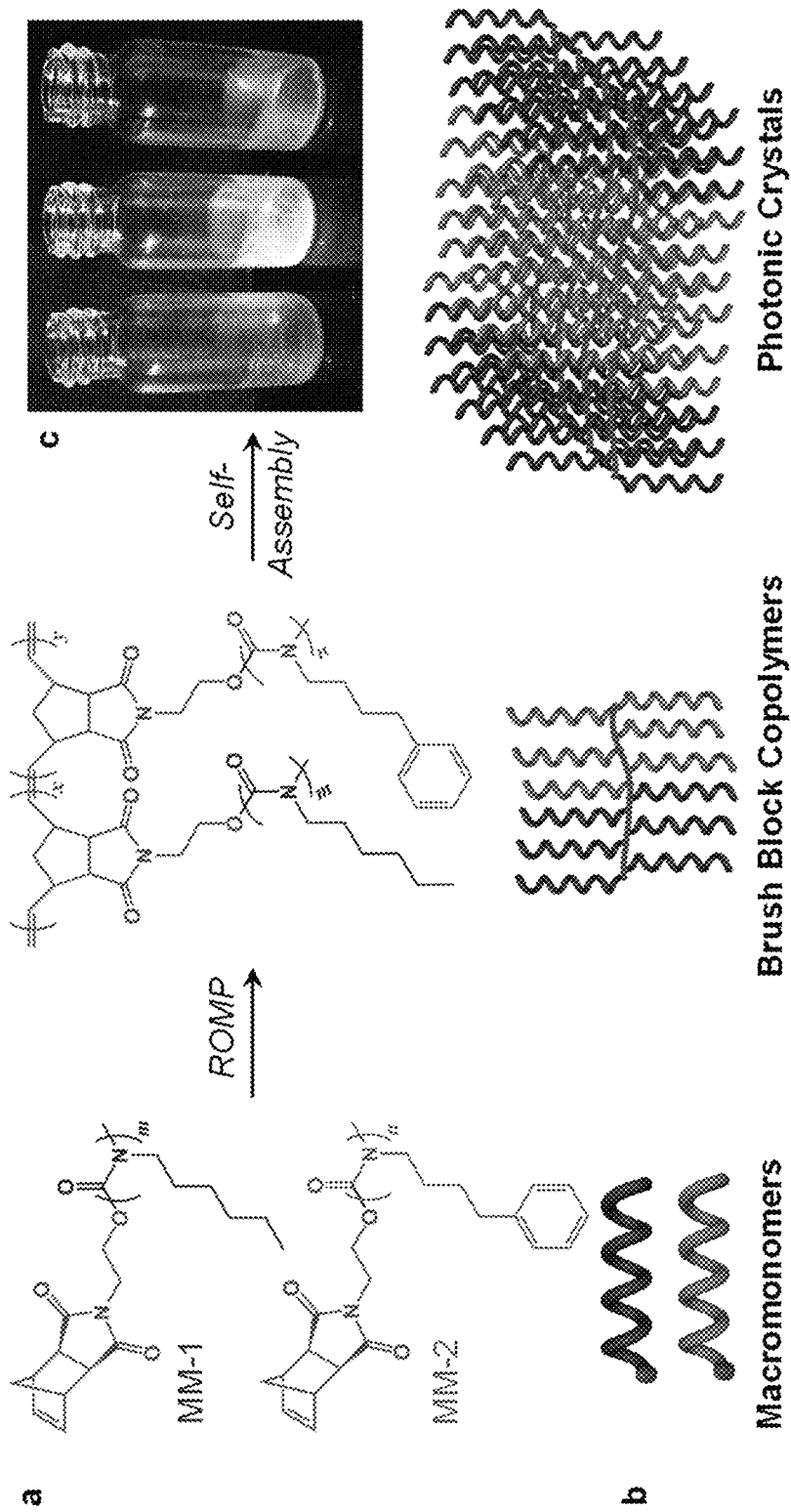
FIG. 1. (a) Structures of isocyanate-based macromonomers and their ROMP to brush block copolymers. (b) Schematic representation of the synthesis of brush block copolymers from rigid-rod helical macromonomers and their self-assembly towards 1D photonic crystals. (c) Photograph of photonic crystals reflecting violet, green, and red light.

In an embodiment, a composition or compound of the invention is isolated or purified. In an embodiment, an isolated or purified compound is at least partially isolated or purified as would be understood in the art. In an embodiment, the composition or compound of the invention has a chemical purity of at least 95%, optionally for some applications at least 99%, optionally for some applications at least 99.9%, optionally for some applications at least 99.99%, and optionally for some applications at least 99.999% pure.

As used herein, the term "polymer" refers to a molecule composed of repeating structural units connected by covalent chemical bonds often characterized by a substantial number of repeating units (e.g., equal to or greater than 10 repeating units and often equal to or greater than 50 repeating units and often equal to or greater than 100 repeating units) and a high molecular weight (e.g. greater than or equal to 50,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other copolymers. Useful polymers include organic polymers or inorganic polymers that may be in amorphous, semi-amorphous, crystalline or partially crystalline states. Cross linked polymers having linked monomer chains are useful for some applications.

An "oligomer" refers to a molecule composed of repeating structural units connected by covalent chemical bonds often characterized by a number of repeating units less than that of a polymer (e.g., equal to or less than 10 repeating units) and a lower molecular weights (e.g. less than or equal to 50,000 Da) than polymers. Oligomers may be the polymerization product of one or more monomer precursors.

"Block copolymers" are a type of copolymer comprising blocks or spatially segregated domains, wherein different domains comprise different polymerized monomers, for example, including at least two chemically distinguishable blocks. Block copolymers may further comprise one or more other structural domains, such as hydrophobic groups, hydrophilic groups, etc. In a block copolymer, adjacent blocks are constitutionally different, i.e. adjacent blocks comprise constitutional units derived from different species of monomer or from the same species of monomer but with a different composition or sequence distribution of constitutional units. Different blocks (or domains) of a block copolymer may reside on different ends or the interior of a polymer (e.g. [A][B]), or may be provided in a selected sequence ([A][B][A][B]). "Diblock copolymer" refers to block copolymer having two different chemical blocks.

"Polymer backbone group" refers to groups that are covalently linked to make up a backbone of a polymer, such as a block copolymer. Polymer backbone groups may be linked to side chain groups, such as wedge groups and polymer side chain groups. Some polymer backbone groups useful in the present compositions are derived from polymerization of a monomer selected from the group consisting of a substituted or unsubstituted norbornene, olefin, cyclic olefin, norbornene anhydride, cyclooctene, cyclopentadiene, styrene and acrylate. Some polymer backbone groups useful in the present compositions are obtained from a ring opening metathesis polymerization (ROMP) reaction. Polymer backbones may terminate in a range of backbone terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

"Wedge group" refers to a group covalently linked to a polymer backbone group that comprises a branched moiety, optionally imparting steric properties to the polymer. In an embodiment, for example, a wedge group is characterized by at least two branch points, optionally at least three, each terminating in an independent terminating branch moiety comprising at least 4 atoms, and optionally at least 10 atoms, and optionally at least 20 atoms and optionally at least 50 atoms. A wedge group may be directly or indirectly linked to the polymer back bone group. In some embodiments, wedge groups provide steric bulk and/or interactions that result in an extended polymer backbone and/or a rigid polymer backbone.

"Wedge-type block copolymer" refers a block copolymer that comprises at least one polymer block comprising wedge groups directly or indirectly linked to the polymer backbone. Wedge-type block copolymers include brush block copolymers having at least one polymer block comprising wedge groups directly or indirectly linked to a polymer back bone and at least one polymer block comprising polymer side chain groups directly or indirectly linked to a polymer back bone.

"Polymer side chain group" refers to a group covalently linked to a polymer backbone group that comprises a polymer side chain, optionally imparting steric properties to the polymer. In an embodiment, for example, a polymer side chain group is characterized by a plurality of repeating units having the same, or similar, chemical composition. A polymer side chain group may be directly or indirectly linked to the polymer back bone groups. In some embodiments, polymer side chain groups provide steric bulk and/or interactions that result in an extended polymer backbone and/or a rigid polymer backbone. Some polymer side chain groups useful in the present compositions include unsubstituted or substituted unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, polychloral group, polylactide group, polystyrene group, polyacrylate group, poly tert-butyl acrylate group, polymethyl methacrylate group, polysiloxane group, polydimethylsiloxane group, poly n-butyl acrylate group, polyethylene glycol group, polyethylene oxide group, polyethylene group, polypropylene group, polytetrafluoroethylene group, and polyvinyl chloride group. Some polymer side chain groups useful in the present compositions comprise repeating units obtained via anionic polymerization, cationic polymerization, free radical polymerization, group transfer polymerization, or ring-opening polymerization. A polymer side chain may terminate in a wide range of polymer side chain terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

"Polymer blend" refers to a mixture comprising at least one polymer, such as a block copolymer, and at least one additional component, and optionally more than one additional component. In some embodiments, for example, a polymer blend of the invention comprises a first block copolymer and one or more additional component comprising a homopolymer, a copolymer, a block copolymer, a brush block copolymer, an oligomer, a solvent, a metal, a metal oxide, a ceramic, a liquid, a small molecule (e.g., molecular weight less than 500 Da, optionally less than 100 Da), a particle or any combination of these. Polymer blends useful for some applications comprise a first block copolymer, such as a brush block copolymer or a wedge-type block copolymer, and one or more additional components comprising block copolymers, brush block copolymers, wedge-type block copolymers, linear block copolymers, random copolymers, homopolymers, or any combinations of these. Polymer blends of the invention include mixture of two, three, four, five and more components.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

As is customary and well known in the art, hydrogen atoms in formulas (FX1a)-(FX10h) and (W1)-(W10) are not always explicitly shown, for example, hydrogen atoms bonded to the carbon atoms of aromatic, heteroaromatic, and alicyclic rings are not always explicitly shown in formulas (FX1a)-(FX10h) and (W1)-(W10). The structures provided herein, for example in the context of the description of formulas (FX1a)-(FX10h) and (W1)-(W10) and schematics and structures in the drawings, are intended to convey to one of reasonable skill in the art the chemical composition of compounds of the methods and compositions of the invention, and as will be understood by one of skill in the art, the structures provided do not indicate the specific positions and/or orientations of atoms and the corresponding bond angles between atoms of these compounds.

As used herein, the terms "alkylene" and "alkylene group" are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups (e.g. $L^1$-$L^4$ and/or $W^1$-$W^5$).

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as linking and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups, for example, as one or more linking groups (e.g. $L^1$-$L^4$ and/or $W^1$-$W^5$).

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups (e.g. $L^1$-$L^4$ and/or $W^1$-$W^5$).

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups, for example, as one or more linking groups (e.g. $L^1$-$L^4$ and/or $W^1$-$W^5$).

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups (e.g. $L^1$-$L^4$ and/or $W^1$-$W^5$).

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^4$ and/or $W^1$-$W^5$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups (e.g. $L^1$-$L^4$ and/or $W^1$-$W^5$).

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group.

The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides are comprised of two or more amino-acid connected via peptide bonds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, or 7-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6- or 7-member aromatic rings, including heterocyclic aromatic rings. The term heteroaryl specifically refers to aryl groups having at least one 5-, 6- or 7-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those which are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocyclic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-membered ring and one or more additional five- or six-membered aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically nonfeasible. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:
halogen, including fluorine, chlorine, bromine or iodine; pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms;
—OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

DETAILED DESCRIPTION OF THE INVENTION

In general, the terms and phrases used herein have their art-recognized meaning, which can be found by reference to standard texts, journal references and contexts known to those skilled in the art.

The invention is further detailed in the following Examples, which are offered by way of illustration and are not intended to limit the scope of the invention in any manner.

Example 1: Synthesis of Isocyanate-Based Brush Block Copolymers and their Rapid Self-Assembly to Infrared Reflecting Photonic Crystals Abstract The synthesis of rigid-rod, helical isocyanate-based macromonomers was achieved through the polymerization of hexyl isocyanate and 4-phenylbutyl isocyanate, initiated by an exo-norbornene functionalized half-titanocene complex. Sequential ruthenium-mediated ring-opening metathesis polymerization of these macromonomers readily afforded well-defined brush block copolymers, with precisely tunable molecular weights ranging from high (1512 kDa) to ultra-high (7119 kDa), while maintaining narrow molecular weight distributions (PDI=1.08-1.39). The self-assembly of these brush block copolymers to solid-state thin-films and their photonic properties were investigated. Due to the rigid architecture of these novel polymeric materials, they rapidly self-assemble through simple controlled evaporation to photonic crystal materials that reflect light from the UV, through the visible, to the near infrared. The wavelength of reflectance is linearly related to the brush block copolymer molecular weight, allowing for predictable tuning of the band gap through synthetic control of the polymer molecular weight. A combination of scanning electron microscopy and optical modeling were employed to explain the origin of reflectivity.

Introduction

Urbanization is causing a cascade of negative effects on the environment.[1] A readily apparent example on a local scale is the urban heat island (UHI) effect, the phenomenon that urban areas often have higher local temperatures than surrounding areas.[2] A major cause of UHIs is the absorption and thermalization of solar energy by modern building materials. A tremendous amount of money and energy is consumed towards cooling in these areas,[3] resulting in increased pollution[4] and degraded living conditions.[5] To minimize the negative effects of urbanization on the environment, great efforts have been directed towards urban design and the development of new technologies. Because the majority of solar energy is in the form of IR radiation, there is strong interest in developing IR-reflecting materials to prevent absorption and thermalization.

Photonic crystals (PCs) are periodic composite materials with frequency specific reflection, which can be tuned to efficiently reflect IR light.[6] In these materials, the propagation of certain wavelengths of light is forbidden due to photonic band gaps that originate from the periodic modulation of the dielectric function. The wavelength of reflected light is related to the optical path length of the domains, which is determined by the size and refractive index of the components. PCs are most commonly synthesized through layer-by-layer depositions, lithography, or the self-assembly of colloidal crystals.[6] Unfortunately, these routes are expensive or impractical as large area PCs; a more desirable IR-reflective building material would be fabricated inexpensively from a commodity material, such as a polymer. In this context, the self-assembly of block copolymers (BCPs)[7] provides an attractive means to IR-reflecting PCs because of their low cost potential in terms of both raw material and bottom-up fabrication via self-assembly. However, most BCP PCs can only reflect short wavelengths of visible light.[8,9] This is because high molecular weight (MW) polymers, capable of forming large domains, exhibit extreme polymer chain entanglement that is detrimental to self-assembly and inhibits the formation of large, ordered morphologies. To overcome the inability of utilizing high MW BCPs to form polymer PCs that reflect long wavelengths of light, the domain sizes can be enlarged through swelling with additives, namely solvent molecules[10] or homopolymers,[11] although these approaches generally require complicated annealing procedures.

Brush BCPs can self-assemble to long-wavelength reflecting PCs without the need for swelling agents.[12] By exploiting the advantageous characteristics (i.e. livingness, stability, as well as steric and functional group tolerance) of ruthenium (1) mediated ring-opening metathesis polymerization (ROMP)[13] we were able to synthesize well-defined brush BCPs constructed from lactide- and styrene-macromonomers (MMs).[12,14] This "grafting-through" polymerization strategy of MMs affords highly uniform brush BCPs,[15] where the sterically encumbered array of low MW sidechains greatly inhibits chain-entanglement and enforces the unifying main-chain to assume a highly elongated conformation.[16] As a result, these brush BCPs rapidly self-assembled to stacked lamellae of alternating layers of lactide and styrene domains, forming 1D PC architectures. Through controlled evaporation, the films exhibited a maximum peak wavelength ($\lambda_{max}$) of reflectance as long as 540 nm, while thermal annealing under compression allowed ultra-high MW brush BCPs to self-assemble to PCs that reflected light as long as 1311 nm. Although the reported brush BCPs can assemble to IR-reflecting PCs after thermal annealing, we sought to develop a system that could assemble to such domain sizes under ambient conditions to enable widespread applications, including IR-reflecting paints. We envisioned that increasing the rigidity of the grafts would enhance the overall persistence length of the brush BCP, further decreasing chain-entanglement and promoting more rapid self-assembly of ultra-high MW BCPs to even larger domains. Reported herein is the synthesis of brush BCPs constructed from rigid isocyanate-based MMs and their rapid self-assembly through controlled evaporation to PCs that can reflect light from the UV, through the visible, and into the near-IR (see, FIG. 1).

FIG. 1 provides: (a) Structures of isocyanate-based macromonomers and their ROMP to brush block copolymers. (b) Schematic representation of the synthesis of brush block copolymers from rigid-rod helical macromonomers and their self-assembly towards 1D photonic crystals. (c) Photograph of photonic crystals reflecting violet, green, and red light.

Results and Discussion

Chart 1.

Structures of initiators and monomers utilized in this Example.

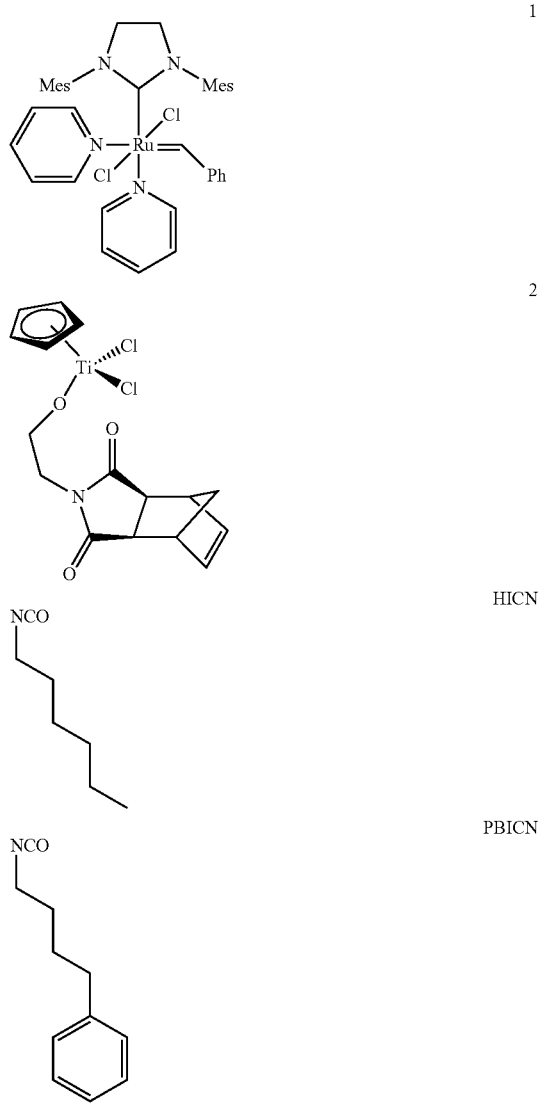

Synthesis of Macromonomers and Brush (Block) Copolymers.

Polyisocyanates are a class of polymers that adopt rigid helical secondary structures,[17] and in the case of brush copolymers composed of a polystyrene main-chain and polyhexyl isocyanate side-chains, it has been shown that the rigid side-chains result in main-chain elongation, compared to similar graft copolymers with random-coil side-chains.[18] Thus, we found isocyanate-based MMs to be ideal candidates for investigating if increased side-chain rigidity would facilitate self-assembly to large domain sizes and long-wavelength reflecting PCs. Additionally, their controlled polymerization can be achieved utilizing half-titanocene (IV) alkoxide initiators, where the alkoxide group is quantitatively incorporated as a chain-end group on the polyisocyanate, providing an efficient means to prepare appropriately functionalized MMs.[19] Embracing this synthetic approach, an exo-norbornene half-titanocene derivative (2) was prepared in good yield from the reaction between CpTiCl$_3$ and N-(hydroxyethyl)-cis-5-norbornene-exo-2,3-dicarboximide in the presence of Et$_3$N. Complex 2 was subsequently employed to produce exo-norbornene functionalized MMs from hexyl isocyanate (HICN, MM-1) and 4-phenyl butyl isocyanate (PBICN, MM-2). These MMs exhibited similar MWs (weight average MW ($M_w$)=6.77 and 5.99 kDa for MM-1 and MM-2, respectively) and narrow molecular weight distributions (MWDs) (polydispersity index (PDI=$M_w/M_n$)=1.05 and 1.07 for MM-1 and MM-2, respectively). The ROMP of MM-1 and MM-2 initiated by 1 was efficient, and could be carried out over a broad range of [MM]:[1] ratios, achieving high MM conversion, producing high MW copolymers with narrow MWDs (Table 1). Closer examination of the ROMP of MM-1 shows that it exhibits living characteristics (i.e. linear increase in MW with increasing MM conversion, and a nearly constant PDI during the course of polymerization), necessary for successful synthesis of well-defined BCPs in a one-pot synthetic procedure (see, FIG. 2a).

Figure 2:
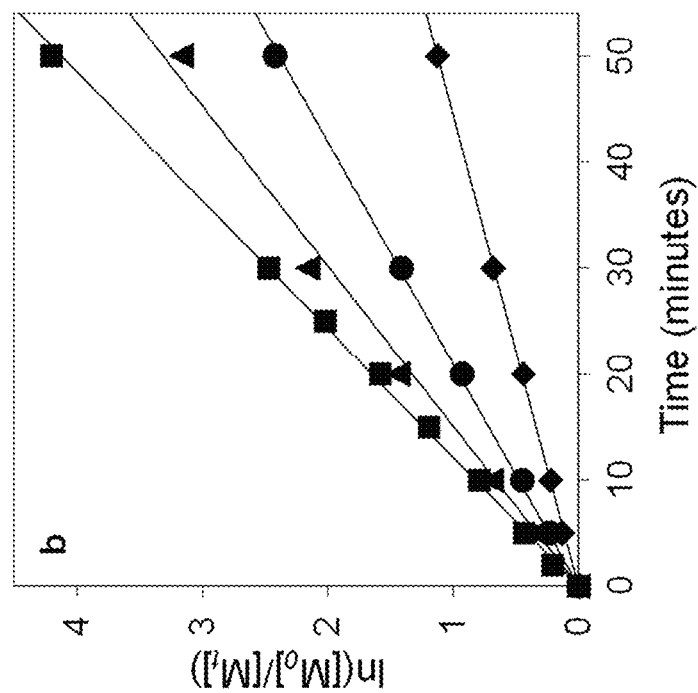
FIG. 2. (a) Plot of $M_w$ and PDI as a function of MM-1 conversion ([MM-1]:[1]=50:1). (b) Semi-logarithmic plots of $\ln([MM-1_0]/[MM-1_t])$ as a function of time for the ROMP of MM-1 by 1. Conditions: [MM-1]=9.81 mM; [1]=19.7 μM (□), 9.85 μM (▲), 6.57 μM (●), or 3.94 μM (♦). Polymerizations performed in THF at ambient temperature.
Figure 2:
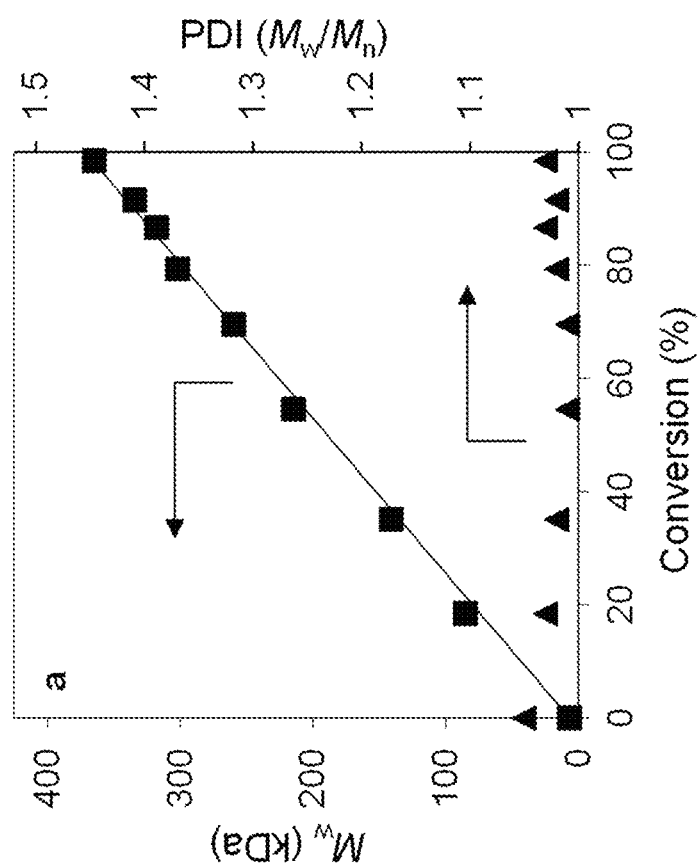

FIG. 2 provides (a) Plot of $M_w$ and PDI as a function of MM-1 conversion ([MM-1]:[1]=50:1). (b) Semi-logarithmic plots of ln([MM-1$_0$]/[MM-1$_t$]) as a function of time for the ROMP of MM-1 by 1. Conditions: [MM-1]=9.81 mM; [1]=19.7 µM (■), 9.85 µM (▲), 6.57 µM (●), or 3.94 µM (♦). Polymerizations performed in THF at ambient temperature

TABLE 1

Results of the ROMP of macromonomers mediated by 1.[a]

| Run No. | MM | [MM]/ [1] | Time (min) | Conv (%)[b] | $M_w$ (kDa)[b] | PDI ($M_w/M_n$)[b] |
|---|---|---|---|---|---|---|
| 1 | MM-1 | 50 | 50 | 98.5 | 364.9 | 1.03 |
| 2 | MM-1 | 100 | 50 | 95.8 | 924.9 | 1.10 |
| 3 | MM-1 | 150 | 70 | 95.7 | 1944 | 1.11 |
| 4 | MM-1 | 200 | 90 | 97.0 | 2123 | 1.38 |
| 5 | MM-1 | 250 | 150 | 93.7 | 3310 | 1.39 |
| 6 | MM-2 | 150 | 100 | 90.7 | 1100 | 1.07 |

[a]Polymerizations performed in 3.01 mL THF at ambient temperature. [MM-1] = [MM-2] = 9.81 mM.
[b]Determined by Light Scattering.

A similarly controlled ROMP of MM-2 was observed, although sluggish in comparison to the ROMP of MM-1. Nonetheless, ROMP of MM-2 reached high MM conversion, producing the well-defined brush copolymer (Run, 6, Table 1). To enable the production of well-defined brush BCPs a thorough characterization of the kinetic profile for the ROMP of the MM's is required. The kinetic study of the ROMP of MM-1 reveals a first-order dependence on [MM-1] for all [MM-1]:[1] ratios investigated (see, FIG. 2b). Establishing the kinetic profile for the ROMP of MM-1 mediated by 1, we proceeded to synthesize well-defined BCPs by addition of MM-2 after the ROMP of MM-1. The brush BCPs could be isolated in high yields, with MWs ranging from high (1512 kDa) to ultra-high (7119 kDa), while maintaining impressively low PDIs (PDI=1.08-1.39), especially when taking into consideration the magnitudes of the MWs (Table 2). All BCPs had nearly equal molar incorporation of each MM.

TABLE 2

Results of the block copolymerization of isocyanate macromonomers mediated by 1.[a]

| Run No. | [MM-1]:[MM-2]:[1] | Time (min)[b] | Yield (%)[c] | $M_w$ (kDa)[d] | PDI ($M_w/M_n$)[d] | MM-1 (mol %)[e] | $\lambda_{max}$ (nm)[f] |
|---|---|---|---|---|---|---|---|
| 7 | 100:100:1 | 48 | 89.7 | 1512 | 1.08 | 52.4 | 334 |
| 8 | 150:150:1 | 64 | 86.7 | 2918 | 1.15 | 50.8 | 511 |
| 9 | 200:200:1 | 85 | 91.5 | 4167 | 1.20 | 49.9 | 664 |
| 10 | 215:215:1 | 94 | 85.4 | 5319 | 1.32 | 51.3 | 802 |
| 11 | 250:250:1 | 144 | 93.9 | 7119 | 1.39 | 52.3 | 1120 |

[a]Polymerizations performed in 3.01 mL THF at ambient temperature. [MM-1] = [MM-2] = 9.81 mM.
[b]Reaction time for polymerization of MM-1. Polymerization was allowed to proceed for 3 (runs 7-9) or 5 (runs 10 and 11) hours after the addition of MM-2.
[c]Isolated Yield.
[d]Determined by Light Scattering.
[e]Determined by $^1$H NMR.
[f]Maximum peak wavelength of reflectance of the primary reflection for films prepared from the controlled evaporation from DCM.

Self-Assembly and PC Properties of Brush BCPs.

In this Example, we report the investigation into the ability of BCP polymers to rapidly self-assemble to PCs. Thin films of the polymers were prepared through controlled evaporation from DCM, THF, CHCl$_3$, or toluene. In contrast to the previously reported lactide/styrene brush BCPs, no significant solvent effect was observed on self-assembly, as judged by the nearly identical reflectance spectra and $\lambda_{max}$ of the films. The self-assembly of these brush BCPs to ordered thin-films is dictated through a delicate interplay of factors, including solvent, kinetics, polymer interactions, as well as polymer/substrate interactions.[20] Our preliminary explanation for the negligible solvent effect is that the rigid architecture of the isocyanate brush BCPs promotes a highly elongated main-chain, minimizing solvent as well as polymer interactions. This represents a degree of pre-organization, which accelerates self-assembly to ordered morphologies. As such, films prepared from the controlled evaporation of DCM solutions were analyzed because it is the most volatile solvent and most strongly highlights the rapid self-assembly of the brush BCPs. The rapid self-assembly of the brush BCPs is qualitatively observed in that the samples with MWs of 1512, 2918, and 4167 kDa produced films that visually appeared violet, green, and red, respectively. Films fabricated from higher MW BCPs were white, suggesting that the ultra-high MW polymers were reflecting wavelengths of light beyond the visible spectrum.

Figure 3:
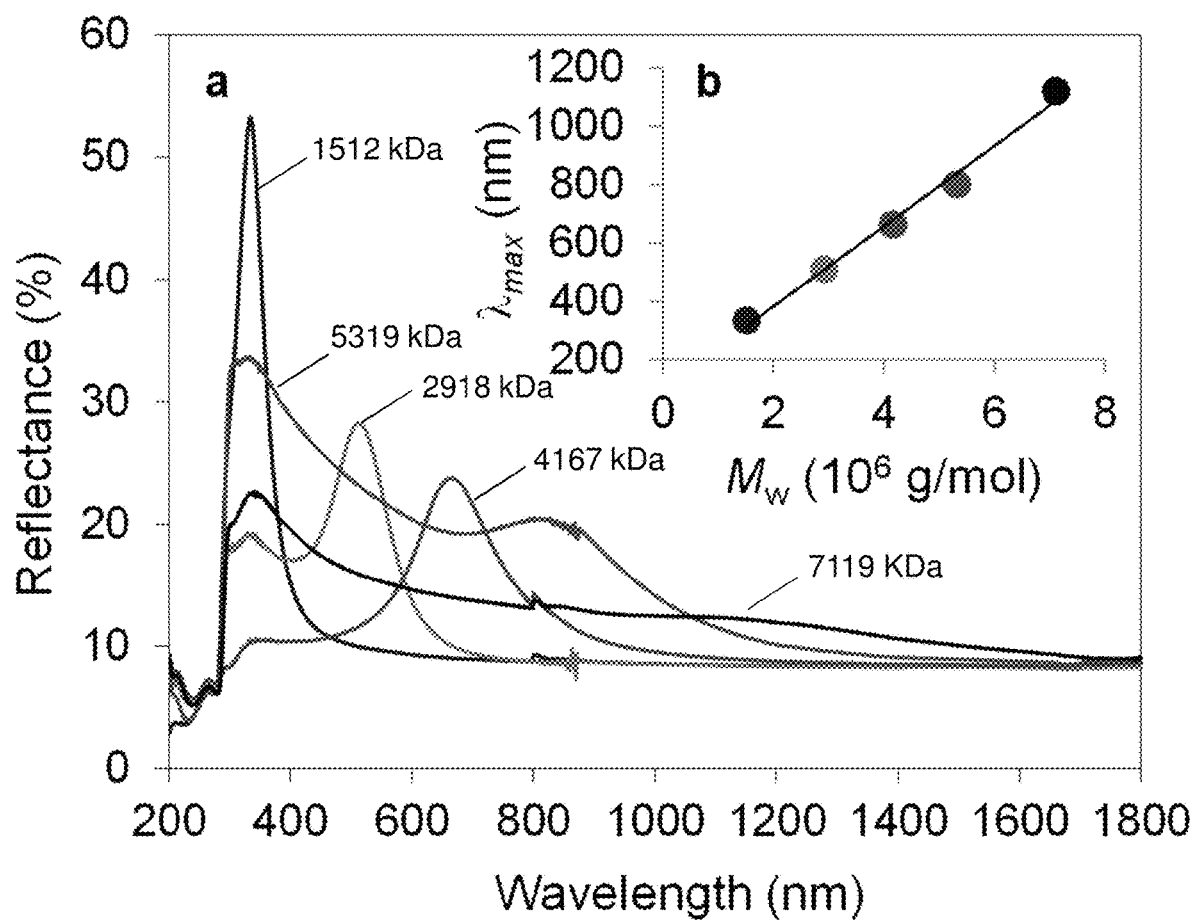
FIG. 3. (a) Plot of reflectance as a function of wavelength for isocyanate-based brush BCP thin films with $M_w$=1512 (blue), 2918 (green), 4167 (red), 5319 (purple), and 7119 (black) kDa. (b) Plot of $\lambda_{max}$ as a function of $M_w$. Color scheme corresponding to $M_w$ is consistent with (a).
Figure 4:
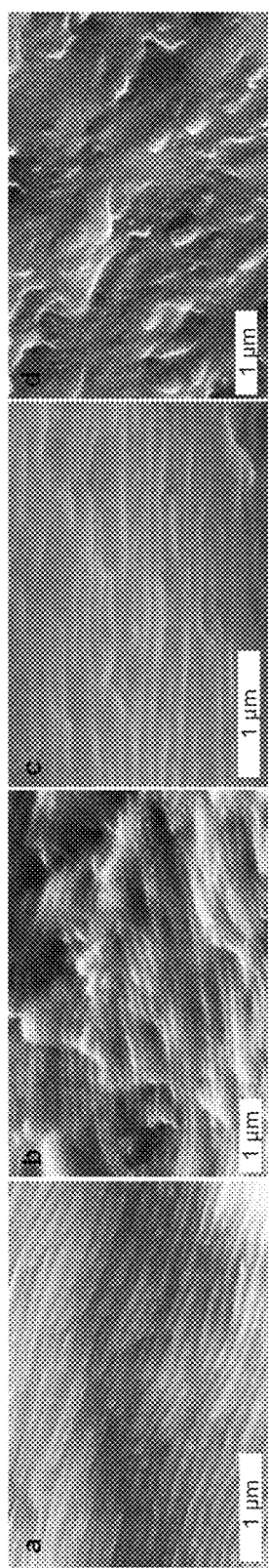
FIG. 4. SEM images of cross-sections of brush block copolymers with $M_w$=1512 (a), 2918 (b), 4167 (c), and 5319 (d) kDA. The perspective places the glass substrate parallel with the text.

FIG. 3 provides (a) Plot of reflectance as a function of wavelength for isocyanate-based brush BCP thin films with $M_w$=1512 (blue), 2918 (green), 4167 (red), 5319 (purple), and 7119 (black) kDa. (b) Plot of $\lambda_{max}$ as a function of $M_w$. Color scheme corresponding to $M_w$ is consistent with (a). FIG. 4 provides SEM images of cross-sections of brush block copolymers with $M_w$=1512 (a), 2918 (b), 4167 (c), and 5319 (d) kDA. The perspective places the glass substrate parallel with the text.

To quantitatively measure the PC crystal properties of these materials, reflectance measurements were acquired as a function of wavelength using a spectrophotometer with an 'integrating sphere' diffuse reflectance accessory (see, FIG. 4a). As expected, the violet, green, and red polymer films showed primary reflectance peaks with $\lambda_{max}$=334, 511, and 664 nm, respectively. It is important to note that the magnitude of reflectance is directly related to the number of layers in the 1D PC. Therefore, as the thickness of the film was not strictly controlled, a variation in percent reflectance was observed. In theory, optimization of the layer thickness can lead to 100% reflectance at the appropriate wavelength. The brush BCP with the next highest MW (5319 kDa) in the series exhibited two broad reflectance peaks at 329 and 801 nm. In the case of the ultra-high MW BCP ($M_w$=7119 kDa), extremely broad reflectance was seen extending from 1800 nm to 300 nm, with a $\lambda_{max}$ of the primary reflection peak estimated at the plateau with $\lambda_{max}$=1120 nm. Although the broad signals in the reflection spectrum suggest poor self-assembly, the ability to produce broadly reflecting materials could be highly desirable in an IR-reflecting building material. The possibility that the domain sizes of the films could be swollen from residual solvent is eliminated because the film properties are unchanged after being dried under vacuum overnight, and are stable over the course of at least months at ambient conditions. For comparison, with the lactide/styrene brush BCPs, the highest MW polymer that was able to self-assemble through controlled evaporation to a PC structure had a MW of 2940 kDa, with $\lambda_{max}$=540 nm. Thus, the reflectance data clearly shows that the isocyanate-based brush BCPs are superior in regards to facile self-assembly to PCs. Specifically, under less strenuous self-assembly conditions, ultra-high MW (>7000 kDa) isocyanate-based brush BCPs can reflect light with $\lambda_{max}$=1120 nm, more than 580 nm longer than the lactide/styrene system. Closer inspection of the primary reflection peaks reveals a highly linear correlation between $\lambda_{max}$ of this peak with increasing MW of the brush BCP ($R^2$=0.990), which is in accord with our earlier reported lactide/styrene brush BCP PCs (see, FIG. 4b). As $\lambda_{max}$ is directly determined by the domain sizes, this observation shows that within the window of our investigations, there is a linear increase in domain sizes with increasing BCP MW. In contrast, most linear BCPs exhibit a non-linear increase in domain size with increasing MW, that scales theoretically as $MW^{2/3}$.[21] Thus, the rigid architecture and inhibited chain-entanglement of brush BPCs maintains structural integrity as they self-assemble into ordered morphologies, which allows larger domain sizes to be accessed with fewer number of monomer repeat units than their linear counterparts. This predictability in reflectance enables these PCs to be easily incorporated into a variety of specific applications, because the reflectance can be readily tuned through the synthetic manipulation of the polymer MW.

To assign the morphology of the brush BCPs and gain insight into the origin of their PC properties, scanning electron microscopy (SEM) was performed on cross-sections of the films to directly image the polymer domains (see, FIG. 4). For the brush BCPs with $M_w$<4167 kDa, stacked lamellar morphologies are observed, as expected for BCPs composed of nearly equal ratios of each block (see, FIG. 4a-c). This also explains the origin of the reflective properties of the brush BCPs, as alternating multilayers are the basis for 1D PCs. Most impressively, this order was simply achieved through the rapid self-assembly by controlled evaporation from volatile DCM. Thus, the well-ordered morphologies still accessed by the brush BCPs with MW up to 4167 kDa explains the ability of these polymers to reflect such long wavelengths of light. In contrast, in the lactide/styrene system, thermal annealing was required to self-assemble high MW polymers to equally ordered morphologies. Additionally, with that system, a variation in layer thickness and morphological order was observed as a function of distance from the glass substrate. However, with the current isocyanate-based brush BCPs, the layer thickness and lamellae ordering was uniform throughout the film, regardless of distance from the glass substrate, further demonstrating the drastic beneficial effects that the rigid grafts have on the self-assembly of the brush BCPs to PCs.

When the polymer MW was increased further, unordered morphologies lacking any well-defined domains were observed in the SEM analysis (see, FIG. 4d). This lack of order clearly explains the broad reflectance peaks observed. More so, the unordered morphologies revealed by SEM brings forth the question as to how the linear relationship between $\lambda_{max}$ and BCP MW still holds true with these ultra-high MW polymers. This behavior may be attributed to the inhibited self-assembly of these ultra-high MWs.

Figure 5:
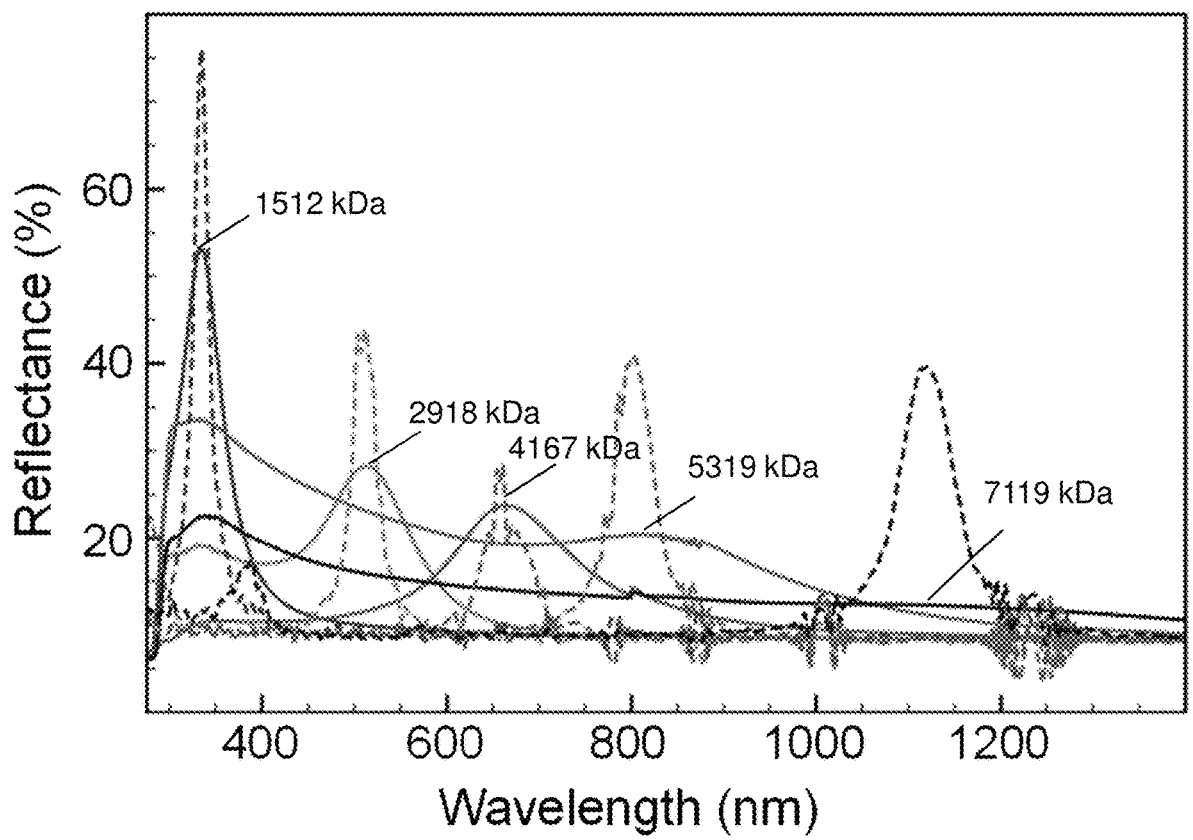
FIG. 5. Plot of reflectance as a function of wavelength for isocyanate-based brush BCP thin films with $M_w$=1512 (blue), 2918 (green), 4167 (red), 5319 (purple), and 7119 (black) kDa (solid), and the corresponding simulated spectra (dashed).

FIG. 5 provides Plot of reflectance as a function of wavelength for isocyanate-based brush BCP thin films with $M_w$=1512 (blue), 2918 (green), 4167 (red), 5319 (purple), and 7119 (black) kDa (solid), and the corresponding simulated spectra (dashed).

To further support the proposed origin of reflectivity, the polymer nanostructures were modeled using transfer matrix simulations (see, FIG. 5).[22] An initial approximation of the size of each block domain was made using the first order peak of reflection, from the equation $\lambda_{max}=2(n_1x_1+n_2x_2)$, using the measured refractive indices of the corresponding brush homopolymers by ellipsometry. A coefficient of variation (CV) for the layer thickness was introduced to account for the increased bandwidth of the reflection peaks due to size dispersity and disorder in the nanostructure. The CV for the layer thicknesses was set at 10%—this single free parameter provides a method of accounting for the effect of lamellae size distribution on the line widths of the optical spectra. The reflectance spectra of the highest molecular weight samples are broad and no longer resemble the simulated spectra, as expected from the SEM data. Our modeling supports the conclusion that these lamellar nanostructures represent 1D photonic crystals.

Conclusion

In conclusion, a series of well-defined (PDI=1.08-1.39) isocyanate-based brush block copolymers have been synthesized with high (1512 kDa) to ultra-high (7119 kDa) molecular weights. Due to the rigid-rod secondary structure of the isocyanate grafts, the self-assembly of these block copolymers is enhanced, such that they rapidly form well-ordered morphologies composed of stacked lamellae with large domain sizes. As the domain sizes are directly controlled by the polymer molecular weights, the wavelength of reflectance can be synthetically and predictably tuned from the UV to the near IR by manipulation of the polymer chain length. Visualization of the polymer morphology through SEM and optical modeling confirm that the origin of the reflective properties of these novel polymers is through their assembled into 1D photonic crystal architectures. These IR reflecting materials can be fabricated by the evaporation from a volatile solvent under ambient conditions, thus, they show promise as a new technology towards IR-reflecting coatings that can be applied as paints.

Experimental Section

Materials and Methods.

($H_2$IMes)(PPh$_3$)$_2$(Cl)$_2$RuCHPh was recieved as a research gift from Materia Inc. and converted to 1 via literature procedure.[23] All other chemicals were purchased from Sigma Aldrich. Solvents were purified by passage through solvent purification columns and further degassed with argon.[24] Hexyl isocyanate and 4-phenylbutyl isocyanate were dried over $CaH_2$ overnight and vacuum distilled. N-(hydroxyethyl)-cis-5-norbornene-exo-2,3-dicarboximide was prepared according to literature procedure.[25]

All reactions were carried out in flamed Schlenk-type glassware on a dual-manifold Schlenk line or in a nitrogen-filled glovebox. NMR spectra were recorded on a Varian Inova 300 MHz spectrometer. Chemical shifts were referenced to internal solvent resonances and are reported as parts per million relative to tetramethylsilane. Polymer molecular weights were determined utilizing THF as the eluent by multi-angle light scattering (MALS) gel permeation chromatography (GPC) using a miniDAWN TREOS light scattering detector, a Viscostar viscometer, and an OptilabRex refractive index detector, all from Wyatt Technology. An Agilent 1200 UV-Vis detector was also present in the detector stack. Absolute molecular weights were determined using dn/dc values calculated by assuming 100% mass recovery of the polymer sample injected into the GPC. Polymer thin films were prepared from the controlled evaporation of polymer solutions (~1.5 g/L) in dichloromethane onto glass slides that had been previously washed with methanol and hexane. After the solvent was allowed to evaporate, the samples were dried under vacuum overnight. SEM images were taken on a ZEISS 1550 VP Field Emission SEM. Reflection measurements were performed on a Cary 5000 UV/Vis/NIR spectrophotometer, equipped with an 'integrating sphere' diffuse reflectance accessory (Internal DRA 1800). All measurements were referenced to a LabSphere Spectralon 99% certified reflectance standard. The samples were illuminated through a Spectralon-coated aperature with a diameter of 1 cm, with a beam area of approximately 0.5 cm$^2$. The samples were scanned at a rate of 600 nm/min, with a 1 nm data interval, from 1800 to 200 nm, with a detector crossover (InGaAs to PMT) at 800 nm.

Synthesis of CpTiCl$_2$(C$_{11}$H$_{12}$NO$_3$) (2):

In a glovebox, a 25 mL flask was charged with 483 mg of CpTiCl$_3$ (2.20 mmol), 10 mL benzene, and a stir bar. To the rapidly stirred solution was added dropwise a solution of N-(hydroxyethyl)-cis-5-norbornene-exo-2,3-dicarboximide (457 mg, 2.20 mmol) and triethyl amine (223 mg, 2.20 mmol) in 10 mL of benzene. The reaction was allowed to stir for 2 h and was then filtered through a glass frit. The volatiles were removed from the filtrate affording a yellow solid. The solid was recrystallized from a toluene/pentane solvent mixture to afford 350 mg (40.7%) of the pure product.

$^1$H NMR (C$_6$D$_6$, 300 MHz, 25° C.): δ 6.16 (s, 5H), 5.70 (t, J=1.86 Hz, 2H), 4.28 (t, J=5.58 Hz, 2H), 3.40 (t, J=14.3 Hz, 2H), 3.05-3.03 (m, 2H), 2.29 (d, J=1.00 Hz, 2H), 1.29-1.21 (m, 2H). $^{13}$C NMR (C$_6$D$_6$, 75 MHz, 25° C.): δ 177, 138, 120, 78.9, 48.4, 45.8, 43.6, 40.5. HRMS (FAB+): Calculated: 390.0149. Found: 390.0143.

Poly(Hexyl Isocyanate) Macromonomer (MM-1):

A 10 mL round bottom flask was charged with 460 mg of 2 (1.18 mmol), 250 μL of THF, and a stir bar. To the stirred suspension was added 6.87 mL of hexyl isocyanate (47.2 mmol, 40 equiv.). The reaction was allowed to proceed for 21 h before being poured into 50 mL of methanol. The polymer was isolated by filtration, redissolved in methylene chloride, and precipitated again into 50 mL of methanol. MM-1 was isolated by filtration and dried under vacuum at ambient temperature to a constant weight (5.53 g, 92.2%).

$^1$H NMR (CDCl$_3$, 300 MHz, 25° C.): δ 6.30 (bs), 4.28 (bs), 3.68 (bs), 3.08 (bs), 2.71 (bs), 1.62 (bs), 1.28 (bs), 1.12-1.01 (m). $M_w$=6.77 kDa; PDI=1.05. dn/dc=0.0829 mL/g.

Poly(4-Phenyl Butyl Isocyanate) Macromonomer (MM-2):

A 10 mL round bottom flask was charged with 445 mg of 2 (1.14 mmol), 250 μL of THF, and a stir bar. To the stirred suspension was added 1.94 mL of 4-phenyl butyl isocyanate (11.3 mmol, 10 equiv.). The reaction was allowed to proceed for 21 h before being poured into 50 mL of methanol. The polymer was isolated by filtration, redissolved in methylene chloride, and precipitated again into 50 mL of methanol. The polymer was isolated by filtration and dried under vacuum at ambient temperature to a constant weight (1.69 g, 84.4%).

$^1$H NMR (CDCl$_3$, 300 MHz, 25° C.): δ 7.31-7.14 (m), 6.29 (bs), 4.20 (bs), 3.72 (bs), 3.25 (bs), 2.59 (bs), 1.63 (bs), 1.29-1.19 (m). M$_w$=5.99 kDa; PDI=1.07. dn/dc=0.140 mL/g.

Synthesis of Homo-Brush Polymers:

A 20 mL vial was charged with a stir bar, 200 mg of MM-1 (29.5 μmol) or 177 mg MM-2 (29.5 μmol), and 3.0 mL of THF. With rapid stirring 10 μL of an appropriate concentration of 1 in THF was quickly added via syringe. For kinetic analysis a 0.2 mL aliquot of the reaction solution was taken at pre-determined time intervals and injected into a 2.0 mL septum sealed vial containing a solution of 25 μL of ethyl vinyl ether in 0.7 mL of THF. The aliquot was analyzed by GPC to determine the percent macromonomer conversion by comparing the peaks corresponding to the brush polymer and the unreacted macromonomer. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight.

Homo-Brush Polymer from MM-1: $^1$H NMR (CDCl$_3$, 300 MHz, 25° C.): δ 5.78 (bs), 3.94-3.3 (m), 3.68 (bs), 3.22 (bs), 1.85-1.45 (m), 1.28 (bs), 1.11-1.01 (bs), 0.87 (bs). dn/dc=0.0800 mL/g.

Homo-Brush Polymer from MM-2: $^1$H NMR (CDCl$_3$, 300 MHz, 25° C.): δ 7.35-6.96 (m), 5.67 (bs), 3.91 (bs), 3.67 (bs), 3.25 (bs), 2.57 (bs), 1.52 (bs), 1.27 (bs). dn/dc=0.143 mL/g.

Synthesis of Brush Block Copolymers:

A 20 mL vial was charged with a stir bar, 200 mg of MM-1 (29.5 μmol), and 3.0 mL of THF. With rapid stirring 10 μL of an appropriate concentration of 1 in THF was quickly added via syringe. At predetermined time intervals 177 mg of MM-2 (29.5 μmol) was added as a solid and the solution was allowed to react as specified in the polymerization tables. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight. No unreacted macromonomer was present in the isolated brush block copolymer, as determined by GPC analysis.

$^1$H NMR (CDCl$_3$, 300 MHz, 25° C.): δ 7.35-6.96 (m), 5.67 (bs), 4.18-3.33 (m), 3.23 (bs), 2.54 (bs), 1.94-1.42 (m), 1.28 (bs), 1.13-0.99 (m), 0.87 (bs). dn/dc values for runs 7-11 in Table 2=0.128, 0.108, 0.124, 0.110, and 0.0909 mL/g, respectively.

REFERENCES 1. (a) Grimm, N. B.; Faeth, S. H.; Golubiewski, N. E.; Redman, C. L.; Wu, J.; Bai, X.; Briggs, J. M. *Science* 2008, 319, 756-760. (b) Karl, T. R.; Trenberth, K. E. *Science* 2003, 302, 1719-1723.
2. (a) Peng, S.; Piao, S.; Ciais, P.; Friedlingstein, P.; Ottle, C.; Bréon, F.; Nan, H.; Zhou, L.; Myneni, R. B. *Environ. Sci. Technol.* 2012, 46, 696-703. (b) Kalnay, E.; Cai, M. *Nature* 2003, 423, 528-531.
3. (a) Rizwan, A. M.; Dennis, L. Y. C.; Liu, C. *Journal of Environmental Sciences* 2008, 20, 120-128. (b) Akbari, H.; Pomerantz, M.; Taha, H *Solar Energy* 2001, 70, 295-310.
4. (a) Crutzen, P. J. *Atmospheric Envrironment* 2004, 38, 3539-3540. (b) Bennett, M.; Saab, A. E. *Atmospheric Environment* 1982, 16, 1797-1822.
5. Patz, J. A.; Campbell-Lendrum, D.; Holloway, T.; Foley, J. A. *Nature* 2005, 438, 310-317.
6. (a) Ge, J.; Yin, Y. *Angew. Chem. Int. Ed.* 2011, 50, 1492-1522. (b) Galisteo-López, J. F.; Ibisate, M.; Sapienza, R.; Froufe-Perez, L. S.; Blanco, Á.; Lopez, C. *Adv. Mater.* 2011, 23, 30-69. (c) Wang, J.; Zhang, Y.; Wang, S.; Song, Y.; Jiang, L. *Acc. Chem. Res.* 2011, 44, 405-415. (d) Aguirre, C. I.; Reguera, E.; Stein, A. *Adv. Funct. Mater.* 2010, 20, 2565-2578. (d) Moon, J. H.; Yang, S. *Chem. Rev.* 2010, 110, 547-574.
7. (a) Bates, F. S.; Hillmyer, M. A.; Lodge, T. P.; Bates, C. M.; Delaney, K. T.; Fredrickson, G. H. *Science* 2012, 336, 434-440. (b) Park, C.; Yoon, J.; Thomas, E. L. *Polymer* 2003, 44, 6725-6760.
8. For selected reviews see: (a) Paquet, C.; Kumacheva, E. *Materials Today* 2008, 11, 48-56. (b) Yoon, J.; Lee, W.; Thomas, E. L. *MRS Bull.* 2005, 30, 721-726. (c) Edrington, A. C.; Urbas, A. M.; DeRege, P.; Chen, C. X.; Swager, T. M.; Hadjichristidis, N.; Xenidou, M.; Fetters, L. J.; Joannopoulos, J. D.; Fink, Y.; Thomas, E. L. *Adv. Mater.* 2001, 13, 421-425. (d) Fink, Y.; Urbas, A. M.; Bawendi, M. G.; Joannopoulos, J. D.; Thomas, E. L. *J. Lightwave Technol.* 1999, 17, 1963-1969.
9. For selected examples see: (a) Hustad, P. D.; Marchand, G. R.; Garcia-Meitin, E. I.; Roberts, P. L.; Weinhold, J. D. *Macromolecules* 2009, 42, 3788-3794. (b) Rzayev, J. *Macromolecules* 2009, 42, 2135-2141. (c) Runge, M. B.; Bowden, N. B. *J. Am. Chem. Soc.* 2007, 129, 10551-10560. (d) Yoon, J.; Mathers, R. T.; Coates, G. W.; Thomas, E. L. *Macromolecules* 2006, 39, 1913-1919.
10. (a) Parnell, A. J.; Pryke, A.; Mykhaylyk, O. O.; Howse, J. R.; Adawi, A. M.; Terrill, N. J.; Fairclough, J. P. A. *Soft Mater* 2011, 7, 3721-3725. (b) Kang, C.; Kim, E.; Baek, H.; Hwang, K.; Kwak, D.; Kang, Y.; Thomas, E. L. *J. Am. Chem. Soc.* 2009, 131, 7538-7539. (c) Yoon, J.; Lee, W.; Thomas, E. L. *Macromolecules* 2008, 41, 4582-4584. (d) Kang, Y.; Walish, J. J.; Gorishnyy, T.; Thomas, E. L. *Nature Mater.* 2007, 6, 957-960.
11. (a) Urbas, A.; Sharp, R.; Fink, Y.; Thomas, E. L.; Xenidou, M.; Fetters, L. J. *Adv. Mater.* 2000, 12, 812-814. (b) Urbas, A.; Fink, Y.; Thomas, E. L. *Macromolecules* 1999, 32, 4748-4750.
12. Sveinbjornsson, B. R.; Weitekamp, R. A.; Miyake, G. M.; Xia, Y.; Atwater, H. A.; Grubbs, R. H. *Submitted* 2012.
13. (a) Vougioukalakis, G. C.; Grubbs, R. H. *Chem. Rev.* 2010, 110, 1746-1787. (b) Leitgeb, A.; Wappel, J.; Slugovc, C. *Polymer* 2010, 51, 2927-2946. (c) Bielawski, C. W.; Grubbs, R. H. in *Controlled and Living Polymerizations*. Müller, A. H. E.; Matyjaszewski, K. Eds.; Wiley-VCH: Weinheim, Germany. 2009; pp 297-342. (d) Bielawski, C. W.; Grubbs, R. H. *Prog. Polym. Sci.* 2007, 32, 1-29. (e) Slugovc, C. *Macromol. Rapid Commun.* 2004, 25, 1283-1297.
14. (a) Xia, Y.; Olsen, B. D.; Kornfield, J. A.; Grubbs, R. H. *J. Am. Chem. Soc.* 2009, 131, 18525-18532. (b) Xia, Y.; Kornfield, J. A.; Grubbs, R. H. *Macromolecules* 2009, 42, 3761-3766.
15. Sumerlin, B. S.; Matyjaszewski, K. (2007) in *Macromolecular Engineering: Precise Synthesis, Materials*

Properties, Applications. Matyjaszewski, K.; Gnanou, Y.; Leibler, L. Eds.; Wiley-VCH: Weinheim, Germany. 2007.
16. Hu, M.; Xia, Y.; McKenna, G. B.; Kornfield, J. A.; Grubbs, R. H. *Macromolecules* 2011, 44, 6935-6934.
17. (a) Yashima, E.; Maeda, K.; Iida, H.; Furusho, Y.; Nagai, K. *Chem. Rev.* 2009, 109, 6102-6211. (b) Green, M. M.; Park. J.; Sato, T.; Teramoto, A.; Lifson, S.; Selinger, R. L. B.; Selinger, J. V. *Angew. Chem. Int. Ed.* 1999, 38, 3138-3154. (c) Mayer, S.; Zentel, R. *Prog. Polym. Sci.* 2001, 26, 1973-2013.
18. Kikuchi, M.; Lien, L. T. N.; Narumi, A.; Jinbo, Y.; Izumi, Y.; Nagai, K.; Kawaguchi, S. *Macromolecules* 2008, 41, 6564-6572.
19. (a) Patten, T.; Novak, B. M. *J. Am. Chem. Soc.* 1996, 118, 1906-1916. (b) Patten, T. E.; Novak, B. M. *J. Am. Chem. Soc.* 1991, 113, 5065-5066.
20. Albert, J. N. L.; Epps, T. H. *Materials Today* 2010, 13, 24-33.
21. Matsen, M. W.; Bates, F. S. *J. Poly. Sci. Part B: Polym. Phys.* 1997, 35, 945-952.
22. Orfanidis, S. J. Electromagnetic Waves and Antennas. Online book, retrieved May 2012. http://http://www.ece-.rutgers.edu/~orfanidi/ewa
23. Love, J. A.; Morgan, J. P.; Trnka, T. M.; Grubbs, R. H. *Angew. Chem., Int. Ed.* 2002, 41, 4035-4037.
24. Pangborn, A. B.; Giardello, M. A.; Grubbs, R. H.; Rosen, R. K.; Timmer, F. *J. Organometallics* 1996, 15, 1518-1520.
25. Matson, J. B.; Grubbs, R. H. *J. Am. Chem. Soc.* 2008, 130, 6731-6733.

Example 2: Precisely Tunable Photonic Crystals from Rapidly Self-Assembling Brush Block Copolymer Blends Block copolymers (BCPs) are ideal large area photonic band gap materials because of their low cost potential in terms of both raw material and "bottom-up" fabrication via self-assembly.[1] The microphase segregation of chemically distinct polymer blocks[2] to materials possessing a periodic dielectric function can form a photonic band gap that forbids the propagation of certain wavelengths of light through the bulk. Such materials are termed photonic crystals (PCs) and have many applications as optical filters, mirrors, and cavities.[3] In the simplest scenario, 1-D PCs are constructed from alternating layers of materials, where the reflected wavelength is determined by the thickness and refractive index of each layer. Unfortunately, chain-entanglement, a definitive polymer characteristic, most often restricts the ability of ultra-high molecular weight (MW) BCPs to self-assemble to ordered domains large enough to reflect long wavelengths of light. Thus, BCP based PCs usually only reflect wavelengths of light as long as green,[4] while longer wavelengths are only accessible with domain swelling with added components (i.e. solvent[5] or homo-polymers[6]), typically requiring complex annealing procedures, which greatly reduces their potential applications.

High MW brush BCPs are able to rapidly self-assemble, due to their reduced chain-entanglement, to PCs that can reflect all wavelengths of light from the UV to the near infrared without relying on any additional swelling components.[7] Utilizing ruthenium mediated ring-opening metathesis polymerization (ROMP)[8] we have developed a "grafting-through" polymerization of macromonomers (MMs) to ultra-high MW brush polymers.[9] The "grafting-through" polymerization of MMs affords highly uniform brush BCP's, where the sterically demanding array of low MW side-chains greatly reduces chain-entanglement, enforcing the unifying main-chain to assume a highly elongated conformation.[10] As such, symmetric brush BCP's readily self-assemble without complicated annealing methods to stacked lamellae composed of alternating layers of the different blocks, providing a facile means to 1-D PC architectures (Scheme 1).[7] The domain sizes directly scale with the MW of the BCP enabling the wavelength of reflected light to be predictably modulated by synthetically controlling the polymer MW.[7] Although this approach successfully produces PCs that reflect target wavelengths of light, it requires that a specific MW brush BCP must be synthesized to reflect each wavelength of light; a more flexible and desirable technology would be post-synthetically tunable, bypassing such application-specific synthetic requirements.

Scheme 1. ROMP of macromonomers to brush block copolymers and their self-assembly to photonic crystals.

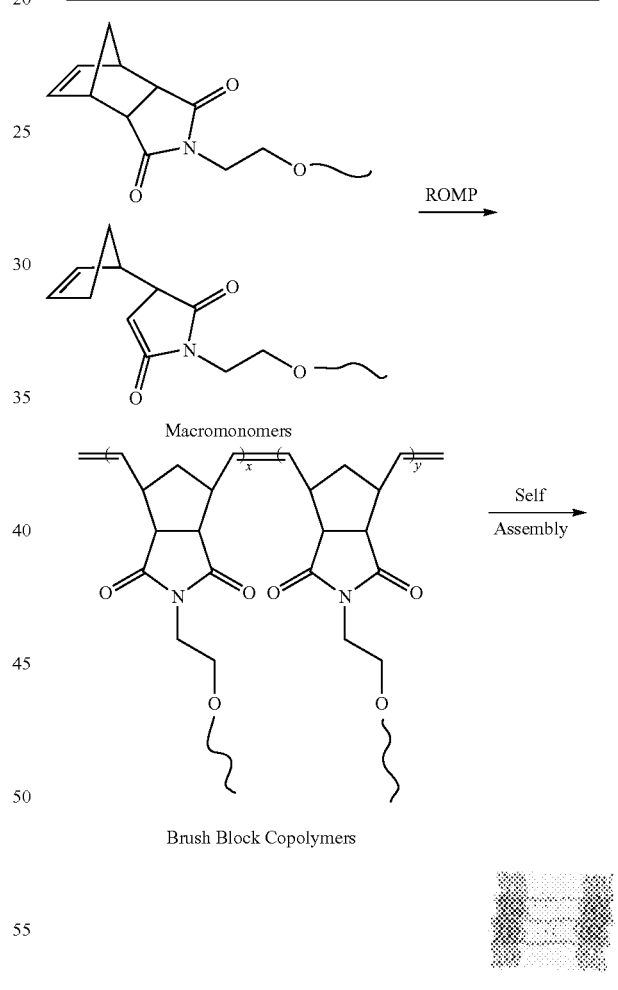

In the case of linear random coil, symmetric BCPs it has been demonstrated that polymer blends of two different MW BCPs can self-assemble to uniform stacked lamellar morphologies, if the ratio of the polymer MWs is less than five.[11] The resulting size is an average of the relative ratio of the two components and is permitted by the conforming and flexible characteristics of random coil linear BCPs as they access morphologies that minimize enthalpy interaction parameters through a proposed mechanism involving stretching of the low MW BCP and a compression of the high MW BCP. Additionally, similar blends of linear BCPs, in the presence of a swelling solvent and shear alignment, can exhibit temporary photonic crystal characteristics, reflecting light across the visible spectrum, which are lost upon solvent evaporation.[5a] In this Example, we report a study of blends of brush BCPs of different MW and the ability of these materials to assume similar conforming morphologies, despite their inherently rigid architectures, as a means to readily modulate the domain sizes, and thus the bandgaps of the PCs. Using this technique, it was found that the wavelength of reflected light is precisely tunable across the visible spectrum of light and into the near infrared (NIR), simply through controlling the relative incorporation of the two polymers, greatly enhancing the practicality of brush BCP PCs.

Figure 6:
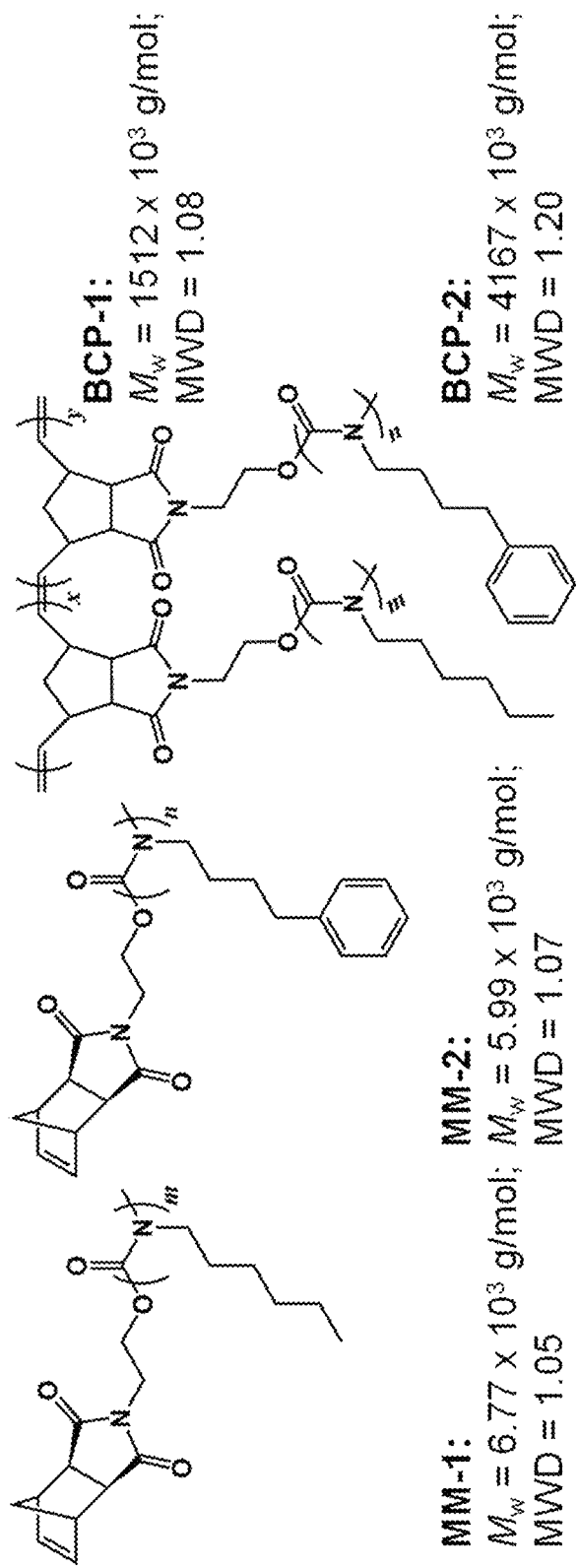
FIG. 6. Structures and molecular weight properties of macromonomers and brush block copolymers utilized in this Example 2.

FIG. 6 provides structures and molecular weight properties of macromonomers and brush block copolymers utilized in this Example 2.

The two different MW brush BCPs employed in this study were constructed through sequential ROMP of equal amounts of exo-norbornene functionalized hexyl isocyanate (MM-1) and 4-phenyl butyl isocyanate (MM-2) MMs (see, FIG. 6).[7b] A film of the lower MW brush BCP (BCP-1: weight average MW $[M_w]=1512\times10^3$ g/mol, molecular weight distribution [MWD]=1.08) prepared by the controlled evaporation from DCM exhibited a maximum peak reflectivity ($\lambda_{max}$) of 360 nm, while the film prepared in identical fashion of the higher MW brush BCP (BCP-2: $M_w=4167\times10^3$ g/mol, MWD=1.20) exhibited $\lambda_{max}=785$ nm. A film prepared from the controlled evaporation of a DCM solution of a 50:50 weight percent blend of BCP-1 and BCP-2 exhibited a single reflection peak with $\lambda_{max}=541$ nm. By varying the weight percent of the two brush BCP's from 100% BCP-1 to 100% BCP-2, at 10% intervals, a total of 11 different films were prepared. Each PC film showed a primary reflection peak where $\lambda_{max}$ was systematically tuned to increasing wavelengths of light with increasing incorporation of BCP-2. Most impressively, a highly linear trend ($R^2=0.989$) in increasing $\lambda_{max}$ as a function of increasing weight percent BCP-2 was established, allowing for the production of PCs that reflect all wavelengths of light across the visible spectrum and into the near IR (see, FIG. 7).

Figure 7:
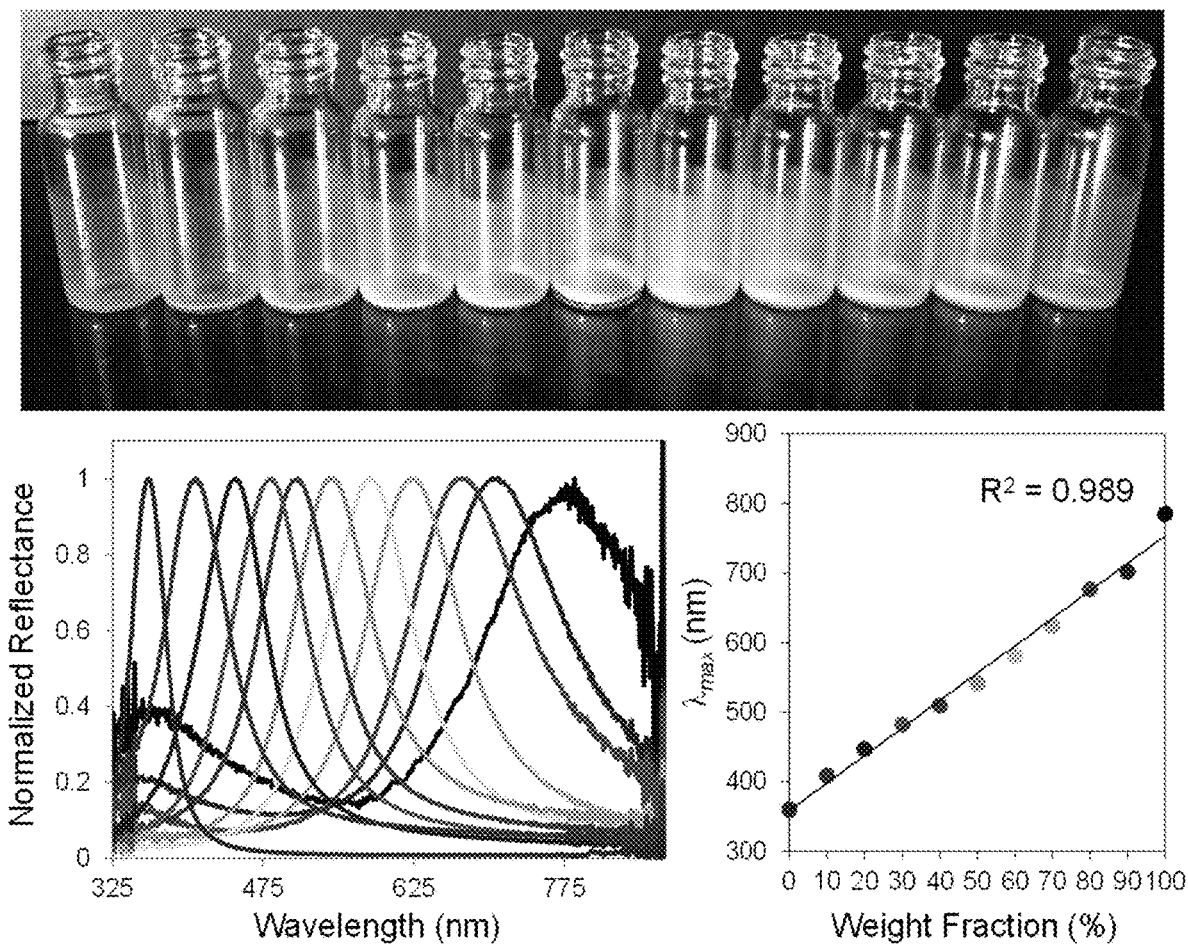
FIG. 7. Photograph of brush block copolymer blends reflecting light across the visible spectrum (top). Plots of reflectance vs. wavelength (bottom-left) and maximum peak wavelength of reflectance vs. weight fraction of blend (% BCP-2, bottom-right) of the different block copolymer blends.

FIG. 7 provides photograph of brush block copolymer blends reflecting light across the visible spectrum (top). Plots of reflectance vs. wavelength (bottom-left) and maximum peak wavelength of reflectance vs. weight fraction of blend (% BCP-2, bottom-right) of the different block copolymer blends.

These results strongly suggest that despite the rigid architecture of the brush BCPs, the blends of the two different MW polymers are able to conform to uniform domains where the size is dictated by the relative ratio of the two components. We have previously established that the brush BCP's rapidly self-assemble to stacked lamellae. However, the mechanism of the blends to form such uniform domains remained unclear. The two most obvious routes would include the conforming assembly of the blends to stacked lamellae where the domains scale as an average of the two BCPs, similar to the mechanism followed by linear BCPs or through a gradual change in polymer morphology to compensate for the varying ratios of the two BCPs. To gain insight into the blending mechanism, scanning electron microscopy (SEM) was utilized to visually image the morphologies of the films.

Figure 8:
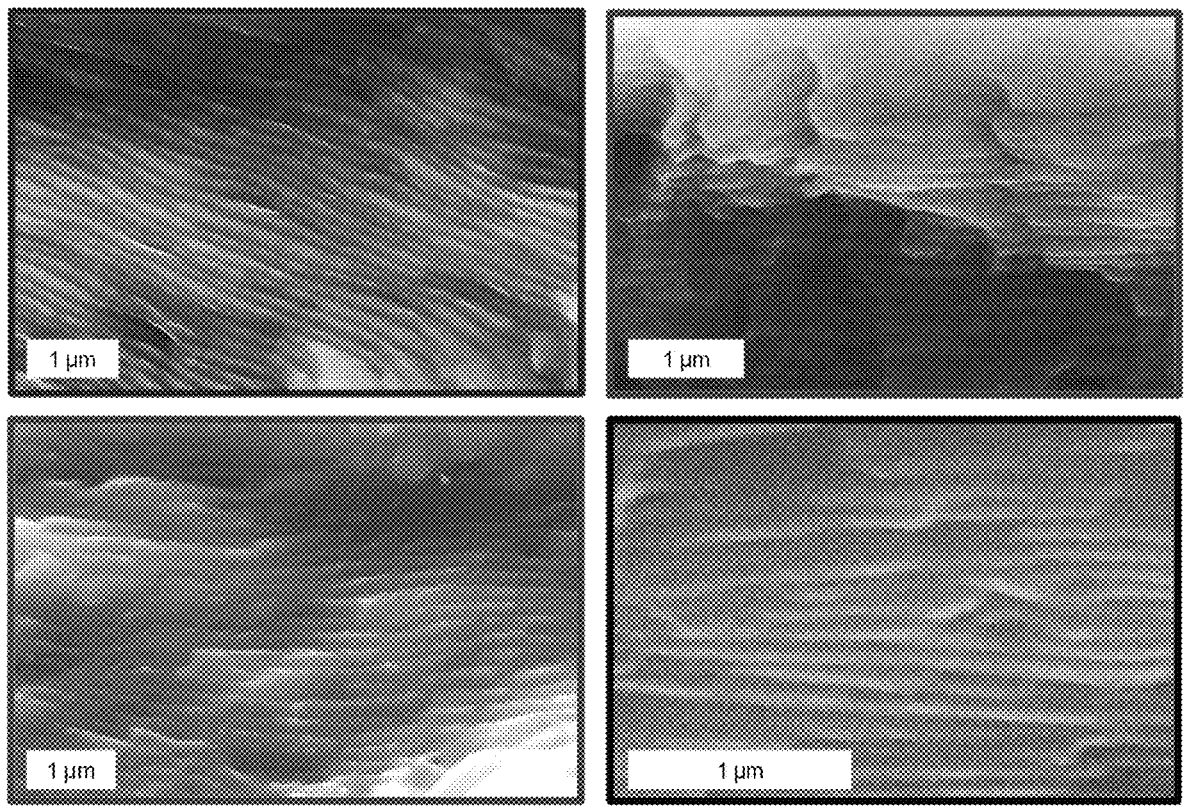
FIG. 8. SEM images of cross-sections of block copolymer blends with 0% (top-right), 30% (top-right), 80% (bottom-left), and 100% (bottom-right) of BCP-2. Perspective places the glass substrate parallel with the text.

FIG. 8 provides SEM images of cross-sections of block copolymer blends with 0% (top-right), 30% (top-right), 80% (bottom-left), and 100% (bottom-right) of BCP-2. Perspective places the glass substrate parallel with the text.

For all BCP blends, highly ordered stacked lamellae were observed in the SEM analysis (see, FIG. 8). These data strongly support the proposal that the different MW BCPs are able to adopt structures similar to their linear analogues, [11] necessitating an elongation of BCP-1 and a structural distortion of BCP-2. Although it is highly unlikely that the brush BCPs are able to partake in extreme chain-folding because of their inherently rigid structures, bending of BCP-2 to conform to the lowest enthalpy state must be occurring to some extent to explain for the resulting highly uniform domains of the blends.

Blending of two different molecular weight brush block copolymers affords an effective means to simply control the domain sizes, and thus photonic properties of these materials. This blending strategy can be applied to any type of system with a brush copolymer that can be synthesized from any means with varying amounts of grafting density. It could also include the incorporation of other materials, including but not limited to, other homo-polymers, or any type of copolymer (di, tri, statistical, etc.) that are constructed from organic or inorganic materials. The brush copolymer does not need to be a di-block copolymer, but can also include statistical copolymers, or tri-block, or any number of blocks. Additionally, the ratio in MWs can be varied to access different morphologies. It can also apply to non-symmetric brush block copolymers, including asymmetry in molecular weight of the macromonomer, grafting density, or the relative incorporation of the macromonomers. The number of blending components can exceed 2, and be any combination of the above mentioned components. The materials can also be swelled with solvents or small molecules and may or may not be cross-linked with covalent or non-covalent interactions. Furthermore, blending of two different molecular weight brush block copolymers provided an alternative means to readily modulate the domain sizes and photonic properties of these materials.

We have shown that blends between different MW brush BCPs form highly uniform, stacked lamellar morphologies. The resulting domains of the 1-D PC architectures scale linearly with the weight percent incorporation of the two polymers. Thus, a wide range of readily tunable photonic band gap materials can be easily fabricated simply through blending of two polymers. Because the brush BCP's rigid architecture greatly minimizes chain-entanglement, these blends rapidly self-assemble through controlled solvent evaporation of a volatile solvent, however, there appears to be sufficient flexibility to conform to precise layered structures. We foresee that this simple, "bottom-up", readily tunable approach provides an attractive means to precisely tunable photonic band gap materials through the rapid self-assembly of brush BCP blends.

Experimental Section

The synthesis and characterization of the macromonomers and brush block copolymers has been described previously.[7b] Blends were prepared by mixing stock solutions (c=1.5 g/L; DCM) of BCP-1 and BCP-2 (10 mL total volume) in a 20 mL vial. A glass slide that had been previously washed with methanol and hexanes was placed vertically into the vial as the solvent was allowed to evaporate. Reflection measurements were performed on a Cary 5000 UV/Vis/NIR spectrophotometer, equipped with an 'integrating sphere' diffuse reflectance accessory (Internal DRA 1800). All measurements were referenced to a LabSphere Spectralon 99% certified reflectance standard. The samples were illuminated through a Spectralon-coated aperature with a diameter of 1 cm, with a beam area of approximately 0.5 cm$^2$. The samples were scanned at a rate of 600 nm/min, with a 1 nm data interval, from 1800 to 200 nm, with a detector crossover (InGaAs to PMT) at 875 nm. SEM images of freeze-fractured samples that were stained with $RuO_4$ and carbon coated were taken on a ZEISS 1550 VP Field Emission SEM.

REFERENCES

[1] For selected reviews see: a) C. Paquet, E. Kumacheva, *Materials Today* 2008, 11, 48-56; b) J. Yoon, W. Lee, E. L. Thomas, *MRS Bull.* 2005, 30, 721-726; c) A. C. Edrington, A. M. Urbas, P. DeRege, C. X. Chen, T. M. Swager, N. Hadjichristidis, M. Xenidou, L. J. Fetters, J. D. Joannopoulos, Y. Fink, E. L. Thomas, *Adv. Mater.* 2001, 13, 421-425; d) Y. Fink, A. M. Urbas, M. G. Bawendi, J. D. Joannopoulos, E. L. Thomas, *J. Lightwave Technol.* 1999, 17, 1963-1969.

[2] a) F. S. Bates, M. A. Hillmyer, T. P. Lodge, C. M. Bates, K. T. Delaney, G. H. Fredrickson, *Science* 2012, 336, 434-440; b) C. Park, J. Yoon, E. L. Thomas, *Polymer* 2003, 44, 6725-6760.

[3] a) J. Ge, Y. Yin, *Angew. Chem. Int. Ed.* 2011, 50, 1492-1522; b) J. F. Galisteo-López, M. Ibisate, R. Sapienza, L. S. Froufe-Pérez, Á. Blanco, C. López, *Adv. Mater.* 2011, 23, 30-69; c) J. Wang, Y. Zhang, S. Wang, Y. Song, L. Jiang, *Acc. Chem. Res.* 2011, 44, 405-415; d) C. I. Aguirre, E. Reguera, A. Stein, *Adv. Funct. Mater.* 2010, 20, 2565-2578; d) J. H. Moon, S. Yang, *Chem. Rev.* 2010, 110, 547-574.

[4] For selected examples see: a) P. D. Hustad, G. R. Marchand, E. I. Garcia-Meitin, P. L. Roberts, J. D. Weinhold, *Macromolecules* 2009, 42, 3788-3794; b) J. Rzayev, *Macromolecules* 2009, 42, 2135-2141; c) M. B. Runge, N. B. Bowden, *J. Am. Chem. Soc.* 2007, 129, 10551-10560; d) J. Yoon, R. T. Mathers, G. W. Coates, E. L. Thomas, *Macromolecules* 2006, 39, 1913-1919.

[5] a) A. J. Parnell, A. Pryke, O. O. Mykhaylyk, J. R. Howse, A. M. Adawi, N. J. Terrill, J. P. A. Fairclough, *Soft Mater* 2011, 7, 3721-3725; b) C. Kang, E. Kim, H. Baek, K. Hwang, D. Kwak, Y. Kang, E. L. Thomas, *J. Am. Chem. Soc.* 2009, 131, 7538-7539; c) J. Yoon, W. Lee, E. L. Thomas, *Macromolecules* 2008, 41, 4582-4584; d) Y. Kang, J. J. Walish, T. Gorishnyy, E. L. Thomas, *Nature Mater.* 2007, 6, 957-960.

[6] a) A. Urbas, R. Sharp, Y. Fink, E. L. Thomas, M. Xenidou, L. J. Fetters, *Adv. Mater.* 2000, 12, 812-814; b) A. Urbas, Y. Fink, E. L. Thomas, *Macromolecules* 1999, 32, 4748-4750.

[7] a) B. R. Sveinbjörnsson, R. A. Weitekamp, G. M. Miyake, Y. Xia, H. A. Atwater, R. H. Grubbs, *Submitted* 2012; b) G. M. Miyake, R. A. Weitekamp, V. A. Piunova, R. H. Grubbs, *Submitted* 2012.

[8] a) G. C. Vougioukalakis, R. H. Grubbs, *Chem. Rev.* 2010, 110, 1746-1787; b) A. Leitgeb, J. Wappel, C. Slugovc, *Polymer* 2010, 51, 2927-2946; (c) C. W. Bielawski, R. H. Grubbs in *Controlled and Living Polymerizations*. Müller, A. H. E.; Matyjaszewski, K. Eds.; Wiley-VCH: Weinheim, Germany. 2009; pp 297-342; d) C. W. Bielawski, R. H. Grubbs, *Prog. Polym. Sci.* 2007, 32, 1-29; e) C. Slugovc, *Macromol. Rapid Commun.* 2004, 25, 1283-1297.

[9] a) Y. Xia, B. D. Olsen, J. A. Kornfield, R. H. Grubbs, *J. Am. Chem. Soc.* 2009, 131, 18525-18532; b) Y. Xia, J. A. Kornfield, R. H. Grubbs, *Macromolecules* 2009, 42, 3761-3766.

[10] M. Hu, Y. Xia, G. B. McKenna, J. A. Kornfield, R. H. Grubbs, *Macromolecules* 2011, 44, 6935-6934.

[11] (a) D. Yamaguchi, T. Hashimoto. *Macromolecules* 2001, 34, 6495-6505. (b) L. Kane, M. M. Satkowski, S. D. Smith, R. J. Spontak. *Macromolecules* 1996, 29, 8862-8870. (c) T. Hashimoto, K. Yamasaki, S. Koizumi, H. Hasegawa. *Macromolecules* 1993, 26, 2895-2904.

Example 3: Blending of Different Molecular Weight Polymers

We report fabrication of photonic crystals by brush block-copolymer (BCPs) blending. By incrementally changing the ratio between two components in the blend we were able to access photonic crystals that reflected across the spectrum, anywhere from UV into near IR. A similar strategy was pursued using on dendronized block-copolymers, where macromolecular pendant chain was replaced with Newkome-type dendritic group, functionalized with either benzyl ether group or long aliphatic chain.

Figure 9:
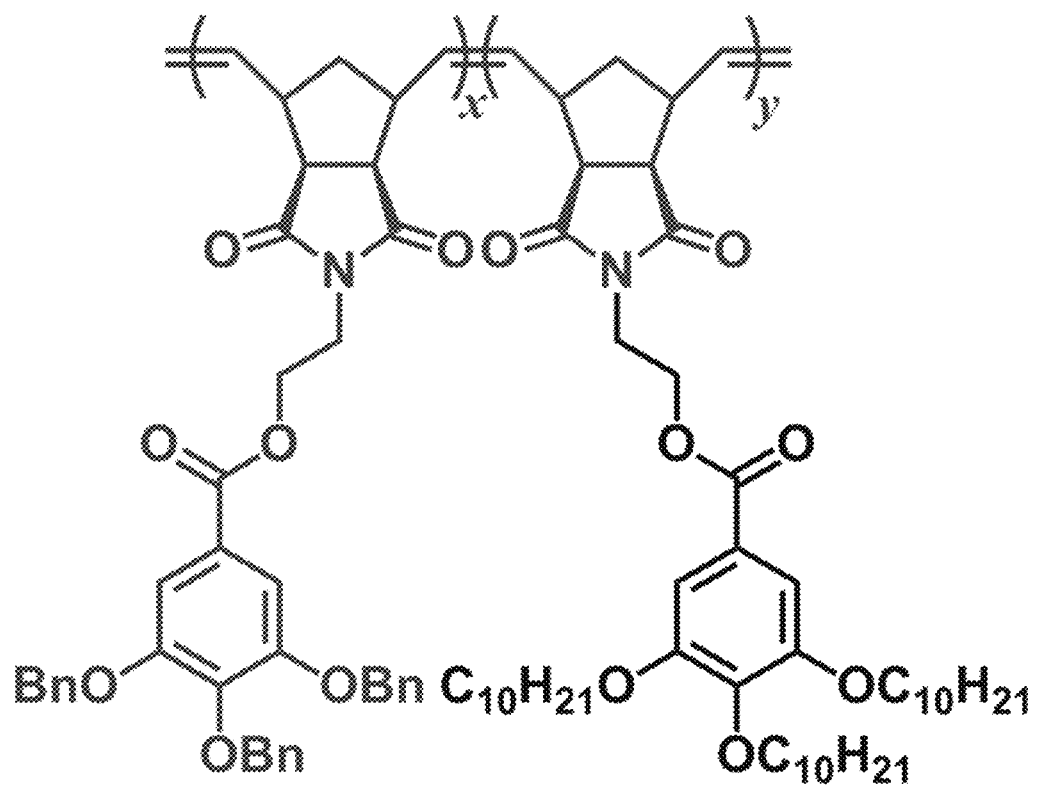
FIG. 9. Structure of wedge-type block copolymers.
Figure 12:
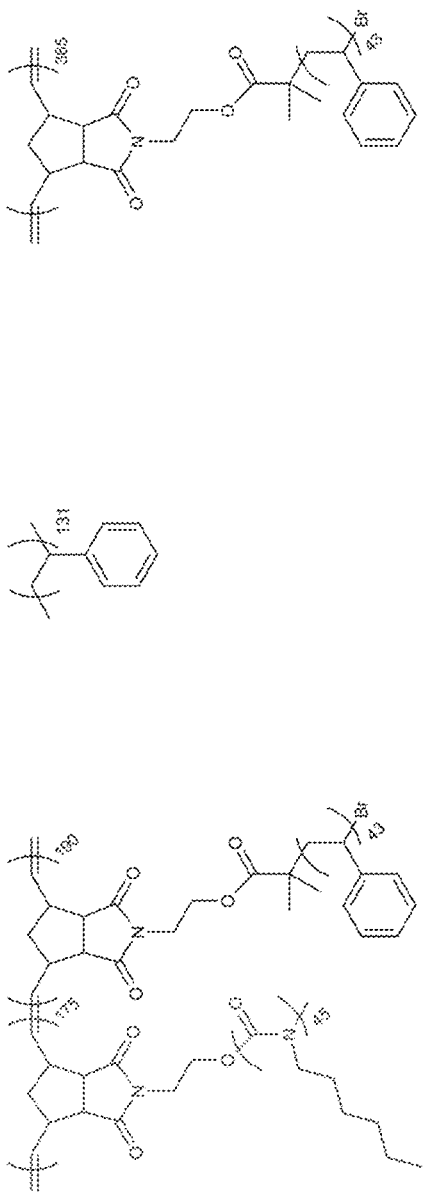
FIG. 12. Structures of brush block copolymer, linear polystyrene, and polynorbornene-graft-polystyrene.

FIG. 9 provides structure of wedge-type block copolymers and FIG. 12 provides structures of brush block copolymer, linear polystyrene, and polynorbornene-graft-polystyrene.

According to the earlier reported data on certain linear symmetrical BCPs a blend will maintain stacked lamellae morphology as long as the ratio between molecular weight of two components is less than 5. Thus for our study we chose two dendronized BCPs samples with $M_w$: 480 kDa (PDI=1.05) reflecting in UV ($\lambda_{max}$=330 nm) and 1250 kDa (PDI=1.10) reflecting red ($\lambda_{max}$=768 nm). Films were prepared by controlled evaporation from dichloromethane solution in weight percent ratios of 25:75, 50:50 and 75:25. All films exhibited a primary reflection peak with $\lambda_{max}$ increasing linearly with increasing incorporation of higher molecular weight component (see, FIG. 10) and Table 3.

Figure 10:
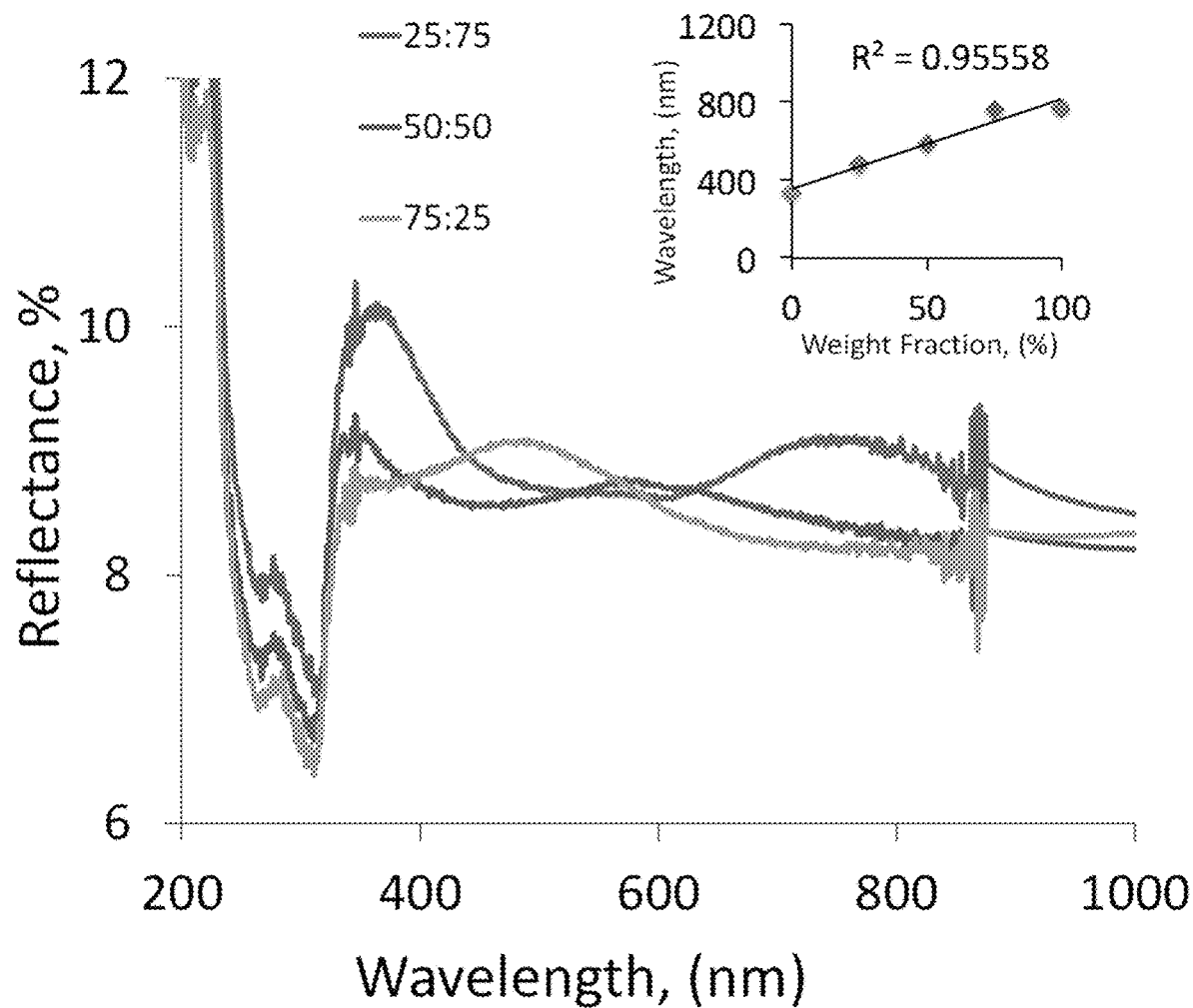
FIG. 10. Plot of reflectance as a function of wavelength of the dendronized BCP blends. Insert represent linear correlation between weight fraction and wavelength of reflectance.

FIG. 10 provides plots of reflectance as a function of wavelength of the dendronized BCP blends. The insert represents linear correlation between weight fraction and wavelength of reflectance.

TABLE 3

Summary of reflectance data

| Weight fraction (%) | $\lambda_{max}$ (nm) |
|---|---|
| 0 | 330 |
| 25 | 490 |
| 50 | 586 |
| 75 | 755 |
| 100 | 768 |

To get understanding of the blending mechanism scanning electron microscopy (SEM) was employed. Stacked lamellar morphology was observed for 75:25 and 50:50 blends while morphology of 75:25 appeared to be amorphous (see, FIG. 11).

Figure 11:
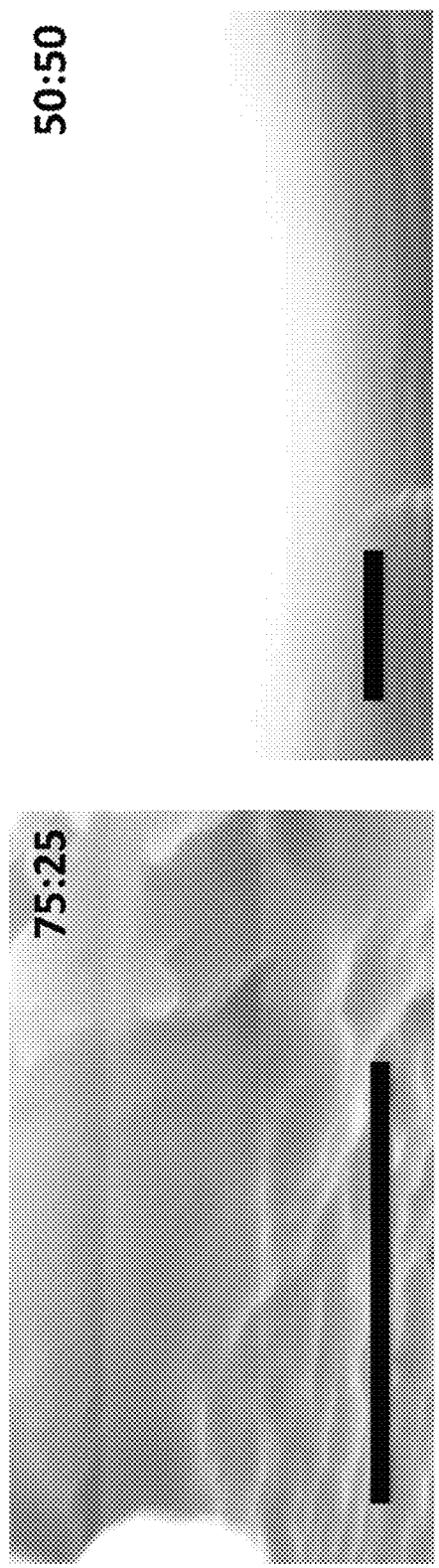
FIG. 11. SEM images of cross-sections of dendronized BCPs with 25% and 50% of polymer with $M_w$=1250 kDa.

FIG. 11 provides SEM images of cross-sections of dendronized BCPs with 25% and 50% of polymer with $M_w$=1250 kDa.

Figure 13:
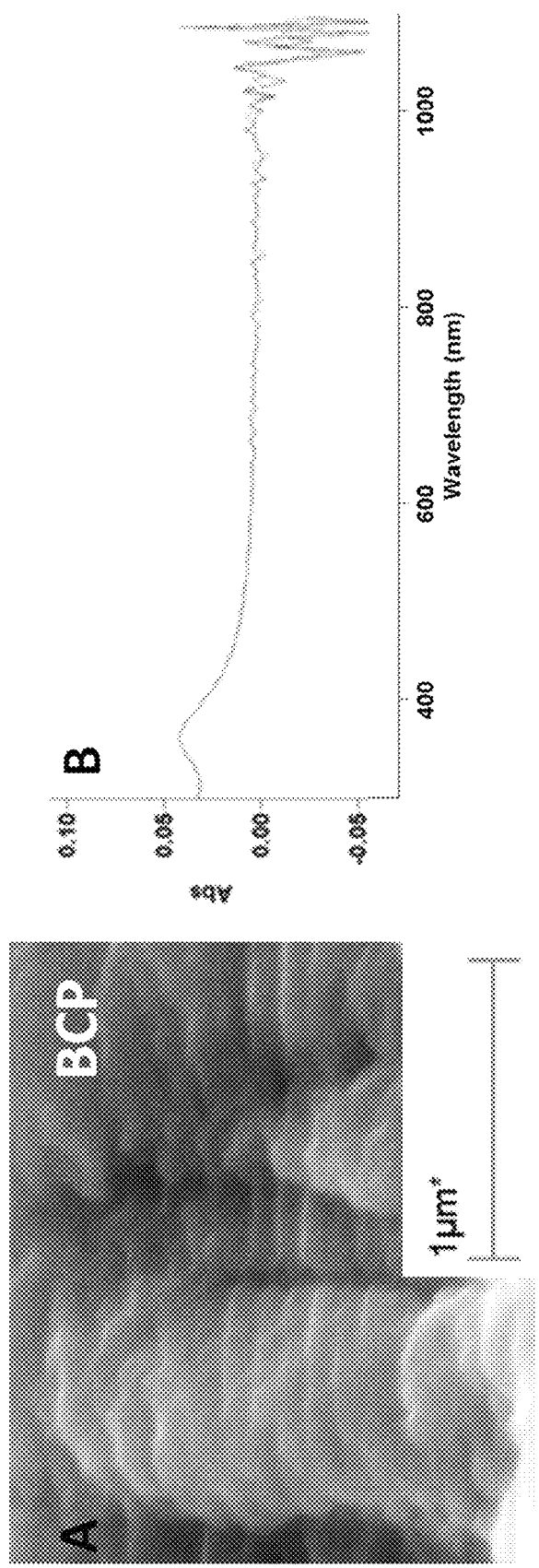
FIG. 13. A. Scanning electron micrograph of a thin film of a brush block copolymer constructed from polyhexyl isocyanate and polystyrene macromonomers showing stacked lamellar morphology. B. Absorbance spectrum showing the film reflects around 400 nm light.

FIG. 13 provides: A. Scanning electron micrograph of a thin film of a brush block copolymer constructed from polyhexyl isocyanate and polystyrene macromonomers showing stacked lamellar morphology. B. Absorbance spectrum showing the film reflects around 400 nm light.

The brush block copolymer was constructed through the sequential ruthenium mediated ring-opening metathesis polymerization of a polyhexylisocyanate and polystyrene macromonomer. This polymer had a molecular weight (weight average molecular weight [$M_w$=1547 kDa]) and a polydispersity index (PDI) of 1.58. A thin film of this polymer was fabricated through controlled evaporation to yield a uniform nanostructured dielectric mirror that reflected light around 400 nm (see, FIG. 13). In these experiments, UV-vis analysis was utilized to estimate the light reflecting properties of the photonic crystals. As the materials in solution to not exhibit an absorbance in the visible spectrum, the "absorbance" peak in these plots correlates to the reflectance properties that arise due to periodic nanostructures of the solid state thin films and their photonic crystal properties.

Figure 14:
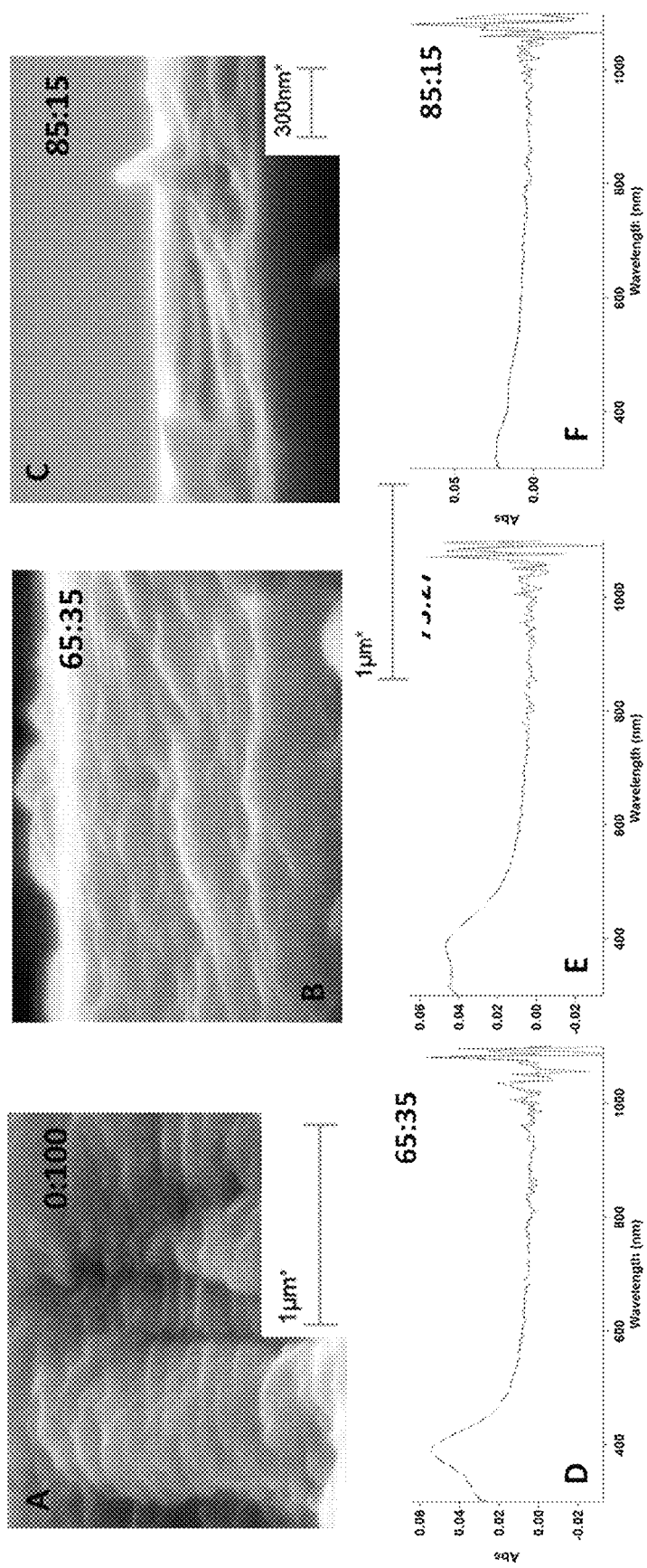
FIG. 14. Scanning electron micrograph of a thin film of blends of a brush block copolymer constructed from polyhexyl isocyanate and polystyrene macromonomers and linear polystyrene at 100 (A), 35 (B), and 15 (C) % brush block copolymer demonstrating the morphology evolution. Absorbance spectrum showing the light reflecting properties of the films can be altered introducing greater percentage of linear polystyrene.

FIG. 14 provides Scanning electron micrograph of a thin film of blends of a brush block copolymer constructed from polyhexyl isocyanate and polystyrene macromonomers and linear polystyrene at 100 (A), 35 (B), and 15 (C) % brush block copolymer demonstrating the morphology evolution. Absorbance spectrum showing the light reflecting properties of the films can be altered introducing greater percentage of linear polystyrene.

Figure 15:
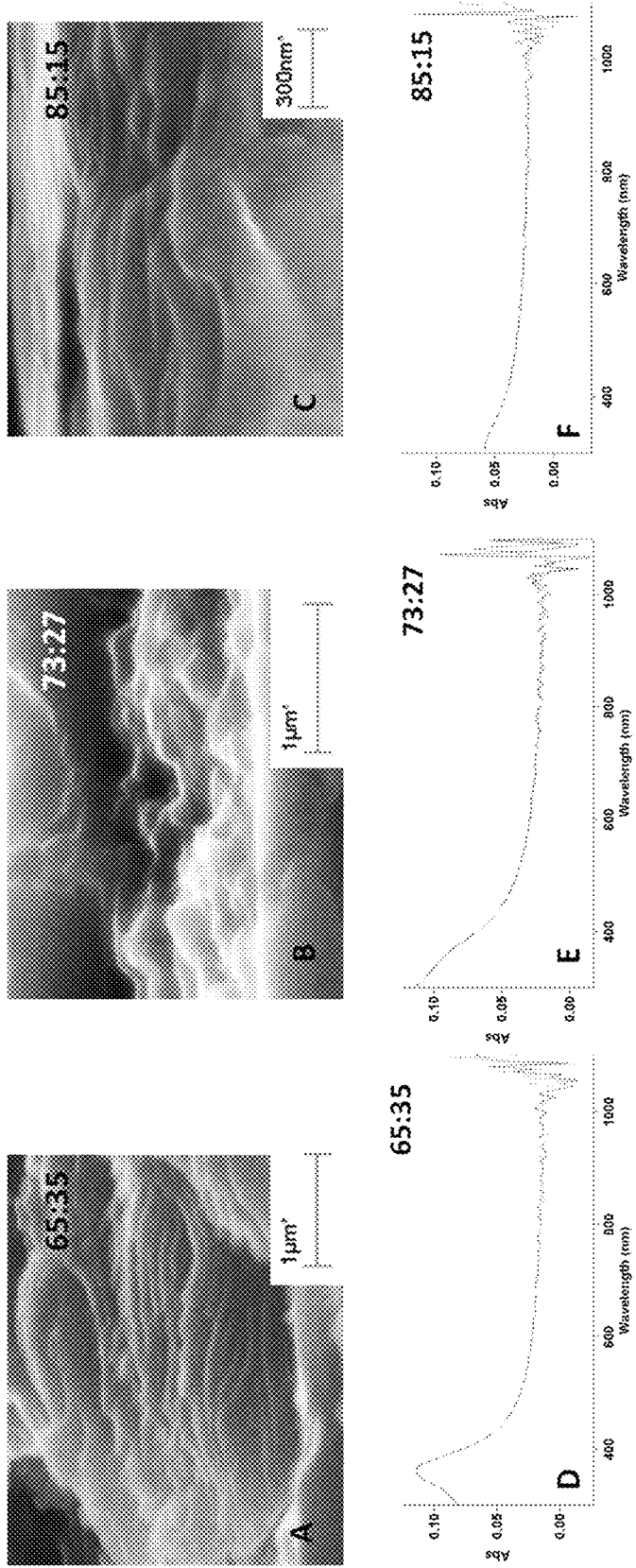
FIG. 15. A. Scanning electron micrograph of a thin film of blends of a brush block copolymer constructed from polyhexyl isocyanate and polystyrene macromonomers and polynorbornene-graft-polystyrene at 35 (A), 27 (B), and 15 (C) % brush block copolymer demonstrating the morphology evolution. Absorbance spectrum showing the light reflecting properties of the films can be altered introducing greater percentage of polynorbornene-graft-polystyrene.

FIG. 15 provides: A. Scanning electron micrograph of a thin film of blends of a brush block copolymer constructed from polyhexyl isocyanate and polystyrene macromonomers and polynorbornene-graft-polystyrene at 35 (A), 27 (B), and 15 (C) % brush block copolymer demonstrating the morphology evolution. Absorbance spectrum showing the light reflecting properties of the films can be altered introducing greater percentage of polynorbornene-graft-polystyrene.

This brush block copolymer was mixed with a linear polystyrene polymer (Mw=13.6 kDa; PDI=1.03). Blends were composed of weight fractions of 63:35, 73:27, and 85:15% of linear polystyrene to brush block copolymer. Altering the weight incorporation of the two components can alter the light reflecting properties and alter the nanostructured morphology (see, FIG. 14).

This brush block copolymer was blended with a polynorbornene-graft-polystyrene ($M_w$=1716 kDa; PDI=1.65) [FIG. 15].

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A structure comprising a supramolecular assembly of a polymer blend of at least one block copolymer and at least a second component; wherein said polymer blend comprises:
   a first block copolymer comprising:
   a first polymer block comprising first repeating units; wherein each of said first repeating units of said first polymer block comprises a first polymer backbone group directly or indirectly covalently linked to a first polymer side chain group; and
   a second polymer block comprising second repeating units; wherein each of said second repeating units of said second polymer block comprises a second polymer backbone group directly or indirectly covalently linked to a second polymer side chain group or second wedge group that is different than said first polymer side chain group;
   the second component having a composition that is different from said first block copolymer;
   wherein said first block copolymer has the formula (FX6A) or (FX6B1):

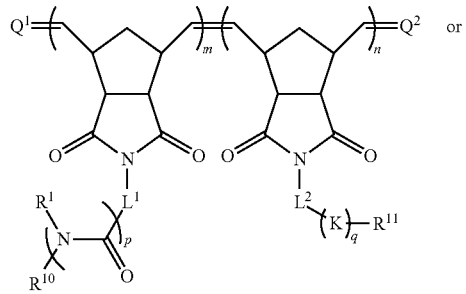

(FX6A)

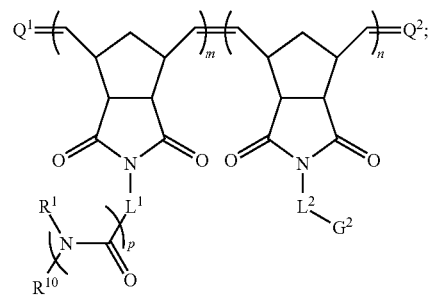

(FX6B1)

K is a repeating group of said second polymer side chain group, $G^2$ is said second wedge group; each of $R^{10}$ and $R^{11}$ is independently a polymer side chain terminating group; $L^1$ is a first linking group; $L^2$ is a second linking group; each of n and m is independently an integer selected from the range of 20 to 2000; each of p and q is independently an integer selected from the range of 30 to 2000; $R^1$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and
wherein each of $Q^1$ and $Q^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

2. The structure of claim 1, wherein said second component comprises a homopolymer, a copolymer, an oligomer, a solvent, a metal, a small molecule or particle.

3. The structure of claim 1, wherein said structure is formed via molecular self-assembly of said first block polymers and said second component of said polymer blend to generate said supramolecular assembly.

4. The structure of claim 1, wherein said structure is formed via thermal annealing, solvent annealing, spin coating, shear alignment, painting, tape casting, co-extrusion, drop casting, spray coating or by the application of an external pressure to said polymer blend.

5. The structure of claim 1 comprising a periodic structure or a photonic band gap material.

6. The structure of claim 1, wherein said structure absorbs, scatters or reflects electromagnetic radiation having wavelengths greater than or equal to 400 nm.

7. The structure of claim 1, wherein said structure is characterized by a periodically varying refractive index.

8. The structure of claim 1, wherein
a size (S) of the structure increases substantially linearly with molecular weight (MW) of said first block copolymer pursuant to the expression (E4) wherein $0.85 < x < 1$:

$$S \propto MW^x \quad (E4).$$

9. The structure of claim 1, wherein said second component is a second block copolymer comprising at least one polymer block different from said first polymer block and said second polymer block of said first block copolymer.

10. The structure of claim 9, wherein the ratio of the molecular weight of the first block copolymer to the molecular weight of the second block copolymer is selected over the range of 0.2 to 5.

11. The structure of claim 1, wherein each K is independently an unsubstituted or substituted isocyanate group, methacrylate group, acrylate group, acrylamide group, methacrylamide group, quinoxaline group, guanidine group, silane group, acetylene group, amino acid group, chloral group, lactide group, styrene group, acrylate group, tert-butyl, siloxane group, dimethylsiloxane group, n-butyl acrylate group, ethylene glycol group, ethylene oxide group, ethylene group, propylene group, tetrafluoroethylene group, or vinyl chloride group.

12. The structure of claim 1, wherein each of $R^{10}$ and $R^{11}$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

13. The structure of claim 1, wherein said first block copolymer has the formula (FX7):

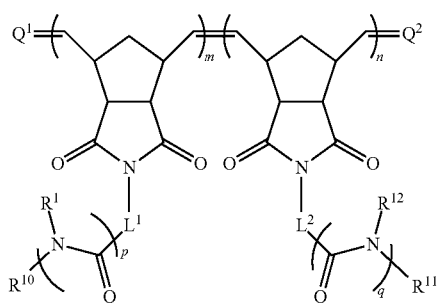

(FX7)

wherein $R^{12}$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and wherein $R^1$ and $R^{12}$ are different groups.

14. The structure of claim 13, wherein $R^1$ is a $C_1$-$C_{30}$ alkyl and $R^{12}$ is a $C_5$-$C_{30}$ aryl.

15. The structure of claim 13, having the formula (FX8a) or (FX8b):

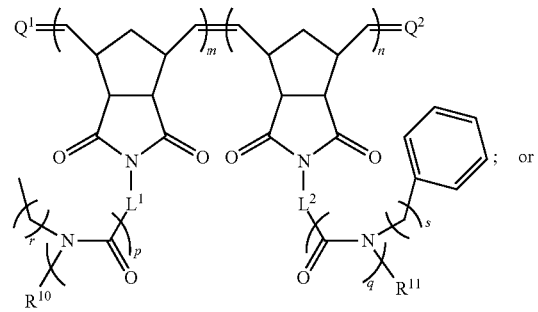

(FX8a)

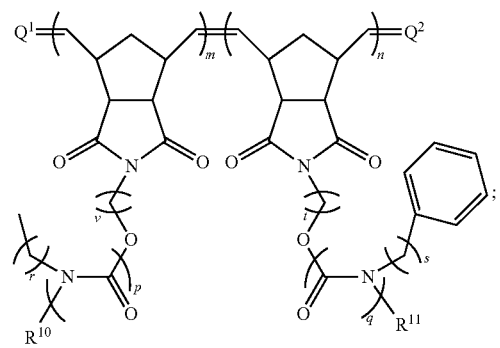

(FX8b)

wherein each of r, s, t and v are independently an integer selected from the range of 1 to 10.

16. The structure of claim 1 wherein said second polymer block comprises said second wedge groups.

17. The structure of claim 16, wherein each of said second wedge groups is characterized by at least two branch points each terminating in an independent terminating branch moiety comprising at least 4 atoms.

18. The structure of claim 16, wherein each of the second wedge groups is characterized by at least three branching points each terminating in an independent terminating branch moiety comprising at least 10 atoms.

19. The structure of claim 16, wherein each of said second wedge groups independently comprises a $C_2$-$C_{30}$ alkyl, $C_3$-$C_{30}$ cycloalkyl, $C_5$-$C_{30}$ aryl, $C_5$-$C_{30}$ heteroaryl, $C_2$-$C_{30}$ ester, $C_2$-$C_{30}$ ether, $C_2$-$C_{30}$ thioether, $C_2$-$C_{30}$ amine, $C_2$-$C_{30}$ imide, $C_2$-$C_{30}$ halocarbon chain, $C_2$-$C_{30}$ perfluorocarbon or $C_2$-$C_{30}$ polyethylene glycol.

20. The structure of claim 16, wherein each of said second wedge groups independently comprises a group derived from a substituted or unsubstituted adamantane, silsesquioxane, norbornane, terpenoid, polyethylene glycol, or borneol.

21. The structure of claim 1, wherein each of $L^1$ and $L^2$, is independently a single bond, —$(CH_2)_q$—, —$(CH_2)_qO(CH_2)_r$—, —$(CH_2)_qS(CH_2)_r$—, —$(CH_2)_qO_2(CH_2)_r$—, —$(CH_2)_qSO(CH_2)_r$—, —$(CH_2)_qSO_2(CH_2)_r$—, —$(CH_2)_qSO_3(CH_2)_r$—, —$(CH_2)_qOSO_2(CH_2)_r$—, —$(CH_2)_qNR^{19}(CH_2)_r$—, —$(CH_2)_qCO(CH_2)_r$—, —$(CH_2)_qCOO(CH_2)_r$—, —$(CH_2)_qOCO(CH_2)_r$—, —$(CH_2)_qOCOO(CH_2)_r$—, —$(CH_2)_qCONR^{20}(CH_2)_r$—, —$(CH_2)_qNR^{21}CO(CH_2)_r$—, —$(CH_2)_qOCONR^{22}(CH_2)_r$—, —$(CH_2)_qNR^{23}COO(CH_2)_r$—, or —$(CH_2)_qNR^{24}CONR^{25}(CH_2)_r$—; wherein each of $R^{19}$-$R^{25}$ is independently hydrogen or $C_1$-$C_5$ alkyl; and wherein each of q and r is independently an integer selected from the range of 0 to 10.

22. The structure of claim 1, wherein each of $R^{10}$ and $R^{11}$ is independently a hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate or catechol; wherein each of $R^{30}$-$R^{42}$ is independently hydrogen or $C_1$-$C_5$ alkyl.

23. A method of modulating incident electromagnetic radiation; said method comprising:
providing a structure comprising a supramolecular assembly of a polymer blend of at least one block copolymer and at least a second component; wherein said polymer blend comprises:
(i) a first block copolymer comprising:
a first polymer block comprising first repeating units; wherein each of said first repeating units of said first polymer block comprises a first polymer backbone group covalently linked to a first polymer side chain group; and
a second polymer block comprising second repeating units; wherein each of said second repeating units of said second polymer block comprises a second polymer backbone group covalently linked to a second polymer side chain group or second wedge group that is different than said first polymer side chain group; and
(ii) the second component having a composition that is different from said first block copolymer;
wherein said first block copolymer has the formula (FX6A) or (FX6B1):

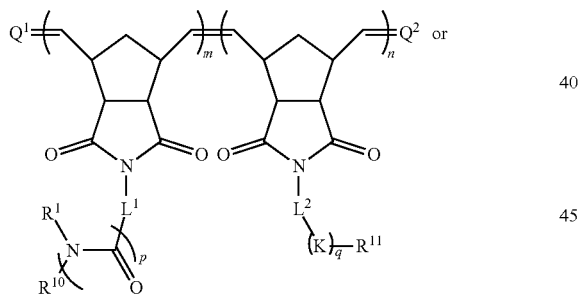

(FX6A)

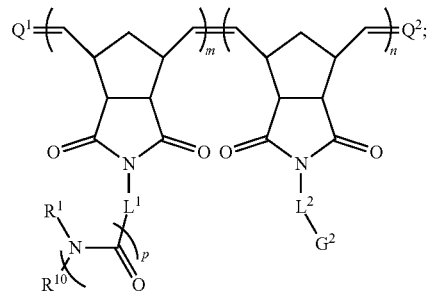

(FX6B1)

K is a repeating group of said second polymer side chain group, $G^2$ is said second wedge group; each of $R^{10}$ and $R^{11}$ is independently a polymer side chain terminating group: $L^1$ is a first linking group; $L^2$ is a second linking group; each of n and m is independently an integer selected from the range of 20 to 2000; each of p and q is independently an integer selected from the range of 30 to 2000; $R^1$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, $C_2$-$C_{30}$ polyethylene glycol, a metal, or a metal complex, wherein each of $R^{30}$-$R^{42}$ is independently H, $C_5$-$C_{10}$ aryl or $C_1$-$C_{10}$ alkyl; and
wherein each of $Q^1$ and $Q^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate, or catechol;
wherein each of $R^{30}$-$R^{42}$ is independently hydrogen, $C_1$-$C_{10}$ alkyl or $C_5$-$C_{10}$ aryl; and
directing said incident electromagnetic radiation on to said structure.

\* \* \* \* \*

UNITED STATES PATENT AND TRADEMARK OFFICE
CERTIFICATE OF CORRECTION

Page 1 of 1

PATENT NO. : 10,732,321 B2
APPLICATION NO. : 15/243788
DATED : August 4, 2020
INVENTOR(S) : Miyake et al.

It is certified that error appears in the above-identified patent and that said Letters Patent is hereby corrected as shown below:

In the Specification

• Replace first paragraph (Column 1, Lines 8-12) with the following paragraph:
--This application is a continuation of U.S. Application No. 13/930,400, filed June 28, 2013, which claims the benefit of priority of U.S. Provisional Application No. 61/665,696, filed June 28, 2012. All of these applications are hereby incorporated by reference in their entireties to the extent non inconsistent with the disclosure herein.--;

• Replace the second paragraph (Column 1, Lines 17-22) with the following paragraph:
--This invention was made with government support under CHE0809418 awarded by National Science Foundation. The government has certain rights in the invention.--.

Signed and Sealed this
Seventeenth Day of November, 2020

Andrei Iancu
*Director of the United States Patent and Trademark Office*